US008548036B2

(12) United States Patent
Umehara et al.

(10) Patent No.: US 8,548,036 B2
(45) Date of Patent: Oct. 1, 2013

(54) NOISE DETECTION METHOD, NOISE DETECTION APPARATUS, SIMULATION METHOD, SIMULATION APPARATUS, AND COMMUNICATION SYSTEM

(75) Inventors: Daisuke Umehara, Kyoto (JP); Masahiro Morikura, Kyoto (JP); Toshiya Hisada, Osaka (JP); Shinichi Ishiko, Yokkaichi (JP); Satoshi Horihata, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 592 days.

(21) Appl. No.: 12/801,687

(22) Filed: Jun. 21, 2010

(65) Prior Publication Data
US 2010/0329320 A1    Dec. 30, 2010

(30) Foreign Application Priority Data

Jun. 24, 2009  (JP) .................................. 2009-150251
Nov. 24, 2009  (JP) .................................. 2009-266707
Jun. 8, 2010  (JP) .................................. 2010-131191

(51) Int. Cl.
*H04B 3/46* (2006.01)
*H04B 17/00* (2006.01)
*H04Q 1/20* (2006.01)

(52) U.S. Cl.
USPC ................. 375/227; 375/285; 703/13; 706/52

(58) Field of Classification Search
USPC ....................... 375/227, 285; 703/13; 706/52
See application file for complete search history.

(56) References Cited

U.S. PATENT DOCUMENTS

| | | | |
|---|---|---|---|
| 6,122,332 A  * | 9/2000 | Ogata et al. .................. | 375/346 |
| 6,636,645 B1 * | 10/2003 | Yu et al. ....................... | 382/268 |
| 2002/0035471 A1 | 3/2002 | Breton | |
| 2004/0066203 A1 | 4/2004 | Boss et al. | |

(Continued)

FOREIGN PATENT DOCUMENTS

| | | |
|---|---|---|
| DE | 103 02 362 A1 | 1/2004 |
| DE | 10 2004 017 486 A1 | 10/2005 |

(Continued)

OTHER PUBLICATIONS

M. Zimmerman et al., "Analysis and Modeling of Impulsive Noise in Broad-Band Powerline Communications", *IEEE Transactions on Electromagnetic Compatibility*, vol. 44, No. I, pp. 249-258, 2002.

(Continued)

*Primary Examiner* — Kenneth Lam
*Assistant Examiner* — Sung Ahn
(74) *Attorney, Agent, or Firm* — Oliff & Berridge, PLC

(57) ABSTRACT

For voltage values (observed noise sequence) in an electronic power line (communication medium) which are obtained at a predetermined interval, initial values of noise characteristics based on a statistic of the observed noise sequence itself are decided by a moment method (S301 to S307), the noise characteristics (state transition probabilities and state noise power) for maximization of the likelihood of the observed noise sequence are obtained from the initial values by MAP (Maximum A Posteriori) estimation using a Baum-Welch algorithm (S309 to S312), a state sequence is estimated from the obtained noise characteristics, and an impulsive noise at each time point is detected.

14 Claims, 40 Drawing Sheets

(56) References Cited

U.S. PATENT DOCUMENTS

| | | | |
|---|---|---|---|
| 2004/0071232 A1* | 4/2004 | de Souza et al. | 375/341 |
| 2005/0094748 A1* | 5/2005 | Zaboronski et al. | 375/341 |
| 2006/0268733 A1* | 11/2006 | Rhee et al. | 370/252 |
| 2007/0198255 A1 | 8/2007 | Fingscheidt et al. | |
| 2009/0257471 A1* | 10/2009 | Tanaka et al. | 375/130 |
| 2010/0014616 A1* | 1/2010 | Coulson | 375/341 |

FOREIGN PATENT DOCUMENTS

| | | |
|---|---|---|
| DE | 601 23 161 T2 | 9/2007 |
| JP | A-2001-134286 | 5/2001 |
| JP | A-2002-319919 | 10/2002 |
| JP | A-2004-503983 | 2/2004 |
| JP | A-2006-67421 | 3/2006 |
| JP | A-2009-206609 | 9/2009 |
| WO | WO 01-97415 A1 | 12/2001 |

OTHER PUBLICATIONS

M.G. Sanchez et al., "Impulsive Noise Measurements and Characterization in a UHF Digital TV Channel", *IEEE Transactions on Electromagnetic Compatibility*, vol. 41, No. 2, pp. 124-136, 1999.

V. Degardin et al., "Impulsive Noise Characterization of In-Vehicle Power Line", *IEEE Transactions on Electromagnetic Compatibility*, vol. 50, No. 4, pp. 861-868, 2008.

I. Mannet al., "Impulse Generation With Appropriate Amplitude, Length, Inter-Arrival, and Spectral Characteristics", *IEEE Journal on Selected Areas in Communications*, vol. 20, No. 5, pp. 901-912, 2002.

R. Durbin et al., "3.2 Hidden Markov models" and "3.3 Parameter estimation for HMMs", *Biological Sequence Analysis*, Cambridge University Press, pp. 52-69, 1998.

L. E. Baum, "An Inequality and Associated Maximization Technique in Statistical Estimation for Probabilistic Functions of Markov Processes", *Inequalities-III*, pp. 1-8, 1972.

K. Fukunaga et al., "Estimation of the Parameters of a Gaussian Mixture Using the Method of Moments", *IEEE Transactions on Pattern Analysis and Machine Intelligence*, vol. PAMI-5, No. 4, pp. 410-416, 1983.

M. Stone, "An Asymptotic Equivalence of Choice of Model by Cross-Validation and Akaike's Criterion", *Journal of the Royal Statistical Society. Series B* (Methodological), vol. 39, pp. 44-47, 1977.

H. Akaike, "A New Look at the Statistical Model Identification", *IEEE Transactions on Automatic Control*, vol. AC-19, No. 6, pp. 716-723, 1974 (with Abstract).

D. Umehara et al., "Consideration on Interative Decoding of M-ary Modulation Signals over Hidden Markov Noise Channels", *Technical Report of IEICE*, pp. 13-17, 2009.

D. Umehara et al., "Statistical Impulse Detection of In-Vehicle Power Line Noise Using Hidden Markov Model," *Graduate School of Informatics, Kyoto University*.

M. Mohammadi et al., "Measurement Study and Transmission for In-vehicle Power Line Communication", *IEEE ISPLC* 2009, Dresden Germany, pp. 73-78, Mar. 2009.

Mar. 29, 2011 Office Action issued in German Patent Application No. 102010030450.6 with translation.

\* cited by examiner

F I G. 1

STATE   $S_1$   $S_2$   $\cdots S_k$   $\cdots S_K$   $\cdots$

NOISE
OBSERVATION   $n_1$   $n_2$   $\cdots$   $n_k$   $\cdots$   $n_K$   $\cdots$ F I G. 2
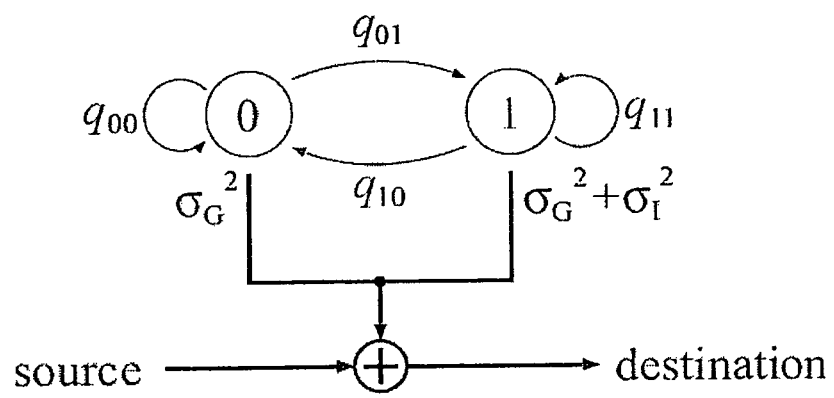

F I G. 3
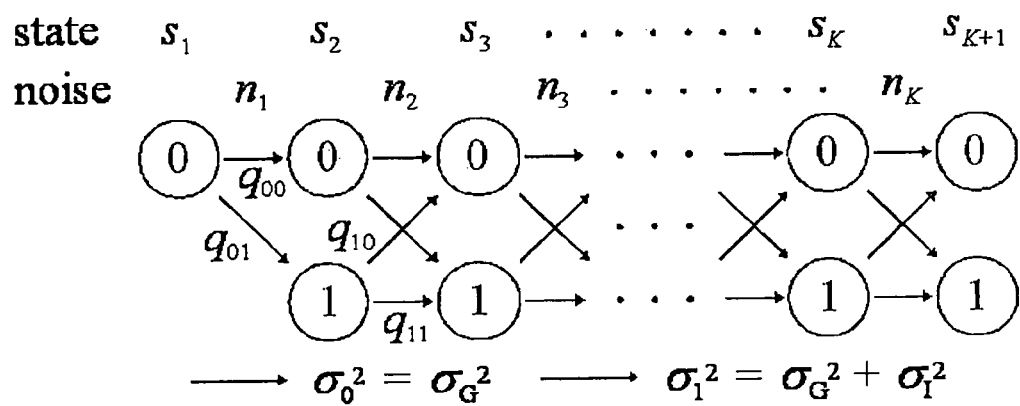

FIG. 4
Forward
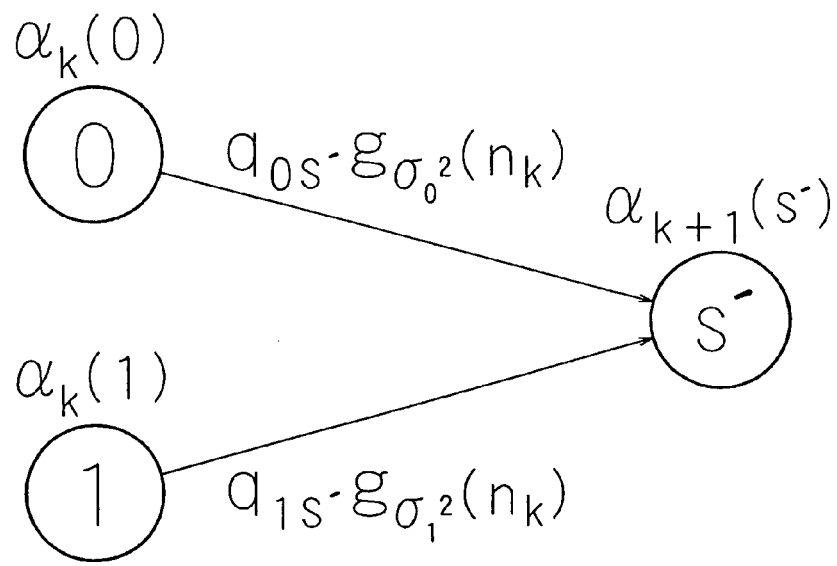
Backward
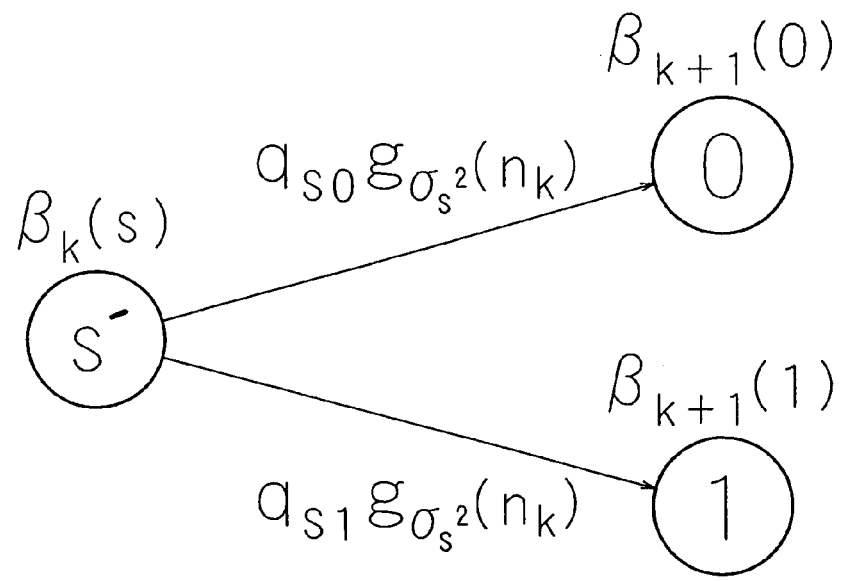

F I G. 5
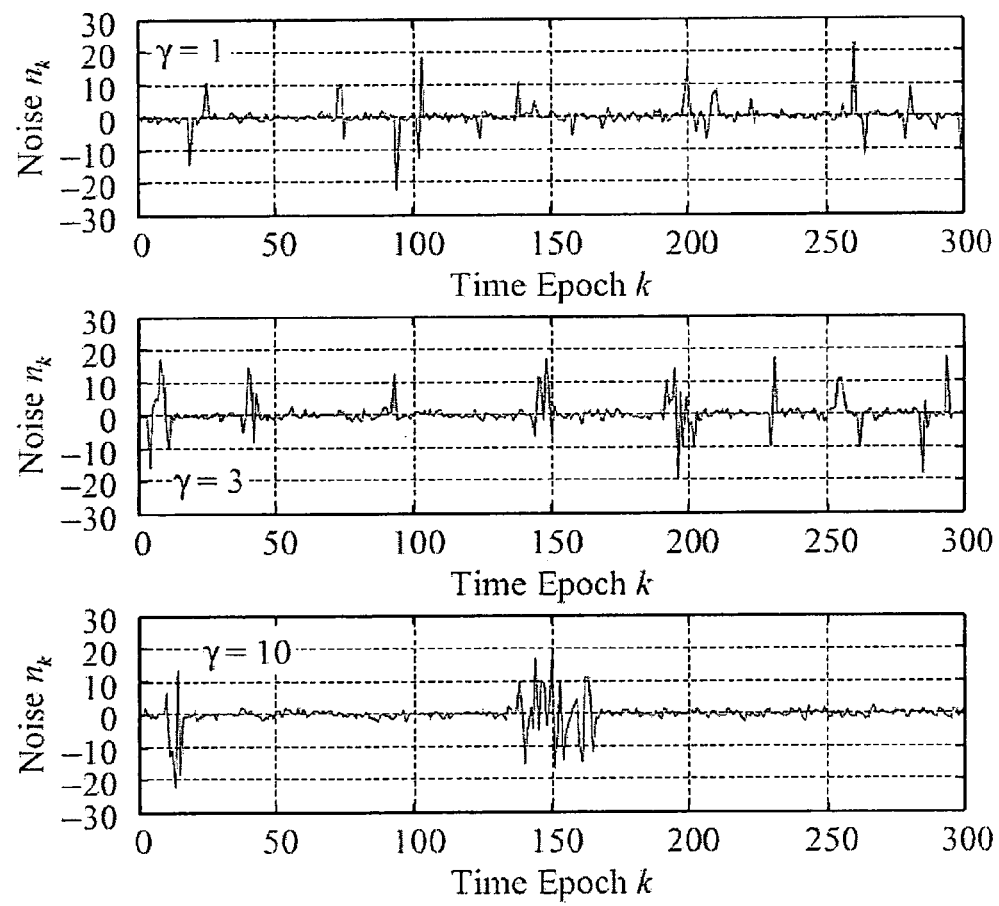

F I G. 10
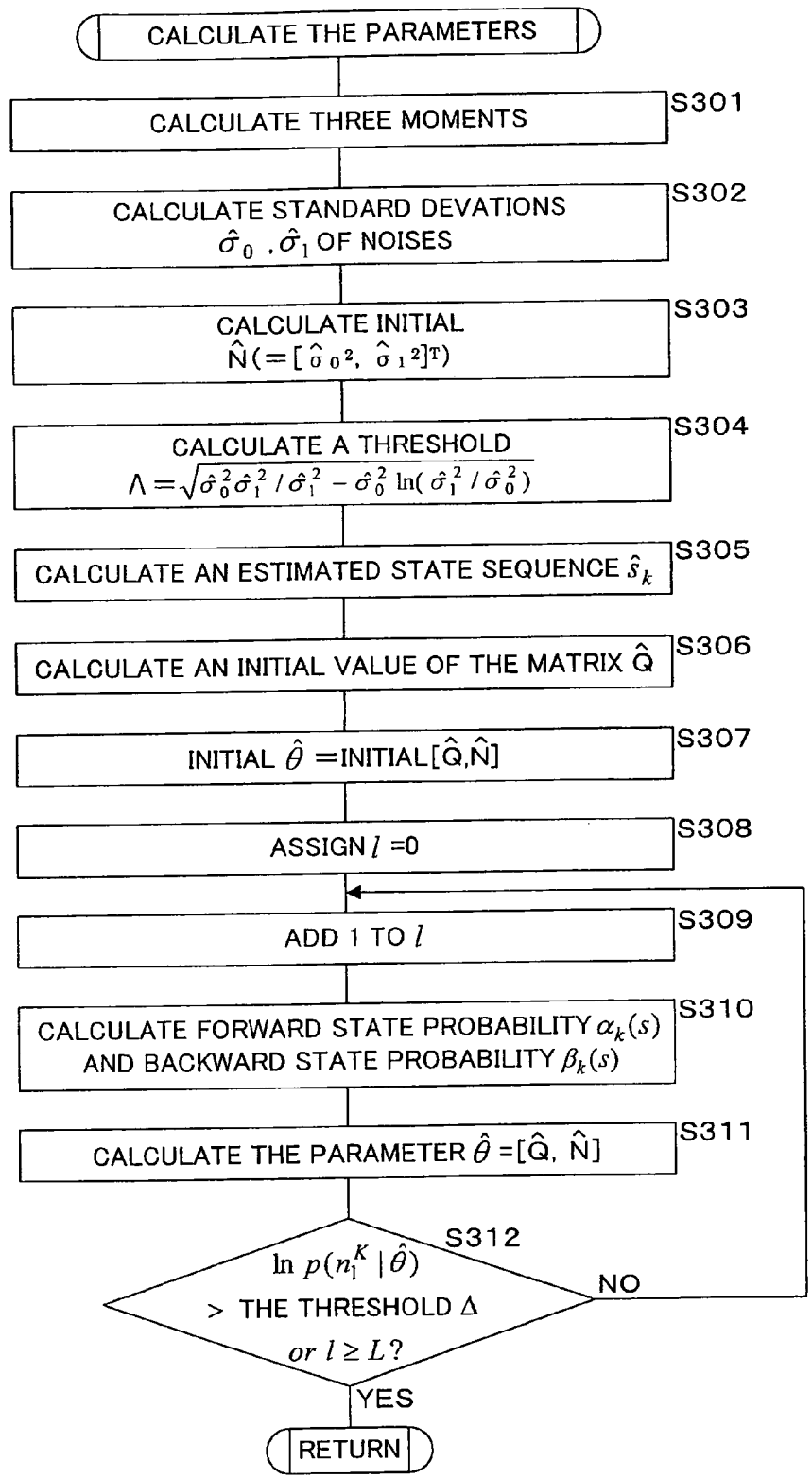

F I G. 1 1
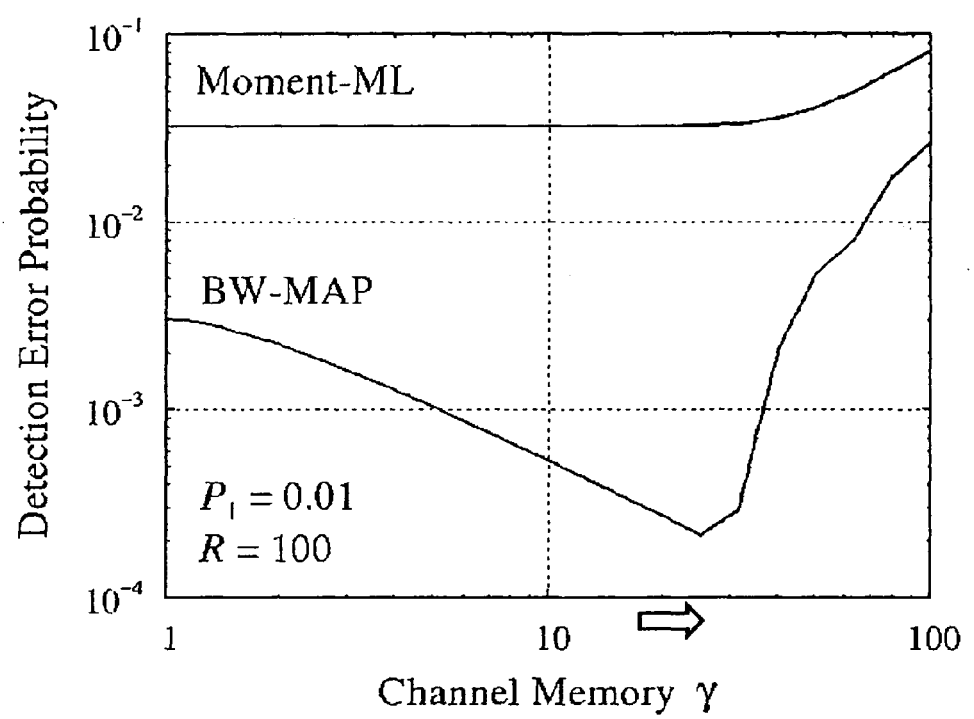

F I G. 1 3
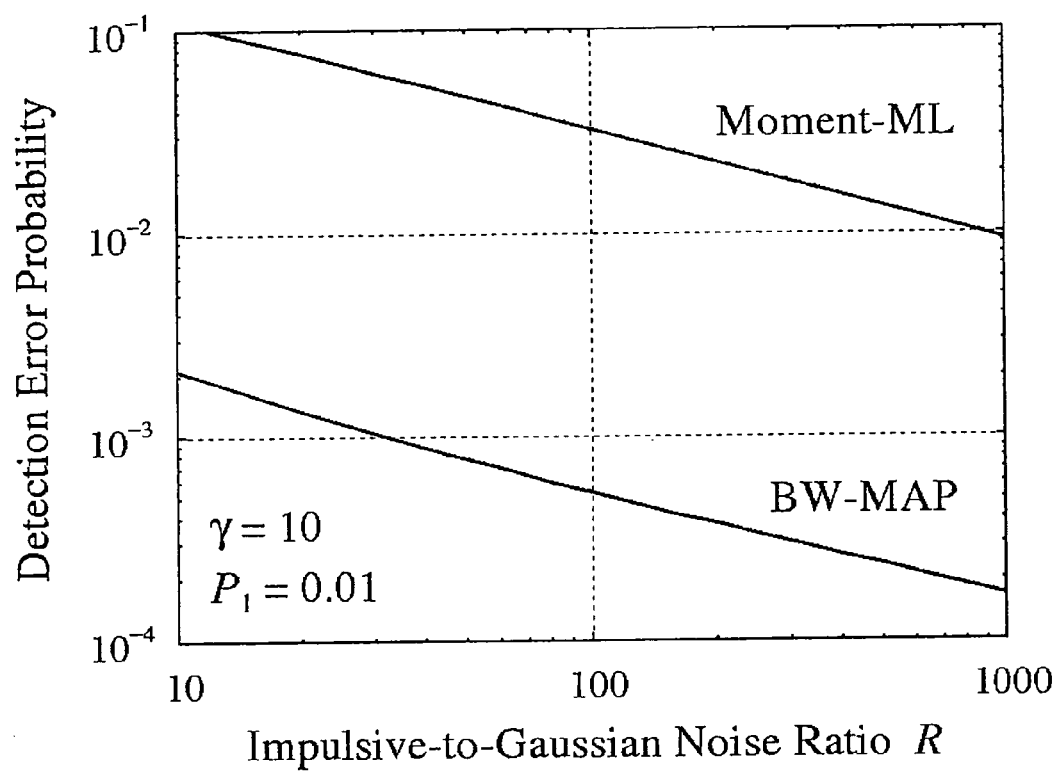

F I G. 15

| ESTIMATED VALUE | Moment-ML | BW-MAP |
|---|---|---|
| CHANNEL MEMORY $\gamma$ | 1.5 | 28.1 |
| IMPULSIVE NOISE OCCURRENCE PROBABILITY P1 | $1.77 \times 10^{-2}$ | $3.0 \times 10^{-2}$ |
| IMPULSIVE-TO-BACKGROUND NOISE RATIO R | 141.6 | 82.4 |

F I G. 2 2
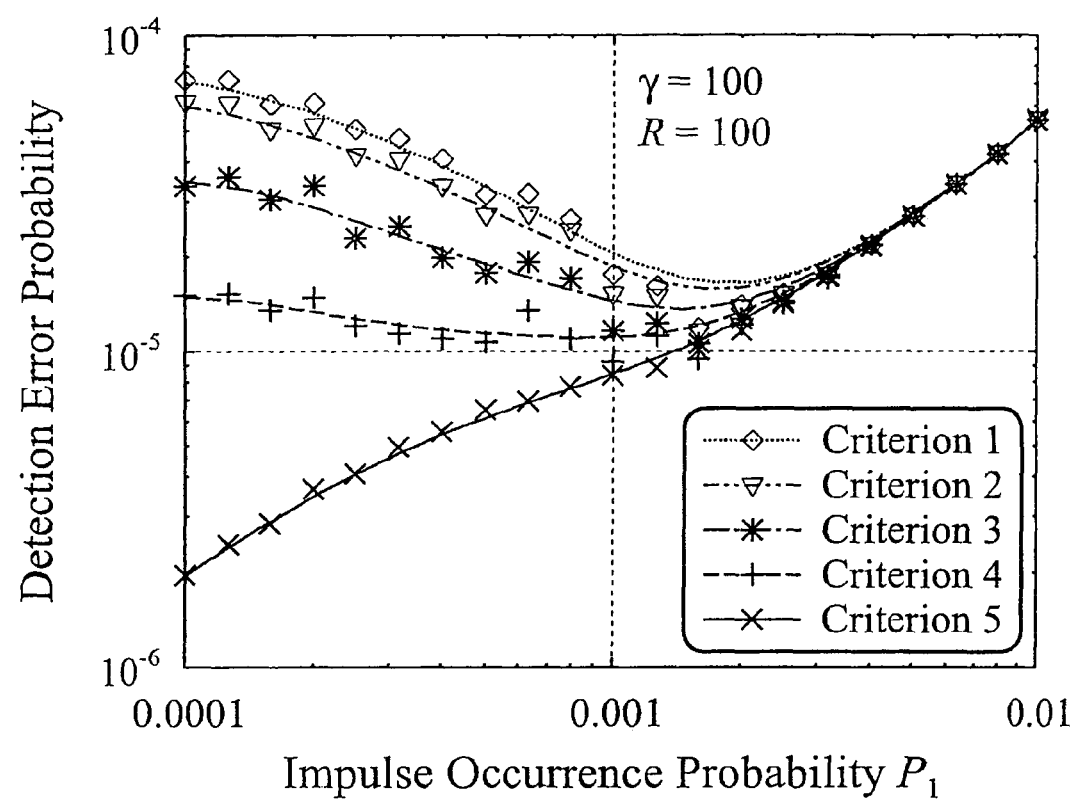

F I G. 3 8
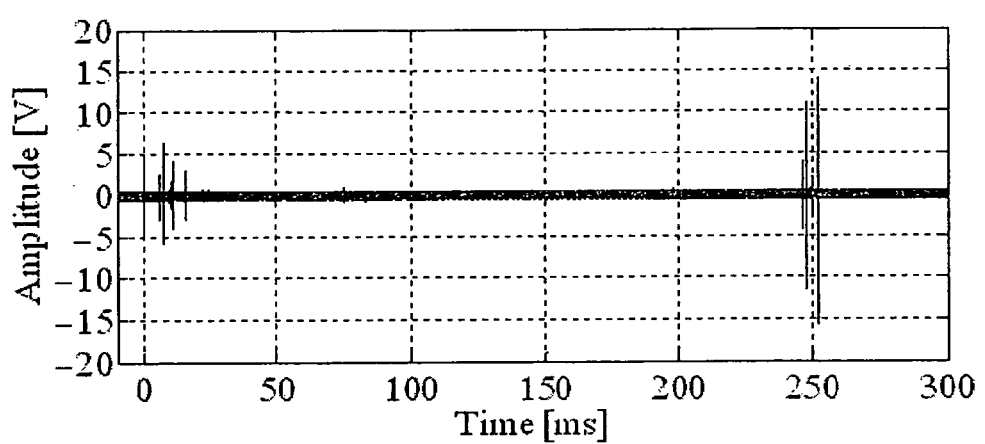

F I G. 3 9
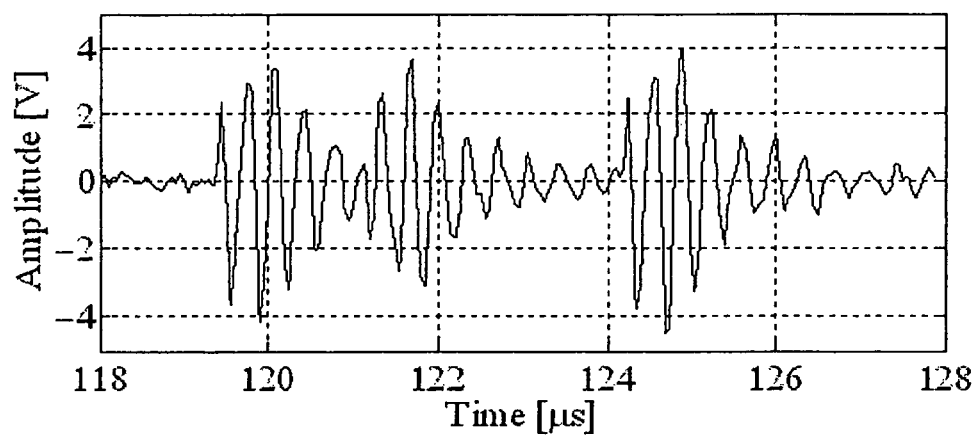

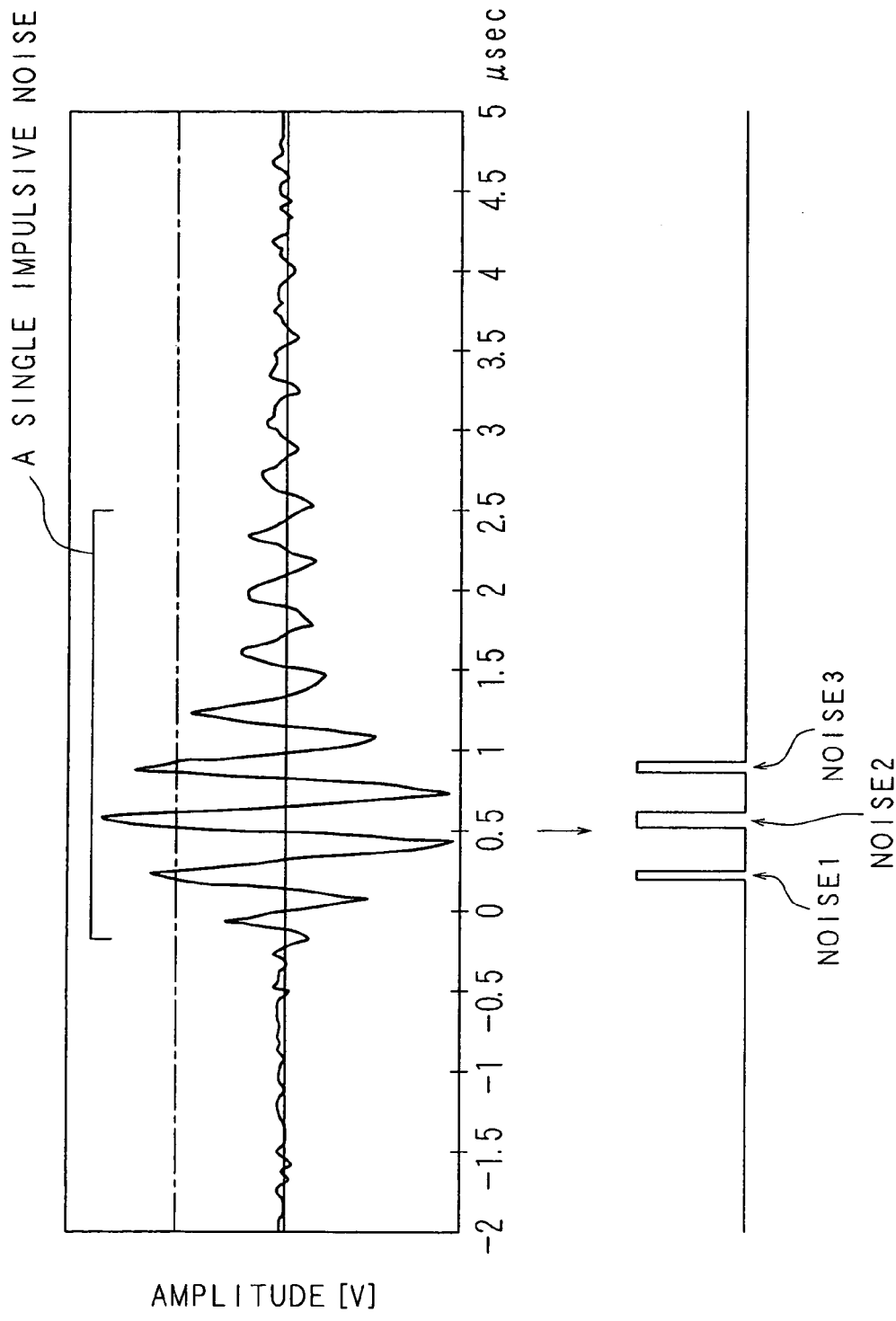

ies on a communication method or the like effective for the impulsive noise that differs depending on a vehicle type or an option; and appropriately select a communication method, a frequency and a communication parameter.

NOISE DETECTION METHOD, NOISE DETECTION APPARATUS, SIMULATION METHOD, SIMULATION APPARATUS, AND COMMUNICATION SYSTEM

CROSS-REFERENCE TO RELATED APPLICATIONS

This Nonprovisional application claims priority under 35 U.S.C. §119(a) on Patent Application No. 2009-150251 filed in Japan on Jun. 24, 2009, No. 2009-266707 filed in Japan on Nov. 24, 2009 and No. 2010-131191 filed in Japan on Jun. 8, 2010, the entire contents of which are hereby incorporated by reference.

BACKGROUND OF THE INVENTION

1. Field of the Invention

The present invention relates to a communication system including a plurality of communication apparatuses. In particular, the present invention relates to a noise detection method, a noise detection apparatus, a simulation method, a simulation apparatus and a communication system which are capable of automatically detecting an impulsive noise, generated suddenly in a communication medium, from a statistical property of the observed noise itself.

2. Description of Related Art

Recently, in each field, there has been utilized a system in which a plurality of communication apparatuses are connected and functions are allocated to the respective communication apparatuses to mutually exchange data, thereby allowing the apparatuses to carry out various processes in conjunction with each other. In a communication system, the quality of communication is influenced by impulsive noises generated in a communication medium through which the communication apparatuses are connected to each other. Accordingly, it is necessary to take measures to prevent impulsive noises, or to realize communication so as not to be influenced by impulsive noises.

In the field of in-vehicle LAN (Local Area Network) provided in a vehicle, ECUs (Electronic Control Units) functioning as communication apparatuses are used, and the ECUs are allowed to carry out specialized processes to mutually exchange data, thereby realizing various functions as a system. Vehicle control is shifting from mechanical control toward electrical control, and specialization of functions of respective ECUs and functions realized by a system are on the increase. In accordance with this, the number and types of communication apparatuses are increased, and the number of communication lines through which the communication apparatuses are connected to each other is also increased. Further, with an increase in the amount of data received and transmitted by a communication system, it is necessary to receive and transmit a large amount of data at a higher speed.

In regard to this, attention is being given to PLC (Power Line Communication) for realizing communication by superimposing a communication carrier wave on an existing power line, and in addition, the application of PLC to in-vehicle LAN has been proposed (see Patent Document 1, for example). The application of an in-vehicle PLC system to in-vehicle LAN can achieve a reduction in the number of lines, thus making it possible to expect various effects including: a reduction in the weight of a vehicle; an improvement in fuel efficiency; and effective utilization of a space in a vehicle.

In an in-vehicle PLC system, data has to be received and transmitted with low delay and high reliability for safety reasons in particular. However, since an actuator is connected to a power line in in-vehicle PLC, a high amplitude impulsive noise is generated suddenly due to operation and/or suspension of the actuator. Therefore, it is necessary to: automatically detect the impulsive noise from a statistical property of the observed noise itself; conduct detailed preliminary studies on a communication method or the like effective for the impulsive noise that differs depending on a vehicle type or an option; and appropriately select a communication method, a frequency and a communication parameter.

As a method for detecting an impulsive noise, a method for detecting whether or not there is an impulsive noise based on an amplitude threshold and/or distribution of length of a given observation window (window size) has conventionally been used (see Non-Patent Documents 1, 2, 3 and 4).

PRIOR ART REFERENCE

Patent Document

[Patent Document 1] Japanese Patent Application Laid-Open No. 2006-067421

Non-Patent Document

[Non-Patent Document 1] M. Zimmermann and K. Dostert, "Analysis and modeling of impulsive noise in broad-band power-line communications", IEEE Trans. Electromagn. Compat., vol. 44, no. 1, pp. 249-258, February 2002

[Non-Patent Document 2] M. G. S'anchez, L. de Haro, M. C. Ram'on, A. Mansilla, C. M. Ortega, and D. Oliver, "Impulsive noise measurements and characterization in a UHF digital TV channel", IEEE Trans. Electromagn. Compat., vol. 41, no. 2, pp. 124-136, May 1999

[Non-Patent Document 3] V. Degardin, M. Lienard, P. Degauque, E. Simon, and P. Laly, "Impulsive noise characterization of in-vehicle power line channels", IEEE Trans. Electromagn. Compat., vol. 50, no. 4, pp. 861-868, November 2008

[Non-Patent Document 4] I. Mann, S. Mclaughlin, R. K. W. Henkel, and T. Kessler, "Impulse generation with appropriate amplitude, length, inter-arrival, and spectral characteristics", IEEE J. Sel. Areas Commun., vol. 20, no. 5, pp. 901-912, June 2002

SUMMARY OF THE INVENTION

An impulsive noise, which is generated from an actuator in in-vehicle PLC, has been detected insufficiently by the foregoing detection method. FIGS. 38 to 40 are waveform diagrams illustrating examples of impulsive noises generated in a power line. In each of FIGS. 38 to 40, the horizontal axis represents time while the vertical axis represents a voltage value, and FIGS. 39 and 40 are each obtained by partially enlarging FIG. 38.

As illustrated in FIGS. 39 and 40, the noises generated in the power line of the in-vehicle PLC are damped sine waves. Accordingly, when a noise is detected based on whether or not an amplitude value is equal to or higher than a threshold (Non-Patent Documents 1 and 2), a single impulsive noise will be detected in such a manner that it is subdivided into a plurality of noises (1 to 3) as illustrated in FIG. 40.

In regard to this, a method for detecting an impulsive noise based on a distribution value of length of an observation window is, for example, known (Non-Patent Documents 3 and 4), but a subjective detection condition set by an observer of a waveform is often included in deciding an observation window length used for measurement and a distribution value threshold. Thus, there is a disadvantage that a section of an impulsive noise to be detected is influenced by the foregoing impulsive noise detection condition. Accordingly, even if noise detection from which human subjectivity is removed is desired, such noise detection has never been realized.

The timing of operation of the actuator serving as a source of generation of an impulsive noise is event-driven. In the case of a noise generated regularly, it is only necessary to estimate the reliability of a signal in a regular period to be low. For example, in the case of indoor PLC, it is known that a period of generation of an impulsive noise is synchronized with that of a commercial power supply, and an impulsive noise can be detected with relatively high accuracy by detecting the impulsive noise based on this period. However, an event-driven operation, i.e., an actuator operation such as locking/unlocking of an electric door lock of a vehicle, is carried out in response to an operation corresponding to turning ON/OFF of a switch by a driver or a fellow passenger, and an impulsive noise is generated from a door lock actuator or the like in response to turning ON/OFF of the switch of the door lock, thus making it impossible to learn the foregoing temporal characteristics.

The present invention has been made in view of the above-described circumstances, and its object is to provide a noise detection method and a noise detection apparatus which are capable of removing subjective detection conditions to the extent possible, and automatically and accurately detecting an impulsive noise, generated in a communication medium, from a statistical property of the observed noise itself.

Another object of the present invention is to provide a noise detection method and a noise detection apparatus which are capable of taking a power line of in-vehicle PLC, for example, into consideration as a communication medium, and accurately detecting an impulsive noise generated suddenly in response to an operation of an actuator connected to the power line.

Still another object of the present invention is to provide: a simulation method and a simulation apparatus which reproduce an impulsive noise with high accuracy based on a feature of the impulsive noise detected in a such manner that subjective detection conditions are removed to the extent possible; and a communication system capable of using, based on the feature of the impulsive noise, a frequency that minimizes the influence of the impulsive noise.

Yet another object of the present invention is to provide a noise detection method and a noise detection apparatus which are capable of more accurately detecting, using statistical information, an impulsive noise generated in a communication medium.

In the present invention, using an apparatus for detecting a noise in a communication medium, signal levels (e.g., voltage values, current values and/or power values) in the communication medium of a communication system are measured at a predetermined interval (that is sampling interval). The noise detection apparatus extracts an observed noise sequence (i.e., a time sequence of signal levels n from a time point 1 to a time point K), which is a time sequence of signal levels at respective time points k for a measurement periodical unit. The extracted observed noise sequence is information obtained through an observation system, and is not a true state indicative of whether or not an impulsive noise is generated, or not a true power in each state. Therefore, a hidden Markovian-Gaussian noise model is applied to calculate, from the observed noise sequence, noise characteristics in a measurement periodical unit. Furthermore, using the extracted observed noise sequence and the calculated noise characteristics, a state sequence, indicative of whether or not a state is an impulsive noise generated state, is estimated in a statistical and probabilistic manner. An impulsive noise at each time point is detected from the estimated state sequence.

In this case, in the noise detection method of the present invention, an estimated state sequence is calculated so that the a posteriori probability (which will be described later) of each state at each time point, calculable from noise characteristics, is maximized. Thus, an estimated state is accurately estimated. Further, the presence or absence of generation of an impulsive noise at each time point is determined by the a posteriori probability of each of states (e.g., two states) at each time. In the present invention, "two states", for example, include: a state "0" (i.e., an impulsive noise free state in which no impulsive noise is generated); and a state "1" (i.e., a state in which an impulsive noise is generated). Note that "0" and "1" may be reversed. A state estimated at each time point in a measurement periodical unit is defined as either one of the two states, in which the a posteriori probability is maximized.

Moreover, in the noise detection method, the a posteriori probability is calculated using a forward state probability and a backward state probability. With respect to the state at each time point, the forward state probability is related to a state at a preceding time point, and the backward state probability is related to a state at a subsequent time point. Besides, in the noise detection method of the present invention, the forward and backward state probabilities are identifiable from noise characteristics. In this case, the noise characteristics for identifying the forward and backward state probabilities are calculated from a statistic of the observed noise sequence itself.

FIG. 1 is a conceptual diagram illustrating the relationship between states of Markovian noises and observed results. In FIG. 1, represents a state at each time point, and n represents an observed value at each time point (which is a voltage value in a power line in this case). A Markovian noise has the following characteristic: a state $s_{k+1}$ at a time point k+1 depends only on a state $s_k$ at an immediately preceding time point k. As illustrated in FIG. 1, an observed result $n_k$ is associated with the state $s_k$, but the state $s_k$ itself cannot be obtained. Accordingly, in the noise detection method of the present invention, noise characteristics are calculated using a hidden Markovian-Gaussian noise model based on an observed noise sequence. Furthermore, based on the observed noise sequence and the calculated noise characteristics, the forward and backward state probabilities at each time point are used, thereby calculating the a posteriori probability of each state. From the a posteriori probability of each state, an estimated state matrix is calculated as described above.

FIG. 2 is a conceptual diagram conceptually illustrating a noise generation mechanism of a hidden Markovian noise. In FIG. 2, an impulsive noise free state In which no impulsive noise is generated is represented by "0", and a state in which an impulsive noise is generated is represented by "1". In FIG. 2, $q_{st}$ represents a state transition probability from a state s to a state t. State transition probabilities between the two states, i.e., the state "0" in which no impulsive noise is generated and the state "1" in which an impulsive noise is generated, include the following four state transition probabilities: $q_{00}$; $q_{01}$; $q_{11}$; and $q_{10}$. Further, a noise amplitude is decided in accordance with a Gaussian distribution at each time point. $\sigma_G^2$ and $\sigma_I^2$ in FIG. 2 signify the power of a background Gaussian (G: Gaussian) noise (which is generated regardless of whether the state is "0" or "1") and that of an impulse (I: Impulse) noise (which is generated only when the state is "1"), respectively. In this manner, the hidden Markovian-Gaussian noise can be described by the four state transition probabilities and the noise power (noise characteristics).

In the present invention, in order to detect an impulsive noise, a state sequence is estimated from the observed noise sequence n(k=1 to K)=$n_1, n_2 \ldots n_k \ldots n_K$ using the foregoing noise characteristics. In this case, a method performed based on so-called MAP (Maximum A Posteriori) estimation is used in estimating the state sequence (see Reference Document 1: R. Durbin, S. Eddy, A. Krogh, and G. Mitchison, Biological Sequence Analysis, Cambridge University Press, 1998, and Reference Document 2: L. E. Baum, "An equality and associated maximization technique in statistical estimation for probabilistic functions of markov processes", in Inequalities-III, pp. 1-8., 1972).

FIG. 3 is a trellis diagram of two-state hidden Markovian-Gaussian noises. In FIG. 3, the horizontal axis denotes a lapse of time, representing transition of each state. In estimating a state sequence, a probability density function of a noise in a state s in a two-state hidden Markovian-Gaussian noise channel is expressed by the following formula 1.

[Exp. 1]

$$p(n_k \mid s_k = s) = g_{\sigma_s^2}(n_k) = \frac{1}{\sigma_s\sqrt{2\pi}}\exp\left(-\frac{n_k^2}{2\sigma_s^2}\right) \quad (1)$$

(where $g_{\sigma^2}(n_k)$ is a Gaussian probability density function of average 0 and distribution $\sigma^2$)

In this manner, the probability density function of the noise in the state s is calculated using the distribution of power of each state, which is one of noise characteristics. Furthermore, in the Markov process illustrated in FIG. 2, the state of the present time point depends on the state at an immediately preceding time point (which is also illustrated in FIG. 3). In other words, the state at the present time point is identifiable by state transition probabilities from the state at an immediately preceding time point to the state at the present time point, i.e., noise characteristics. Accordingly, the state sequence probability of a state sequence s(1 to K+1) from a time point 1 to a time point K+1 illustrated in FIG. 3 is expressed by the following formula 2. It should be noted that $P_s$ represents a steady-state probability of the state s.

[Exp. 2]

$$P(s_1^{K+1}) = P_{s1}\prod_{k=1}^{K} q_{s_k, s_{k+1}} \quad (2)$$

($s_1^{K+1}$: State Sequence of State Sequence s(1 to K+1) until Time Point K+1

$q_{s_k, s_{k+1}}$ State Transition Probability from State $s_k$ at Time Point k to State $s_{k+1}$ at Subsequent Time Point k+1)

Moreover, in the present invention, using the forward and backward state probabilities related to states preceding and subsequent to a state at each: time point as illustrated in FIGS. 2 and 3, the state probability at each time point in the formula 2 is calculated as the a posteriori probability. Besides, a state in which the a posteriori probability is maximized is estimated using MAP estimation. The state estimated at each time point in a measurement periodical unit represents either one of the states "0" and "1", in which the a posteriori probability is maximized.

For each state s, a forward state probability (Forward probability) $\alpha_k(s)$ and a backward state probability (Backward probability) $\beta_k(s)$ at the time point k are expressed by the following formulas 3 and 4, respectively, as illustrated in FIG. 4. FIG. 4 provides explanatory diagrams conceptually illustrating the forward state probability (Forward probability) $\alpha_k(s)$ and the backward state probability (Backward probability) $\beta_k(s)$.

[Exp. 3]

$$\alpha_k(s) = \begin{cases} p(n_1^{k-1}, s_k = s), & (2 \le k \le K+1) \\ P_s, & (k=1) \end{cases} \quad (3)$$

$$\beta_k(s) = \begin{cases} p(n_k^K \mid s_k = s), & (1 \le k \le K) \\ 1, & (k = K+1) \end{cases} \quad (4)$$

As illustrated in FIGS. 3 and 4, in accordance with the trellis diagram, the forward state probability (Forward probability) $\alpha_k(s)$ at each time point k can be sequentially calculated from the front, and the backward state probability (Backward probability) $\beta_k(s)$ at each time point k can be sequentially calculated from the back (formulas 5 and 6).

The probability $\alpha_k(s)$ that the state becomes s at the immediately preceding time point k is multiplied by a probability p that the observed result is n when the state at the time point k is s and the state at the time point k+1 is s', and a sum is taken, thereby calculating a forward state probability $\alpha_{k+1}(s')$ that the state becomes s' at the time point k+1. Furthermore, the probability p is identified by the formula 1 using the transition probability from the state s to the state s' and the probability density function when the observed result is n at the time point k.

On the other hand, a probability $\beta_{k+1}(s')$ that the state becomes s' at the immediately subsequent time point k+1 is multiplied by the probability p that the observed result is n when the state at the time point k is s and the state at the time point k+1 is s', and a sum is taken, thereby calculating the backward state probability $\beta_k(s)$ that the state becomes s at the time point k.

[Exp. 4]

$$\alpha_{k+1}(s') = \sum_{s \in \{0,1\}} \alpha_k(s)p(n_k, s_{k+1} = s' \mid s_k = s) \quad (5)$$

$$= \sum_{s \in \{0,1\}} \alpha_k(s)q_{ss'}g_{\sigma_s^2}(n_k)$$

$$\beta_k(s) = \sum_{s' \in \{0,1\}} \beta_{k+1}(s')p(n_k, s_{k+1} = s' \mid s_k = s) \quad (6)$$

$$= g_{\sigma_s^2}(n_k)\sum_{s' \in \{0,1\}} \beta_{k+1}(s')q_{ss'}$$

The a posteriori probability of the state $s_k$ at the time point k, resulting from obtaining the observed noise sequence, is calculated by the following formula 7 using the forward state probability (Forward probability) $\alpha_k(s)$ and the backward state probability (Backward probability) $\beta_k(s)$ calculated by the formulas 5 and 6.

[Exp. 5]

$$P(s_k = s \mid n_1^K) = \frac{P(s_k = s)}{p(n_1^K)} = \frac{\alpha_k(s)\beta_k(s)}{\sum_{u \in \{0,1\}} \alpha_{K+1}(u)} \quad (7)$$

Further, in the present invention, a state sequence s(k=1 to k+1) having the maximum a posteriori probability is estimated. The maximum a posteriori probability is expressed by the formula 7. The state sequence is estimated by the following formula 8. When the estimated state is "1", it can be assumed that impulse occurrence is observed. In the following description, an estimated value is signified by a symbol (circumflex) in each mathematical expression.

[Exp. 6]

$$\hat{s}_k = \underset{s \in \{0,1\}}{\mathrm{argmax}} P(s_k = s \mid n_1^K) \quad (8)$$

In this case, in order to estimate a state sequence, parameters such as a state transition probability $q_{ss'}$ and a noise power $\sigma_s$ are necessary. This is because the state sequence is calculated by the formula 8 that is calculated using the formulas 1 to 7. In other words, the state sequence can be estimated by calculated the respective parameters. It should be noted that in the following description, noise distribution in the two states is represented by the following equation: $N=[\sigma_0^2, \sigma_1^2]^T$ (where T signifies the transposition of a matrix). Further, the four state transition probabilities $q_{00}$, $q_{01}$, $q_{11}$ and $q_{10}$ for describing Markovian noise are represented by a matrix Q having each of the state transition probabilities as an element ($Q=\{q_{00}, q_{01}, q_{11}, q_{10}\}$). Furthermore, the following description will be made based on the assumption that parameters $\theta=(Q, N)$.

It should be noted that the state transition probability $q_{ss'}$ and the noise power $\sigma_s$ may be expressed by using a temporal concentration of impulsive noises (which will hereinafter be called a "channel memory") $\gamma$, an impulse steady-state probability (i.e., an impulsive noise occurrence probability in a steady state) $P_1$, an impulse-to-background noise ratio R, and a background noise power $\sigma_G^2$ during a measurement periodical unit. The hidden Markovian-Gaussian noise is also completely described by using these parameters.

In the present invention, the state sequence s(k=1 to K) estimated by the formula 8 is estimated and calculated using the channel memory $\gamma$, impulsive noise occurrence probability $P_1$, impulse-to-background noise ratio R and background noise power $\sigma_G^2$ during a measurement periodical unit so that the a posteriori probability of the state at each time point is maximized. In the present invention, the channel memory $\gamma$, impulsive noise generation probability $P_1$, impulse-to-background noise ratio R and background noise power $\sigma_G^2$ are calculated from the observed noise sequence. Further, the presence or absence of generation of an impulsive noise at each time point in the observed noise sequence is determined using these noise characteristics.

The parameters $\theta=(Q, N)$ are associated with the channel memory $\gamma$, impulsive noise occurrence probability $P_1$, impulse-to-background noise ratio R, and background noise power $\sigma_G^2$ as follows.

As illustrated in FIG. 3, the noise distribution $\sigma_0^2$ when the state is "0" is represented by the following equation: $\sigma_0^2 = \sigma_G^2$, and the noise distribution $\sigma_1^2$ when the state is "1" is represented by the following equation: $\sigma_1^2 = \sigma_G^2 + \sigma_I^2 = (1+R)\sigma_G^2$. In other words, the impulse-to-background noise ratio R is $R=\sigma_I^2/\sigma_G^2$.

Furthermore, using the state transition probabilities, the steady-state probability $P_0$ in the state "0", i.e., in the state in which no impulsive noise is generated, and the impulsive noise occurrence probability $P_1$ in the state "1", i.e., in the state in which an impulsive noise is generated, are expressed as $P_0=q_{10}/(q_{01}+q_{10})$ and $P_1=q_{01}(q_{01}+q_{10})$, respectively. In this case, the probability is expressed as follows: Matrix $P=[P_0 P_1]^T$. It should be noted that due to the rarity of an impulsive noise, it can be assumed that $P_1<\frac{1}{2}$.

Average durations $T_0$ and $T_1$ of the states "0" and "1" are given by $T_0=1/q_{10}$ and $T_1=1/q_{01}$, respectively. The channel memory $\gamma$ is defined by $\gamma=1/(q_{01}+q_{10})$. In other words, the channel memory is the reciprocal of a sum of probabilities of transitions between the different states s and t, and serves as an indicator of a continuous period of the same state. The average durations $T_0$ and $T_1$ of the respective states "0" and "1" are both greater than 1 when the channel memory $\gamma$ is $\gamma<1$, and the memory is divergent. The state in which the average durations $T_0$ and $T_1$ are both greater than 1 does not apply to the noise model of impulsive noises. Accordingly, it can be assumed that the channel memory $\gamma$ for describing impulsive noises is $\gamma \geq 1$. When the channel memory $\gamma$ is $\gamma=1$, the channel becomes memoryless, and which of the states "0" and "1" will occur is completely randomized. The noise in this case will be called a "Bernoulli-Gaussian noise".

The closer the value of the channel memory $\gamma$ to 1 ($\gamma \geq 1$), the more likely it is that a period of generation of a random noise can be expressed. Further, the higher the value of the channel memory $\gamma$ than 1 and the greater the numerical value, the more likely it is that concentrative noise generation is recognized. FIG. 5 provides waveform diagrams each illustrating a hidden Markovian-Gaussian noise amplitude with respect to the channel memory. In each of the waveform diagrams, the impulsive noise occurrence probability $P_1=0.1$, the impulse-to-background noise ratio R=100, and the background noise power $\sigma_G^2=1$. The channel memory $\gamma=1$ in the upper waveform diagram, the channel memory $\gamma=3$ in the middle waveform diagram, and the channel memory $\gamma=10$ in the lower waveform diagram. As illustrated in FIG. 5, the temporal concentration of impulsive noises can be expressed using the value of the channel memory. An impulsive noise appears sporadically when the channel memory $\gamma=1$, but impulsive noises concentratedly appears when the channel memory $\gamma=10$. Whether or not an impulsive noise is generated is decided based on a state sequence. However, since the state sequence cannot be found, the state sequence has to be appropriately estimated in order to detect an impulsive noise.

It should be noted that the presence or absence of generation of impulsive noises for each measurement periodical unit may also be determined from the noise characteristics. For example, of the four state transition probabilities, when the transition probabilities $q_{01}$ and $q_{10}$ between the states averagely different during a measurement periodical unit are high, i.e., when the value of the channel memory $\gamma$ is low, there is a high possibility that one of the states does not occur concentratedly and random noises are generated. When the power $\sigma_1^2$ of the state in which impulsive noises are generated is higher than the power $\sigma_0^2$ of the state in which no impulsive noise is generated, i.e., when the value of the impulse-to-background noise ratio R is high, there is a high possibility that impulsive noises with a high amplitude is observed. As described above, in addition to the presence or absence of an impulsive noise at each time point, the presence or absence of impulsive noises during the entire measurement periodical unit can be determined macroscopically. By setting the measurement periodical unit as a period concerning the cycle of communication between communication apparatuses, the influence of impulsive noises on a communication trouble during this period may be taken into consideration. Moreover, a macroscopic determination is made for each measurement periodical unit; thus, each state sequence may be estimated for only a period during which impulsive noises are generated, and an impulsive noise at each time point may be detected in details, thereby making it possible to simplify processing.

The association between the channel memory γ, impulsive noise occurrence probability $P_1$, impulse-to-background noise ratio R and background noise power $\sigma_G^2$, and the state transition probability matrix Q and average noise power N is summarized as follows.

Channel Memory γ: $\gamma=1/(q_{01}+q_{10})$

Impulsive noise occurrence probability $P_1$: $P_1=q_{01}/(q_{01}+q_{10})$

Impulse-To-Background Noise Ratio R: $R=\sigma_I^2/\sigma_G^2=(\sigma_1^2-\sigma_0^2)/\sigma_0^2$ Background Noise Power $\sigma_G^2$: $\sigma_G^2=\sigma_0^2$ As described above, the state sequence can be estimated by the formula 8. The formula 8 is calculated using the formulas 1 to 7 based on the noise characteristics (the state transition probability matrix Q and average noise power N, or the channel memory γ, impulsive noise occurrence probability $P_1$, impulse-to-background noise ratio R and background noise power $\sigma_G^2$). However, it is necessary to accurately estimate the state sequence in order to accurately detect an impulsive noise. For this purpose, it is further necessary to obtain noise characteristics for increasing the likelihood of the observed noise sequence. In the present invention, the noise characteristics are estimated based on a BW algorithm, which is a kind of EM (Expectation-maximization) algorithms, as follows.

Specifically, first, initial values of noise characteristics, i.e., initial values of state transition probability and average noise power calculated from an observed noise sequence, are decided. Using the decided initial values and the foregoing formulas 1 to 6, a forward state probability indicative of a two-state probability based on a preceding state at each time point in the obtained observed noise sequence, and a backward state probability indicative of a two-state probability based on a state at a subsequent time point are calculated. Then, using the forward and backward state probabilities, the state transition probability and noise power for the entire observed noise sequence are further calculated. In order to detect an impulsive noise, the calculation of the forward and backward state probabilities, and the calculation of the state transition probability and noise power are repeated. Thus, the state transition probability and noise power for maximization of the likelihood of the entire observed noise sequence (i.e., maximization expected values of the state transition probability and noise power) are calculated. From the state transition probability and noise power calculated in the course of repetition of updating, the forward and backward state probabilities at each time point are calculated, and from these forward and backward state probabilities, the a posteriori probability of each state at each time point is calculated (formulas 3 and 4). Thus, a state sequence in which the a posteriori probability of the state at each time point is likely to be maximized will be estimated. Detailed description will be made below.

When the a posteriori probability of a pair of states (states s and s') at time points k and k+1, i.e., an observed noise sequence n(k=1 to K), has been obtained, the probability of transition from the state s at the time point k to the state s' at the time point k+1 is given by the following formula 9.

[Exp. 7]

$$P(s_k = s, s_{k+1} = s' \mid n_1^K) = \frac{\alpha_k(s) q_{ss'} g_{\sigma_s^2}(n_k) \beta_{k+1}(s')}{\sum_{u \in \{0,1\}} \alpha_{K+1}(u)} \quad (9)$$

Using the formulas 7 and 9, estimated values of the state transition probability and noise power in the state sequence s(k=1 to K+1) are calculated as follows by the following formulas 10 and 11, respectively.

[Exp. 8]

$$\hat{q}_{ss'} \leftarrow \frac{\sum_{k=1}^{K} \alpha_k(s) \beta_{k+1}(s') g_{\sigma_s^2}(n_k)}{\sum_{k=1}^{K} \alpha_k(s) \beta_k(s)} \quad (10)$$

$$\hat{q}_{ss'} \leftarrow \frac{\sum_{k=1}^{K} P(s_k = s, s_{k+1} = s' \mid n_1^K)}{\sum_{k=1}^{K} P(s_k = s \mid n_1^K)}$$

$$\hat{\sigma}_s^2 \leftarrow \frac{\sum_{k=1}^{K} \alpha_k(s) \beta_k(s) n_k^2}{\sum_{k=1}^{K} \alpha_k(s) \beta_k(s)} = \frac{\sum_{k=1}^{K} P(s_k = s \mid n_1^K) n_k^2}{\sum_{k=1}^{K} P(s_k = s \mid n_1^K)} \quad (11)$$

$\hat{q}_{ss'}$: Estimated Value of State Transition Probability
$\hat{\sigma}_s^2$: Estimated Value of Noise Power In the present invention, the initial values (θ) of the state transition probability and noise power are decided for the extracted observed noise sequence n(k=1 to K), and the calculations of the formulas 5, 6, 10 and 11 are repeated. In the course of the repetition, when an increase in a logarithmic likelihood becomes lower than a prescribed threshold or when the number of the calculations exceeds a given number L, the calculation of the state transition probability and average noise power, i.e., updating, is stopped (formula 12).

[Exp. 9]

$$\left. \begin{array}{c} \Delta \ln p(n_1^K \mid \theta) > Threshold \Delta \\ \text{or} \\ \text{Number of Calculations } l \geq L \end{array} \right\} \quad (12)$$

As described above, in the present invention, the state at each time point is reproduced based on the a posteriori probability using the BW algorithm and MAP estimation, and the state transition probability and noise power indicative of the noise characteristics during a measurement periodical unit are accurately calculated; furthermore, using the state transition probability $q_{ss'}$ and noise power $\sigma_s^2$ calculated as the values that maximize the likelihood of the observed noise sequence, the state sequence of the state at each time point can be accurately estimated by the foregoing formulas 5 to 8. Accordingly, the accuracy of detection of an impulsive noise at each time point is increased.

Moreover, in the present invention, a moment method is used in deciding initial values in the foregoing BW algorithm (see Reference Document 3: K. Fukunaga and T. E. Flick, "Estimation of the parameters of a Gaussian mixture using the method of moments", IEEE Trans. Pattern Anal. Mach. Intell., vol. PAMI-5, no. 4, pp. 410-416, July 1983). This is because since there are a large number of local solutions, the logarithmic likelihood that the calculation is stopped in the present invention is greatly influenced by the initial values. In the present invention, since the initial values are decided by the detection apparatus based a statistic of the observed noise sequence itself, the possibility of avoiding convergence to an erroneous local solution is increased, and the need for a step given by human is eliminated to enable the automation of the detection. Thus, the influence of information set by human in the system can be eliminated to the extent possible.

Specifically, in a method for deciding the initial values, the initial values of the state transition probability and noise power in the BW algorithm according to the present invention, i.e., the initial value of the matrix Q and the initial value of N, are decided by using three moments in the moment method from the obtained observed noise sequence. In the noise detection method of the present invention, the three moments are calculated, and the noise power and a threshold for an amplitude value of the observed noise sequence are calculated using the calculated moments. Thus, the calculated noise power is decided as the initial value of the noise power N, and an estimated state sequence is calculated using the calculated threshold to decide the initial value of the state transition probability matrix Q. Detailed description will be made below.

The estimated value N of the noise power (average noise power) in the state sequence s(k=1 to K) is estimated as follows. First, the probability distribution of the observed noise sequence n(k=1 to K) of a two-state hidden Markovian-Gaussian noise is given as a mixture Gaussian distribution as expressed in the following formula 13.

[Exp. 10]

$$gm_N(n_k) = P_0 g_{\sigma_0^2}(n_k) + P_1 g_{\sigma_1^2}(n_k) \quad (13)$$

Since the Gaussian distribution is given as expressed in the formula 13, the moment method is used to perform: a maximum likelihood estimation of the steady-state probability $P_0$ of the state "0" and steady-state probability $P_1$ of the state "1", i.e., the matrix $P(=[P_0 P_1]^T)$; and a maximum likelihood estimation of the distribution of noises in k=1 to K, which is noise power in each state, i.e., the matrix $N(=[\sigma_0^2, \sigma_1^2]^T)$.

In the moment method, three moments a, b and c of the following formula 14 are calculated from the observed noise sequence n(k=1 to K).

[Exp. 11]

$$a = \sqrt{\frac{\pi}{2}} E[|n_k|], \quad b = E[n_k^2], \quad c = \frac{\sqrt{2\pi}}{4} E[|n_k|^3] \quad (14)$$

E:Sample Mean of Sequence

From the three moments calculated by the formula 14, the estimated values of standard deviations of noises in each state can be calculated by the following formulas 15 and 16.

[Exp. 12]

$$\hat{\sigma}_0 = \frac{ab - c + \sqrt{(ab-c)^2 - 4(a^2-b)(b^2-ac)}}{2(a^2-b)} \quad (15)$$

$$\hat{\sigma}_1 = \frac{ab - c - \sqrt{(ab-c)^2 - 4(a^2-b)(b^2-ac)}}{2(a^2-b)} \quad (16)$$

The initial estimated value of the noise power of the formula 11 can be decided by using the formulas 15 and 16.

It should be noted that the estimated value of N $(=[\sigma_0^2, \sigma_1^2]^T)$ and the impulse-to-background noise ratio R can be identified by using the estimated values of the noise standard deviations, which are calculated by the formulas 15 and 16.

Furthermore, the estimated value of the impulsive noise occurrence probability $P_1$ is calculated as expressed in the following formula 17.

[Exp. 13]

$$\hat{P}_1 = \frac{1}{2}\left(1 - \frac{2a^3 - 3ab + c}{\sqrt{(ab-c)^2 - 4(a^2-b)(b^2-ac)}}\right) \quad (17)$$

When the value of the steady-state probability, that is impulsive noise occurrence probability $P_1$ of the state "1", calculated by the formula 17, is equal to or lower than 0, or is equal to or higher than 0.5 (it is assumed that $P_1 < 1/2$ due to the rarity of an impulsive noise), it can be determined that a white Gaussian noise (background Gaussian noise) is included in the extracted observed noise sequence but no impulsive noise is included therein. Accordingly, in the present invention, it is first determined whether or not the impulsive noise occurrence probability $P_1$ falls within the range of $0 < P_1 < 1/2$, and when the impulsive noise occurrence probability $P_1$ does not fall within this range, it is determined that only a white Gaussian noise is included in the extracted observed noise sequence, thus making it unnecessary to forcedly applying the observed noise sequence to an impulsive noise model in performing detection.

Further, when a sequence length of the observed noise sequence is large, i.e., when the number of measurements of voltage values as observed results is sufficiently large, the impulsive noise occurrence probability $P_1$ derived by the moment method based on the formulas 15 to 17 and the impulsive-to-background noise ratio R calculated using the noise standard deviations derived by the formulas 16 and 17 can be accurately estimated.

Furthermore, the initial value of the state transition probability matrix Q is also decided by obtaining the estimated state sequence s(k=1 to K) using a threshold A that is based on the average noise power calculated by the noise standard deviations (formulas 15 and 16) given from the foregoing three moments. The threshold A is given as expressed in the following formula 18. As expressed in the formula 18, in the estimated state sequence s, the state $s_k$ is "0" when the k-th sample (voltage value) $n_k$ in the obtained observed noise sequence is equal to or lower than the threshold A, and the state $s_k$ is "1" when the k-th sample $n_k$ (voltage value) exceeds the threshold Λ.

[Exp. 14]

$$\hat{s}_k = \begin{cases} 0, & (n_k \leq \Lambda), \\ 1, & (n_k > \Lambda), \end{cases} \quad \Lambda = \sqrt{\frac{\hat{\sigma}_0^2 \hat{\sigma}_1^2}{\hat{\sigma}_1^2 - \hat{\sigma}_0^2} \ln\left(\frac{\hat{\sigma}_1^2}{\hat{\sigma}_0^2}\right)} \quad (18)$$

From the estimated value of the state sequence s(k=1 to K) estimated by the formula 18, the initial value of the state transition probability matrix Q between the respective states is calculated. Specifically, from the number $A_{ss'}$ of transitions from the state s to the state s' in the estimated state sequence s(k=1 to K), and the number $A_s$ of the states s in s(k=1 to K−1) in the estimated state sequence s(k=1 to K), an initial value $q_{ss'}$ of the state transition probability from the state s to the state s' is calculated by the following formula:

$$q_{ss'} = A_{ss'}/A_s \quad (19)$$

In the present invention, the average noise power and state transition probability for maximization of the likelihood of the observed noise sequence are calculated by the BW algorithm using the initial value of the average noise power derived from the three moments based on the moment method for the observed noise sequence, and the initial value of the state transition probability as mentioned above. The presence or absence of generation of an impulsive noise may be determined from the estimated state sequence using only the moment method. In the moment method, as mentioned above, the estimated state sequence is calculated by only comparisons made between: the threshold Λ calculated from the moments; and the voltage values at the respective time points. However, when determinations are made using only the threshold, the accuracy is insufficient since a single impulsive noise is detected in a subdivided manner, for example. It is to be noted that the accuracy is enough to decide the initial values of the BW algorithm, subjective detection conditions such as an initial value given by human and a threshold by which an initial value is decided can be eliminated, and a step of giving an initial value by human is unnecessary, thus enabling automation. Using the initial values calculated in the above-described manner, the average noise power and state transition probability for maximization of the likelihood of the observed noise sequence in the present invention are calculated; hence, the accuracy of the estimated state sequence calculated from the noise characteristics is also increased, thus allowing impulsive noises to be automatically detected with higher accuracy.

It should be noted that in calculating the average noise power and state transition probability for maximization of the likelihood of the observed noise sequence by the foregoing BW algorithm, and in estimating the state sequence, an impulsive noise is preferably extracted by eliminating components other than the impulsive noise. When the state sequence is obtained from the observed noise sequence, in which no impulsive noise is generated, based on the assumption that an impulsive noise is included, a white Gaussian noise might still be forcedly and erroneously analyzed as part of an impulsive noise. Therefore, whether or not an impulsive noise is generated in the observed noise sequence is determined using a statistical information criterion, and when no impulsive noise is generated, the estimation of the state transition probability and noise power performed based on the foregoing BW algorithm and MAP estimation is skipped. A noise generated in the measurement period in this case may be substantially determined as a white Gaussian noise. Thus, the accuracy of detection of an impulsive noise is further increased.

It should be noted that as the above-mentioned information criterion, a logarithmic likelihood, TIC (Takeuchi Information Criterion [see Reference Document 4]), AIC (Akaike Information Criterion [see Reference Document 5]), or a criterion provided by focusing attention on a correction term of TIC or AIC, i.e., the number of free parameters, is used in addition to the value of the foregoing impulsive noise occurrence probability $P_1$. A plurality of these criteria may be used in combination.

(Reference Document 4: M. Stone, "An asymptotic equivalence of choice of model by cross-validation and Akaike's criterion", J. Roy. Statist. Soc., vol. 39, pp. 44-47, 1977)

(Reference Document 5: H. Akaike, "A new look at the statistical model identification", IEEE Trans. Autom. Control, vol. AC-19, no. 6, pp. 716-723, December 1974)

In particular, the criterion provided by the number of free parameters is capable of increasing the detection accuracy by determining whether or not an impulsive noise is included based on whether or not the following formula 20 is satisfied.

In addition, it is expected that a value close to 1 is derived as the correction term of AIC at left-hand side of formula 20 when the amplitude probability distribution of the observed noise sequence is a Gaussian distribution, and a value greater than 3 is derived as the correction term of AIC when the amplitude probability distribution of the observed noise sequence is a mixture Gaussian distribution. Therefore the right-hand value of formula 20 is assumed to be a value 2, that is z value is 1, thereby making it possible to determine whether or not the amplitude probability distribution of the observed noise sequence is a mixture Gaussian distribution, means includes impulsive noises. However, the right-hand value of formula 32 should not to be fixed to value 2, so that z value is fine-tuned from 1.

[Exp. 15]

$$\frac{E_K \lfloor n_k^4 \rfloor}{2K\hat{\sigma}^4} - \frac{1}{2} > 1 + z \qquad (20)$$

$\hat{\sigma}^2$:Two-State Weighted Distribution $\left( = \hat{P}_0 \hat{\sigma}_0^2 + \hat{P}_1 \hat{\sigma}_1^2 \right)$ $z$:Any value meets $z > 0$ It should be noted that in the present invention, a predetermined measurement periodical unit is a periodical unit concerning the communication method between communication apparatuses connected to the power line. In other words, a communication parameter of a physical layer in the communication is set as a changeable unit, thereby making it possible to favorably conduct evaluations for determining whether or not the communication parameter needs to be changed in accordance with a feature of impulsive noises in each period. For example, it is preferable to use a communication cycle and/or a frame length in a communication protocol as the measurement periodical unit. Also when TDMA (Time Division Multiple Access) is adopted as a communication method, a communication cycle, a frame length, a slot length, etc., may be similarly used as the measurement periodical unit.

In the present invention, for example, communication is carried out in accordance with FlexRay (registered trademark). Accordingly, the predetermined measurement periodical unit is defined as a communication cycle serving as the unit of media access. Thus, an optimal communication parameter in FlexRay can be selected.

It should be noted that in obtaining the estimated state sequence in order to detect, whether or not an impulsive noise is generated, an impulsive noise is not necessarily detected for each predetermined interval during which signal levels are sampled. When one or a plurality of the predetermined intervals corresponds/correspond to single bit information in digital information, the presence or absence of an impulsive noise may be detected for each section using a plurality of the predetermined intervals as a single section. Thus, the presence or absence of generation of an impulsive noise at a time point corresponding to each bit can be determined. It can be estimated that in digital information received through communication, there might be an error in a bit at a time point at which an impulsive noise is generated.

In the present invention, a simulation of an impulsive noise is also enabled. Based on observed noise sequences in which signal levels in a communication medium of a communication system in a plurality of different known situations are measured at a predetermined interval on the time series, noise characteristics associated with the respective situations are calculated using a hidden Markovian-Gaussian noise model as described above. In accordance with each situation, an impulsive noise is detected from the observed noise sequence and the calculated noise characteristics by the foregoing detection method, and a frequency of the detected impulsive noise is calculated. Furthermore, in association with each situation, the noise characteristics and the calculated impulsive noise frequency are recorded. A plurality of different known situations refer to connection configuration patterns of the communication system. For example, when the communication system is an in-vehicle PLC system, an observed noise sequence is extracted for each of situations including: the type of an actuator connected to a power line, e.g., whether the actuator is one used for a door lock or one used for a mirror; whether the actuator has started its operation; whether the actuator has stopped its operation; and a change in the length of the power line, for example, to its end. And the noise characteristics and impulsive noise frequency for each measurement periodical unit are calculated from each of the observed noise sequences. Further, a state sequence is generated by the hidden Markovian-Gaussian noise model using the noise characteristics associated with each situation, which have been calculated in advance in accordance with the configuration of the communication system to be simulated (formulas 5 to 8). When the communication system is an in-vehicle PLC system, the state sequence is generated in accordance with the length of the power line, the numbers and types of the connected communication apparatuses and actuators, etc. Then, a pseudonoise is generated from the generated state sequence and the impulsive noise frequency.

The execution of the simulation according to the present invention allows detailed preliminary studies to be conducted, for example, on a communication method effective for the noise characteristics of an impulsive noise and the impulsive noise frequency, which are estimated automatically from statistical properties of the observed noise sequences. Thus, an efficient simulation can be realized.

Furthermore, in the present invention, the selection of an optimal communication method or the like from preset methods may be automated using a computer. In the present invention, based on observed noise sequences in which voltage values in a power line of an in-vehicle PLC system in a plurality of different known situations are measured at a predetermined interval on the time series, noise characteristics calculated using a hidden Markov model and associated with each situation, and the frequency of an impulsive noise detected in the above-described manner are recorded. In this case, the noise characteristics are information calculated automatically based on the observed noise sequence so as to avoid a situation where an erroneous local solution is calculated. In addition, in the computer, based on a circuit configuration to be designed, an estimated state sequence of a hidden Markov model is estimated and calculated using the noise characteristics of the respective situations calculated and recorded in advance, and a pseudonoise is generated using this estimated state sequence and the impulsive noise frequency. Moreover, a communication method, a communication frequency and a communication parameter, each serving as a candidate in the PLC system to be designed, are received, and a simulation of communication error occurrence (communication simulation) is performed for each of these candidates by using the generated pseudonoise, thereby identifying optimal candidates based on a communication error probability derived from simulation results.

In the present invention, based on the observed noise sequence derived by observation in each situation, and on the noise characteristics and frequency of an impulsive noise estimated automatically from statistical properties of the observed noise sequence itself, a pseudonoise responsive to the situation is generated, and a simulation is executed using this pseudonoise. Therefore, detailed preliminary studies can be conducted, for example, on a communication method or the like effective for an impulsive noise that appears depending on a wide variety of vehicle types or options, for example.

Further, in the present invention, a communication system may be configured to include an optimization apparatus for optimizing a communication method, a communication frequency and/or a parameter. The optimization apparatus obtains an observed noise sequence of signal levels in a communication medium, obtains noise characteristics using a hidden Markovian-Gaussian noise model based on the obtained observed noise sequence, and obtains noise features such as frequencies from the calculated noise characteristics. The obtaining the observed noise sequence and noise features is preferably sequentially carried out so as to be continuously updated. Furthermore, the optimization apparatus sequentially decides the optimal communication method, frequency and parameter based on comparisons made between: a plurality of communication methods, communication frequencies and communication parameters recorded in advance as candidates; and the noise features.

Thus, based on the features of an impulsive noise detected automatically using statistical properties of noises that are actually generated, the communication method, frequency and parameter, which minimize the influence of the impulsive noise, can be suitably selected.

Besides, in the present invention, a transmitter of a communication apparatus in a communication system may include a means for adjusting a carrier wave frequency, and a preceding stage of a limiter of a receiver may include a band rejection filter capable of adjusting a band, thus avoiding the frequency of an impulsive noise detected by the foregoing impulsive noise detection method. The communication system includes an analysis apparatus, for example, and the analysis apparatus is allowed to read frequencies calculated in advance in accordance with a plurality of different known situations. The analysis apparatus adjusts the frequency of the carrier wave of the transmitter and that of the band rejection filter preceding the receiver so that the frequency of an impulsive noise is avoided in accordance with the current situation of the communication system. Thus, the communication system is capable of performing communication in accordance with each situation without being influenced by the impulsive noise.

It should be noted that the analysis apparatus is not limited to a configuration in which adjustments are made so as to avoid impulsive noise frequencies stored in advance in accordance with the known situations. Furthermore, the analysis apparatus may be configured to detect an impulsive noise in real time, obtain the frequency thereof, and adjust the carrier wave frequency of the transmitter-receiver and the frequency of the band rejection filter so as to avoid the calculated frequency.

In the case of the present invention, a hidden Markovian-Gaussian noise model is applied in accordance with characteristics of a sudden impulsive noise generated in an event-driven manner in a communication medium of the communication system, thereby enabling automatic and high-accuracy impulsive noise detection that has been conventionally difficult.

In particular, when the communication system is a PLC system, there is a high possibility that a sudden impulsive noise is generated because various devices are connected to a power line serving as a communication medium, and therefore, more favorable communication is enabled by detecting the impulsive noise with high accuracy.

In particular, when the PLC system is an in-vehicle PLC system, there is a high possibility that received and transmitted information is information important for maintaining safety. High-accuracy detection of an impulsive noise that is suddenly generated, and execution of communication in which a period of generation of the impulsive noise is avoided are very useful when the PLC system is an in-vehicle PLC system.

Further, since an impulsive noise generated in each situation in the communication system can be automatically modeled with high accuracy, a noise simulation can be achieved with high accuracy at a design stage of the communication system, thereby making it possible to implement the communication system that uses an optimal frequency for effectively avoiding impulsive noises. In addition to the frequency, a communication method, a communication frequency, and other communication parameters may be selected.

BRIEF DESCRIPTION OF THE DRAWINGS

FIG. 1 is a conceptual diagram illustrating the relationship between states of Markovian noises and observed results.

FIG. 2 is a conceptual diagram conceptually illustrating a noise generation mechanism of a hidden Markovian noise.

FIG. 3 is a trellis diagram of two-state hidden Markovian-Gaussian noises.

FIG. 4 provides explanatory diagrams conceptually illustrating a forward state probability (Forward probability) $\alpha_k(s)$ and a backward state probability (Backward probability) $\beta_k(s)$.

FIG. 5 provides waveform diagrams each illustrating a hidden Markovian-Gaussian noise amplitude with respect to a channel memory.

FIG. 10 is a flow chart illustrating an example of a procedure of processing for calculating parameters θ (noise characteristics) for maximization of the likelihood of an observed noise sequence based on a BW algorithm using a moment method, executed by functions of a parameter estimation section of the noise detection apparatus according to Embodiment 1.

FIG. 11 is a graph illustrating a detection error probability caused by the noise detection apparatus according to Embodiment 1.

FIG. 13 is a graph illustrating a detection error probability caused by the noise detection apparatus according to Embodiment 1.

FIG. 15 is an explanatory diagram illustrating examples of noise characteristics of an impulsive noise detected by the noise detection apparatus according to Embodiment 1.

FIG. 22 is a graph illustrating detection error probabilities caused by the noise detection apparatus according to Embodiment 2.

FIG. 38 is a waveform diagram illustrating an example of impulsive noises generated in a power line.

FIG. 39 is a waveform diagram illustrating an example of an impulsive noise generated in a power line.

FIG. 40 is a waveform diagram illustrating an example of an impulsive noise generated in a power line.

| EXPLANATION OF ITEM NUMBERS | |
|---|---|
| 1 | ECU (communication apparatus) |
| 2 | actuator (device) |
| 3 | power line |
| 6 | noise detection apparatus |
| 601 | parameter estimation section |
| 602 | initial value deciding section |
| 603 | BW algorithm calculation section |
| 604 | parameter output section |
| 605 | impulsive noise detection section |
| 64 | measurement section |
| 7 | simulation apparatus |
| 70 | control section |
| 71 | storage section |
| 73 | noise record |
| 75 | condition input section |
| 76 | pseudonoise generation section |
| 8 | in-vehicle PLC design apparatus |
| 80 | control section |
| 81 | storage section |
| 83 | noise record |
| 84 | communication condition candidate group |
| 86 | input/output section |
| 87 | pseudonoise generation section |
| 88 | communication simulation execution section |
| 9 | optimization apparatus |
| 94 | measurement section |
| 95 | impulsive noise feature |
| 96 | communication condition candidate group |
| 901 | parameter estimation section |
| 905 | impulsive noise detection section |
| 906 | impulsive noise feature calculation section |
| 907 | optimal candidate deciding section |
| 100 | analysis apparatus |
| 101 | control section |
| 105 | measurement section |
| 106 | adjustment section |
| 107 | impulsive noise frequency information |
| 1001 | parameter estimation section |
| 1005 | impulsive noise detection section |
| 1006 | impulsive noise frequency calculation section |
| 21 | band rejection filter |

DESCRIPTION OF THE PREFERRED EMBODIMENTS

Hereinafter, the present invention will be specifically described with reference to the drawings illustrating embodiments of the present invention.

It should be noted that the following embodiments will be described based on an example in which the present invention is applied to an in-vehicle PLC system that realizes, via PLC, communication between ECUs installed on a vehicle.

Embodiment 1

Figure 6:
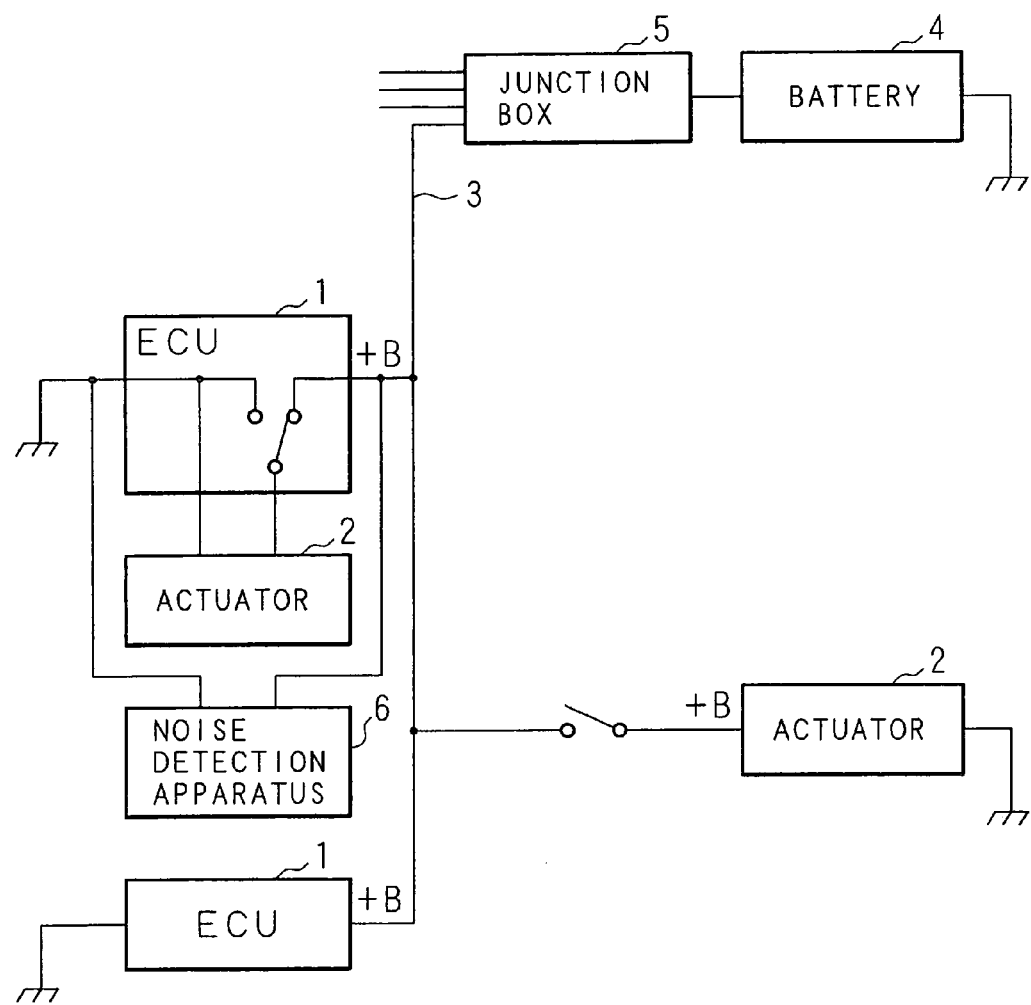
FIG. 6 is a block diagram illustrating a configuration of an in-vehicle PLC system according to Embodiment 1.

FIG. 6 is a block diagram illustrating a configuration of an in-vehicle PLC system according to Embodiment 1. The in-Vehicle PLC system includes: a plurality of ECUs 1, 1, . . . ; actuators 2, 2, . . . operated in response to control data transmitted from the ECUs 1, 1, . . . ; power lines 3, 3, . . . through which electric power is supplied to each of the ECUs 1, 1, . . . and the actuators 2, 2, . . . ; a battery 4 for supplying electric power to respective devices through the power lines 3, 3, . . . ; a junction box 5 for branching and junction of the power lines 3, 3, . . . ; and a noise detection apparatus 6 for detecting a noise in each power line 3.

As illustrated in FIG. 6, in Embodiment 1, the ECUs 1, 1, . . . and the actuators 2, 2, . . . make bus-type connections to the power line 3. A connection topology may be a star-type connection, or may be a combined type in which a bus-type connection and a star-type connection are combined.

The battery 4 is charged with electricity by an unillustrated alternator that generates electric power from an engine. The battery 4 is connected at its one end (negative terminal) to a ground, and is connected at its other end (positive terminal) to the junction box 5 via the power line 3. The battery 4 supplies a driving voltage of 12 V, for example, to each device.

The junction box 5 includes a branching and junction circuit for the power line 3. A plurality of the power lines 3, 3, . . . are connected to and branched from the junction box 5. The plurality of power lines 3, 3, . . . are connected to the associated ECUs 1, 1, . . . and actuators 2, 2, . . . . The junction box 5 distributes electric power, supplied from the battery 4, to the ECUs 1, 1, . . . , the actuators 2, 2, . . . and the noise detection apparatus 6, which are arranged in a vehicle.

One of the plurality of power lines 3, 3, . . . , branched from the junction box 5, is connected to the associated one of the ECUs 1, 1, . . . . Thus, the ECU 1 can receive supply of electric power from the battery 4. The power line 3 is also connected to the other one of the ECUs 1, 1, . . . , and supplies electric power to this ECU 1. The power line 3 through which the ECUs 1, 1 are connected to each other is branched and connected to the actuator 2 via a switch. When the switch is ON, electric power from the battery 4 is supplied to the actuator 2, thereby operating the actuator 2.

It should be noted that each of the ECUs 1, 1, . . . and the actuators 2, 2, . . . is internally configured so that the connected power line 3 is connected via each constituent element and load included therein to a body ground.

Further, in the in-vehicle PLC system according to Embodiment 1, the respective ECUs 1, 1, . . . are not only capable of being operated in response to supply of electric power from the battery 4 via the associated power lines 3, 3, . . . , but also capable of receiving and transmitting data by superimposing communication carrier waves on the power lines 3, 3, . . . through which the ECUs 1, 1, . . . are connected to each other. Thus, in the in-vehicle PLC system, no communication signal line for reception/transmission of data used for running control, video data or the like has to be additionally provided between the ECUs 1, 1, . . . . As a result, a reduction in the number of wires and a reduction in weight can be achieved for a harness provided in the vehicle.

Figure 7:
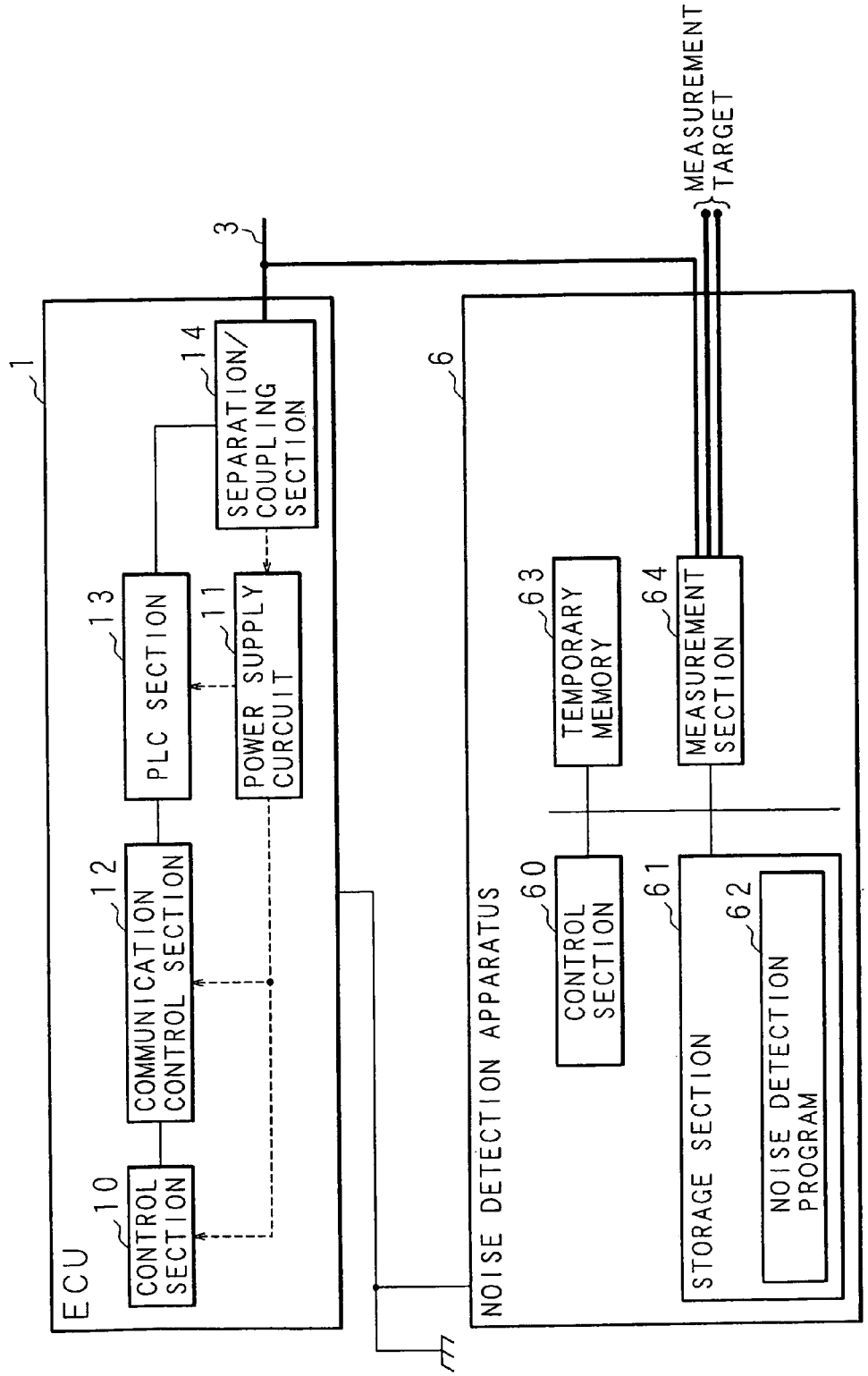
FIG. 7 is a block diagram illustrating internal configurations of an ECU and a noise detection apparatus, which are included in the in-vehicle PLC system according to Embodiment 1.

FIG. 7 is a block diagram illustrating internal configurations of the ECU 1 and the noise detection apparatus 6, which are included in the in-vehicle PLC system according to Embodiment 1. The ECU 1 includes: a control section 10; a power supply circuit 11; a communication control section 12; a power line communication section 13; and a communication signal separation/coupling section 14.

Using a microcomputer, the control section 10 receives supply of electric power via the power supply circuit 11, and controls reception and transmission of data performed by the communication control section 12, or operations of other unillustrated constituent elements. The power supply circuit 11 is connected to the control section 10, the communication control section 12, the power line communication section 13 and other unillustrated constituent elements, and supplies electric power to each of these constituent elements. For instance, the power supply circuit 11 appropriately adjusts a driving voltage of 12 V, for example, which is received from the battery 4 via the power line 3, to a voltage necessary for each of the constituent elements, and then supplies the resulting voltage thereto.

Using a network controller, the communication control section 12 realizes reception and transmission of various pieces of data, including control data, from and to the other ECUs 1, 1, . . . and actuators 2, 2, . . . . The data reception and transmission from and to the other devices by the communication control section 12 of the ECU 1 according to Embodiment 1 are performed in conformance with a FlexRay (registered trademark) protocol. It should be noted that the communication protocol is not limited to FlexRay, but may be CAN (Controller Area Network), LIN (Local Interconnect Network), etc.

The power line communication section 13 is a circuit for implementing the functions of modulating a carrier wave by a signal at the time of transmission, and decoding a signal from a carrier wave at the time of reception. The communication signal separation/coupling section 14 is a circuit for implementing the functions of coupling a carrier wave to the power line 3 at the time of transmission, and separating a carrier wave from the power line 3 at the time of reception. Addition of a power line communication function is enabled by removing an existing communication section from the existing communication control section 12 that performs communication in conformance with FlexRay, and by adding the power line communication section 13 and the communication signal separation/coupling section 14 instead of the existing communication section.

The noise detection apparatus 6 includes: a control section 60; a storage section 61; a temporary storage section 63; and a measurement section 64. Using a CPU (Central Processing Unit), the control section 60 executes noise detection processing based on a noise detection program 62 stored in the storage section 61. Using a nonvolatile memory such as a hard disk, an EEPROM (Electrically Erasable and Programmable Read Only Memory) or a flash memory, the storage section 61 stores the noise detection program 62, and further stores data of a detected noise. Using a memory such as a DRAM (Dynamic Random Access Memory) or an SRAM (Static Random Access Memory), the temporary storage section 63 temporarily stores data generated by processing carried out by the control section 60.

The measurement section 64 measures voltage values in the power line 3 at a predetermined interval (that is sampling interval), and stores the measurement results in the storage section 61 or the temporary storage section 63. The measurement section 64 may have a plurality of terminals so as to be able to measure voltage values at a plurality of measurement points in the power lines 3. The predetermined interval in the measurement is 0.01 μsec (means the sampling frequency is 100 MHz), for example.

It should be noted that for the noise detection apparatus 6, a personal computer may be used, or an FPGA, a DSP, an ASIC, etc., including components for performing functions of the respective constituent elements of the apparatus, may be used with the aim of providing the apparatus exclusively for noise detection.

Figure 8:
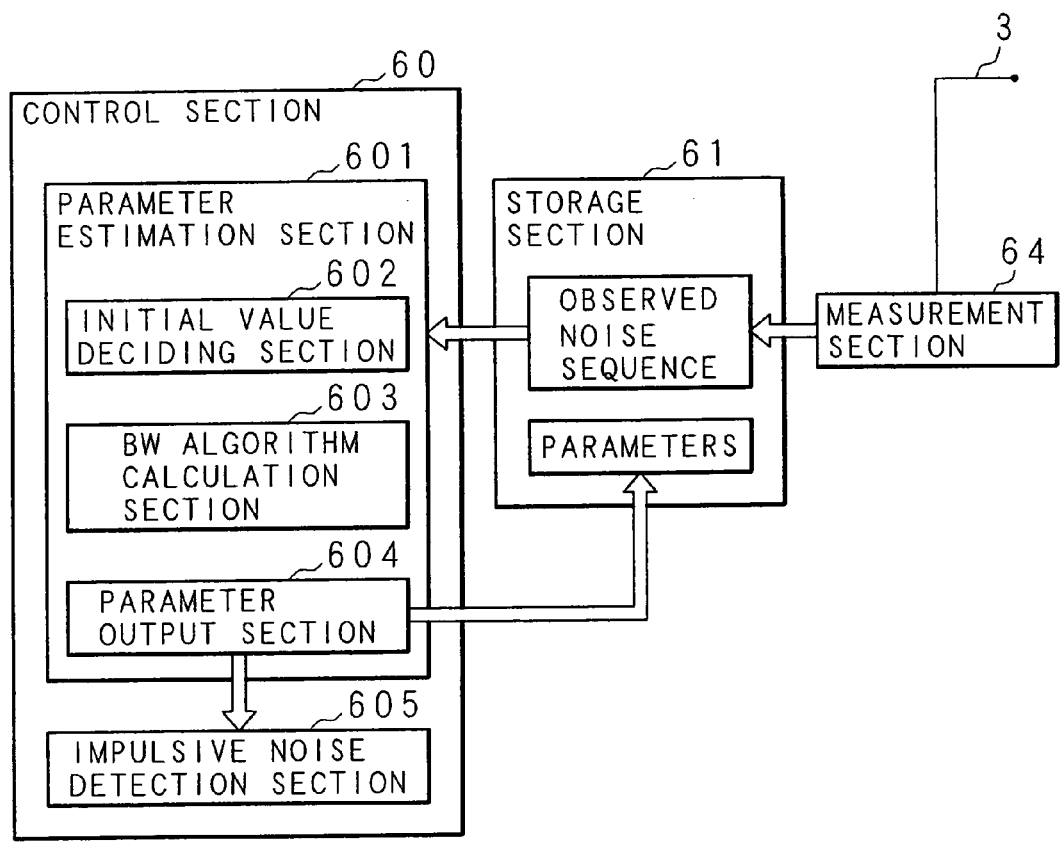
FIG. 8 is a functional block diagram illustrating functions implemented by the noise detection apparatus included in the in-vehicle PLC system according to Embodiment 1.

Based on the noise detection program 62, the control section 60 of the noise detection apparatus 6 performs functions illustrated in FIG. 8, and executes processing for detecting an impulsive noise from voltage values (observed noise sequence) measured and obtained for each predetermined interval by the measurement section 64. FIG. 8 is a functional block diagram illustrating functions implemented by the noise detection apparatus 6 included in the in-vehicle PLC system according to Embodiment 1.

Based on the noise detection program 62, the control section 60 functions as a parameter estimation section 601 and an impulsive noise detection section 605. Functions of the parameter estimation section 601 include; a function of an initial value deciding section 602 for deciding an initial value of a parameter; a function of a BW algorithm calculation section 603 for calculating, using a BW algorithm, a noise characteristic for maximization of the likelihood of the observed noise sequence; and a function of a parameter output section 604.

From the observed noise sequence obtained by the measurement section 64, the control section 60 extracts voltage value data for a predetermined period (measurement periodical unit). For the extracted voltage value data, the control section 60 estimates and outputs a parameter indicative of a noise characteristic, and estimates and outputs a state sequence from the parameter by the functions of the parameter estimation section 601. Using the estimated state sequence, the control section 60 determines whether or not an impulsive noise is generated for each section (in units of the predetermined interval=0.01 μsec, which may include one or a plurality of the predetermined intervals) in the period by the function of the impulsive noise detection section 605.

Using the functions of the parameter estimation section 601, the control section 60 obtains parameters $\theta=(Q, N)$ including four state transition probabilities $q_{00}$, $q_{01}$, $q_{11}$ and $q_{10}$ (=Q) and $N=[\sigma_0^2, \sigma_1^2]^T$, and further obtains, from the parameters $\theta$, the following parameters:

Channel Memory $\gamma$: $\gamma=1/(q_{01}+q_{10})$

Impulsive noise occurrence probability $P_1$: $P_1=q_{01}/q_{01}+q_{10}$

Impulse-To-Background Noise Ratio R: $R=\sigma_I^2/\sigma_G^2=(\sigma_1^2-\sigma_0^2)/\sigma_0^2$ Background Noise Power $\sigma_G^2$: $\sigma_G^2=\sigma_0^2$ In order to obtain the above parameters, the control section 60 first obtains initial values of the parameters $\theta$, i.e., initial values of a state transition probability matrix Q ($=q_{ss'}$, s, s'=0, 1) and average noise power N ($=[\sigma_0^2, \sigma_1^2]^T$), by the function of the initial value deciding section 602. In this case, the control section 60 decides the initial values based on the foregoing formulas 14 to 16. The control section 60 calculates the parameters $\theta$ (state transition probabilities and state noise power) for maximization of the likelihood of the observed noise sequence by the function of the BW algorithm calculation section 603. The calculation of the parameters $\theta$ for maximization of the likelihood of the observed noise sequence is performed based on the foregoing formulas 10 to 12. Based on estimated values of the parameters $\theta$ for maximization of the likelihood of the observed noise sequence, calculated by the function of the BW algorithm calculation section 603, the control section 60 obtains the foregoing parameters (i.e., the channel memory $\gamma$, impulsive noise occurrence probability $P_1$, impulse-to-background noise ratio R, and background noise power. $\sigma_G^2$) and stores these parameters in the storage section 61 by the parameter output section 604. Further, the control section 60 obtains an estimated state sequence and outputs the estimated state sequence to the impulsive noise detection section 605 by the parameter output section 604.

Figure 9:
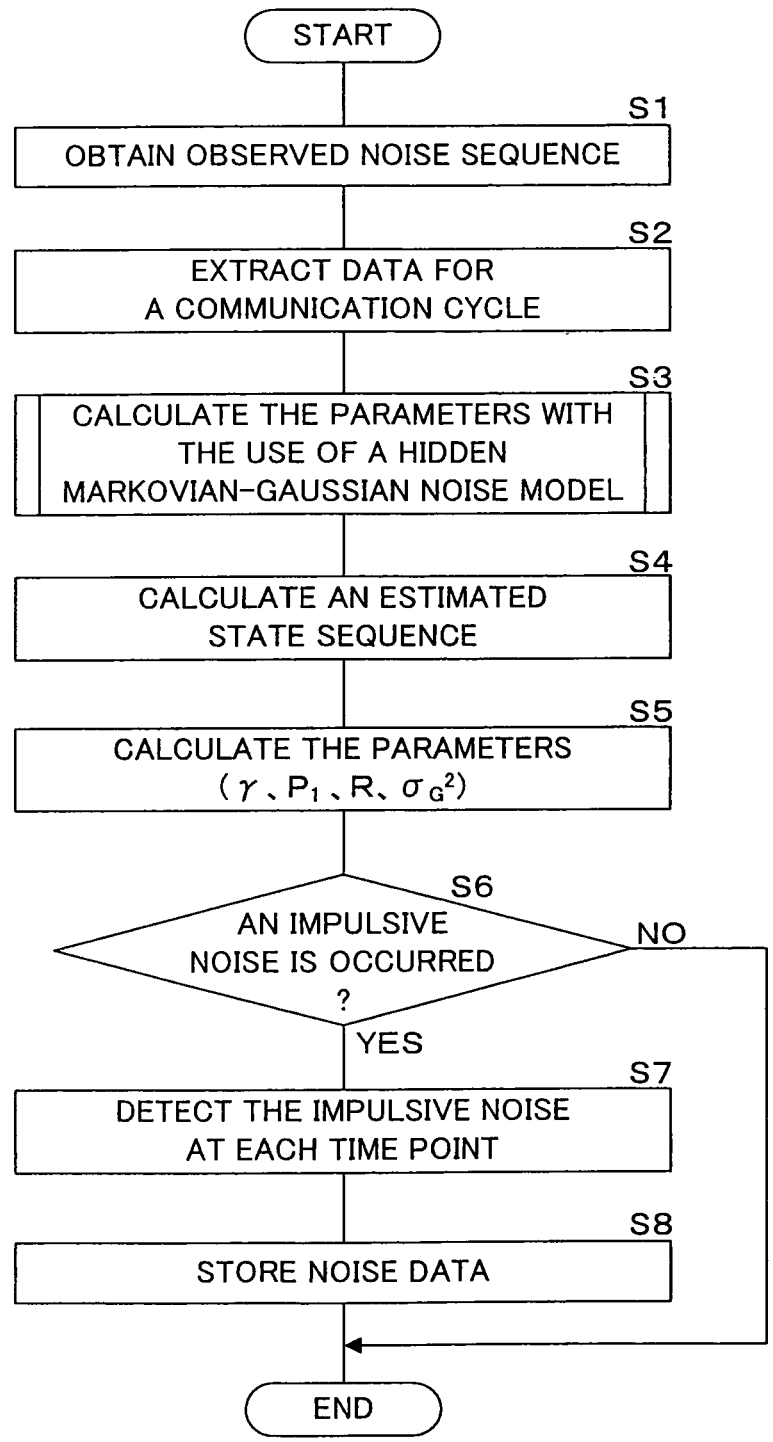
FIG. 9 is a flow chart illustrating an example of processing executed by the noise detection apparatus according to Embodiment 1.

The process of impulsive noise detection processing performed by the control section 60 will be described in detail with reference to a flow chart. FIG. 9 is the flow chart illustrating an example of processing executed by the noise detection apparatus 6 according to Embodiment 1.

The control section 60 obtains measurement data (observed noise sequence) by the measurement section 64 (Step S1). Then, the control section 60 extracts data for a predetermined period, included in the obtained measurement data, and gives the extracted data to the parameter estimation section 601 (Step S2). In this case, the period is provided in units of communication cycles of FlexRay by way of example, and is 1 msec in Embodiment 1. As mentioned above, the interval of measurement of voltage values by the measurement section 64 is 0.01 μsec, and therefore, the extracted data is a sequence of voltage values for 100000 samples (K=100000).

Based on the extracted data extracted for 1 msec (K=100000 samples of voltage values on the time series), the control section 60 calculates the parameters θ (noise characteristics) for maximization of the likelihood of the observed noise sequence with the use of a hidden Markovian-Gaussian noise model by the functions of the initial value deciding section 602 and BW algorithm calculation section 603 of the parameter estimation section 601 (Step S3). The calculation of the respective parameters indicative of the noise characteristics will be described later in detail with reference to a flow chart of FIG. 10.

Based on the parameters θ calculated in Step S3, the control section 60 estimates and calculates an estimated state sequence by the function of the parameter output section 604 of the parameter estimation section 601 (Step S4), and further obtains the parameters (i.e., the channel memory γ, impulsive noise occurrence probability $P_1$, impulse-to-background noise ratio R, and background noise power $\sigma_G^2$) indicative of the noise characteristics (Step S5).

Based on the noise characteristics calculated in Step S5, the control section 60 determines, for each period of 1 msec, whether or not an impulsive noise is generated in this period by the function of the impulsive noise detection section 605 (Step S6). It should be noted that determinations are made based on the parameters (γ, $P_1$, R, and $\sigma_G^2$) as follows. For example, the determination is made based on whether or not the channel memory γ is higher than a predetermined value (e.g., 10). Furthermore, when the impulsive noise occurrence probability $P_1$ is equal to or higher than 0.5, the control section 60 can determine by the function of the impulsive noise detection section 605 that the obtained observed noise sequence has a white Gaussian noise but has no impulsive noise.

When it is determined that no impulsive noise is generated (S6: NO), the control section 60 ends the detection processing without any further step. It should be noted that Steps S5 and S6 are not absolutely necessary. In other words, the parameters (i.e., the channel memory γ, impulsive noise occurrence probability $P_1$, impulsive-to-background noise ratio R, and background noise power. $\sigma_G^2$) do not necessarily have to be calculated, and the presence or absence of generation of an impulsive noise does not necessarily have to be determined for each period.

When it is determined by the function of the impulsive noise detection section 605 that an impulsive noise is generated (S6: YES), the control section 60 detects, based on the estimated state sequence, the impulsive noise at each predetermined interval during the period included in the extracted data (Step S7), and stores noise data including the detected result in the storage section 61 (Step S8), thus ending the processing. In Step S7, an impulsive noise is detected for each predetermined interval (which is 0.01 μsec in Embodiment 1). However, the present invention is not limited to this, but an impulsive noise may be detected on a bit-by-bit basis by handling two or more samples as a single bit.

The noise data stored in Step S8 may be the noise characteristics (θ, or γ, $P_1$, R and $\sigma_G^2$) calculated in Step S3 or Step S5, or may include the extracted data (observed noise sequence). Moreover, the noise data may include the state sequence estimated in Step S4. This is useful, for example, in reproducing an impulsive noise using the noise data.

FIG. 10 is a flow chart illustrating an example of a procedure of processing for calculating the parameters θ (noise characteristics) for maximization of the likelihood of an observed noise sequence based on a BW algorithm using a moment method, executed by the functions of the parameter estimation section 601 of the noise detection apparatus 6 according to Embodiment 1. The processing procedure illustrated in FIG. 10 is associated with the details of Step S3 in the flow chart of FIG. 9.

From the given extracted data, i.e., from the voltage values for K=100000 samples, the control section 60 calculates three moments a, b and c by the function of the initial value deciding section 602 using the foregoing formula 14 based on the moment method (Step S301)

Then, the control section 60 obtains an initial value of the noise power N ($=[\sigma_0^2, \sigma_1^2]^T$, an estimated value symbol of which is abbreviated) by the function of the initial value deciding section 602. Therefore, the control section 60 calculates standard deviations $\sigma_0$ and $\sigma_1$ of distribution of noises in the respective states by the formulas 15 and 16 based on the three moments a, b and c calculated in Step S301 (Step S302). From the standard deviations $\sigma_0$ and $\sigma_1$ of distribution of noises in the respective states, the control section 60 calculates an initial estimated value of the noise power N of the extracted data by the function of the initial value deciding section 602 (Step S303).

Next, the control section 60 obtains an initial value of the state transition probability matrix Q by the function of the initial value deciding section 602. Therefore, from the estimated values of the standard deviations $\sigma_0$ and $\sigma_1$ of distribution of noises in the respective states calculated by the formulas 15 and 16 in Step S302, the control section 60 calculates a threshold Λ for each voltage value of 100000 samples of the extracted data (observed noise sequence) by using the formula 18 (Step S304). Then, using the formula 18, the control section 60 calculates an estimated state matrix s(k=1 to K) by making a comparison between: each voltage value of 100000 samples of the extracted data; and the calculated threshold Λ (Step S305). Furthermore, from the calculated estimated state matrix s(k=1 to K), the control section 60 calculates an initial estimated value of the matrix Q of the four state transition probabilities (Step S306). Specifically, from the estimated state matrix s(k=1 to K), the control section 60 obtains each of the four numbers $A_{ss'}$ of state transitions from the state s (=0 or 1) to the state s' (=0 or 1), and obtains the number $A_s$ of each state s (=0 or 1), thus obtaining the state transition probability initial value $q_{ss'}$ ($q_{ss'}=A_{ss'}/A_s$).

Using the function of the initial value deciding section 602, the control section 60 decides, as the initial estimated values of the parameters θ, the initial estimated values of Q and N calculated in Steps S303 and S306 (Step S307).

Next, utilizing the initial values decided in Step S307, the control section 60 calculates the parameters θ (noise characteristics) for maximization of the likelihood of the observed noise sequence by the function of the BW algorithm calculation section 603 with the use of the BW algorithm and MAP estimation. In other words, the parameters θ to be calculated are values for increasing the likelihood of the obtained observed noise sequence for the given initial values. More specifically, the control section 60 first assigns 0 into the number of calculations 1 (Step S308), adds 1 thereto (Step S309), and calculates a forward state probability (Forward probability) $\alpha_k(s)$ and a backward state probability (Backward probability) $\beta_k(s)$ based on the foregoing formulas 1 to 6 (Step S310).

Using the forward state probability $\alpha_k(s)$ and backward state probability $\beta_k(s)$ calculated in Step S310, the control section 60 calculates the parameters θ (estimated values of the state transition probability matrix Q and noise power N) by the foregoing formulas 10 and 11 (Step S311).

For the estimated values of the parameters θ derived in Step S311, the control section 60 determines, using the function of the BW algorithm calculation section 603, whether or not a logarithmic likelihood is higher than a threshold Δ, or whether or not the number of calculations l is equal to or higher than an upper limit value L (Step S312). When the logarithmic likelihood is equal to or lower than the threshold Δ and the number of calculations l is below the upper limit value L (S312: NO), the control section 60 returns the processing to Step S309 and repeats the processing in order to obtain a higher likelihood value.

When it is determined by the function of the BW algorithm calculation section 603 that for the estimated values of the parameters θ derived in Step S311, the logarithmic likelihood is higher than the threshold Δ or the number of calculations l is equal to or higher than the upper limit value L (S312: YES), the control section 60 ends the processing for obtaining the parameters θ for maximization of the likelihood of the observed noise sequence, and returns the processing to Step S4 in the flow chart of FIG. 9.

As described above, the parameters θ (=(Q, N)) of the hidden Markovian-Gaussian noise model, calculated by the parameter estimation section 601 of the control section 60, are calculated in such a manner that subjective initial values, thresholds or the like given by human as detection conditions are removed to the extent possible. Using the estimated state sequence estimated in Step S4 of the flow chart of FIG. 9 (by the formulas 5 to 8), an impulsive noise can be detected with high accuracy.

The accuracy of detection of an impulsive noise by the noise detection apparatus 6 according to Embodiment 1 was evaluated by obtaining a detection error probability. The detection error probability was measured by using a known two-state hidden Markovian-Gaussian noise. First, the channel memory γ, impulsive noise occurrence probability $P_1$ and impulsive-to-background noise ratio R were given, and a state sequence s(k=1 to K (=20000)) and a noise sequence were generated. Using the generated state sequence s as a true state sequence, impulsive noise detection was performed on the generated noise sequence by the noise detection apparatus 6 according to Embodiment 1. Specifically, the impulsive noise detection was performed by the following method. For purposes of comparison, the threshold Λ calculated by the foregoing formulas 14 to 18 was used, and the detection was performed based only on whether or not each voltage value of the noise sequence was higher than the threshold Λ, thus detecting an impulsive noise when the value is higher than the threshold Λ (this method will be referred to as a "Moment-ML method"). In the Moment-ML method, Steps S307 to S312 are not performed.

FIGS. 11 and 13 are graphs each illustrating a detection error probability caused by the noise detection apparatus 6 according to Embodiment 1.

In FIG. 11, the horizontal axis represents a change in the channel memory γ, and the vertical axis represents a detection error probability thereof. Fixed values are given to the impulsive noise occurrence probability $P_1$ and the impulse-to-background noise ratio R so that $P_1$=0.01, and R=100. FIG. 11 illustrates the error probability of the channel memory γ calculated for noise sequences generated with the channel memory γ changed from 1 to 100. The 2 lines in FIG. 11 indicate the detection error probability caused by the Moment-ML method, and the detection error probability caused by the noise detection apparatus 6 according to Embodiment 1 (which is represented by "BW-MAP" in FIGS. 11 to 13), respectively.

Figure 12:
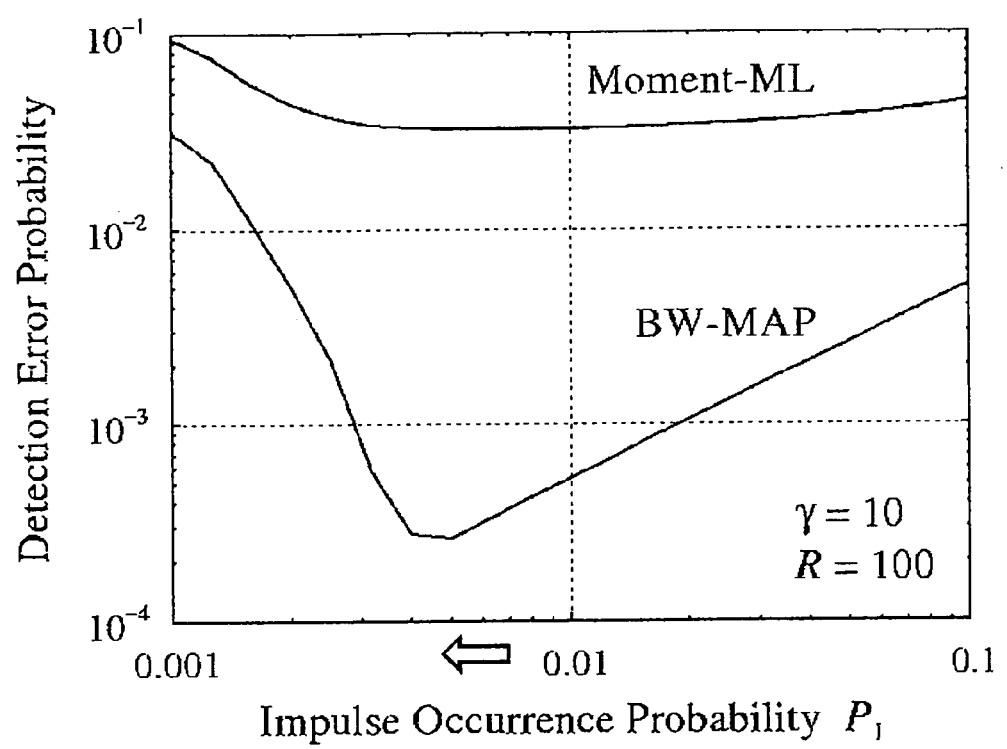
FIG. 12 is a graph illustrating a detection error probability caused by the noise detection apparatus according to Embodiment 1.

In FIG. 12, the horizontal axis represents a change in the impulsive noise occurrence probability $P_1$, and the vertical axis represents a detection error probability thereof. Fixed values are given to the channel memory γ and the impulse-to-background noise ratio R so that γ=10, and R=100. FIG. 12 illustrates the error probability of the impulsive noise occurrence probability $P_1$ calculated for noise sequences generated with the impulsive noise occurrence probability $P_1$ changed from 0.001 to 0.01. The 2 lines in FIG. 12 indicate the detection error probability caused by the Moment-ML method, and the detection error probability caused by the noise detection apparatus 6 according to Embodiment 1, respectively.

In FIG. 13, the horizontal axis represents a change in the impulsive-to-background noise ratio R, and the vertical axis represents a detection error probability thereof. Fixed values are given to the channel memory γ and the impulsive noise occurrence probability $P_1$ so that γ=10, and $P_1$=0.01. FIG. 13 illustrates the error probability of the impulsive-to-background noise ratio R calculated for noise sequences generated with the impulsive-to-background noise ratio R changed from 10 to 1000. The 2 lines in FIG. 13 indicate the detection error probability caused by the Moment-ML method, and the detection error probability caused by the noise detection apparatus 6 according to Embodiment 1, respectively.

As illustrated in the graphs of FIGS. 11 to 13, the impulsive noise detection method, performed by the noise detection apparatus 6 according to Embodiment 1 using the BW algorithm and MAP estimation, exhibits clear superiority. It should be noted that as illustrated in FIG. 13, the detection error probability is monotonously decreased with respect to an increase in the impulse-to-background noise ratio R. This means that the noise power $\sigma_I^2$ of an impulsive noise is increased with respect to the background noise power $\sigma_G^2$, thus increasing the accuracy of distinction between a period during which an impulsive noise is generated and a period during which no impulsive noise is generated. On the other hand, as illustrated in FIGS. 11 and 12, in the impulsive noise detection method performed by the noise detection apparatus 6 according to Embodiment 1, minimum values of the detection error probabilities exist for the changes in the channel memory γ and the impulsive noise occurrence probability $P_1$, and therefore, it can be seen that there exist the channel memory γ and impulsive noise occurrence probability $P_1$, which enable accurate detection of generation of an impulsive noise. In this case, since the accuracy of estimation for the channel memory γ and impulsive noise occurrence probability $P_1$ depends on an extracted data length (K) in the observed noise sequence, analysis has to be conducted in consideration of K.

Figure 14:
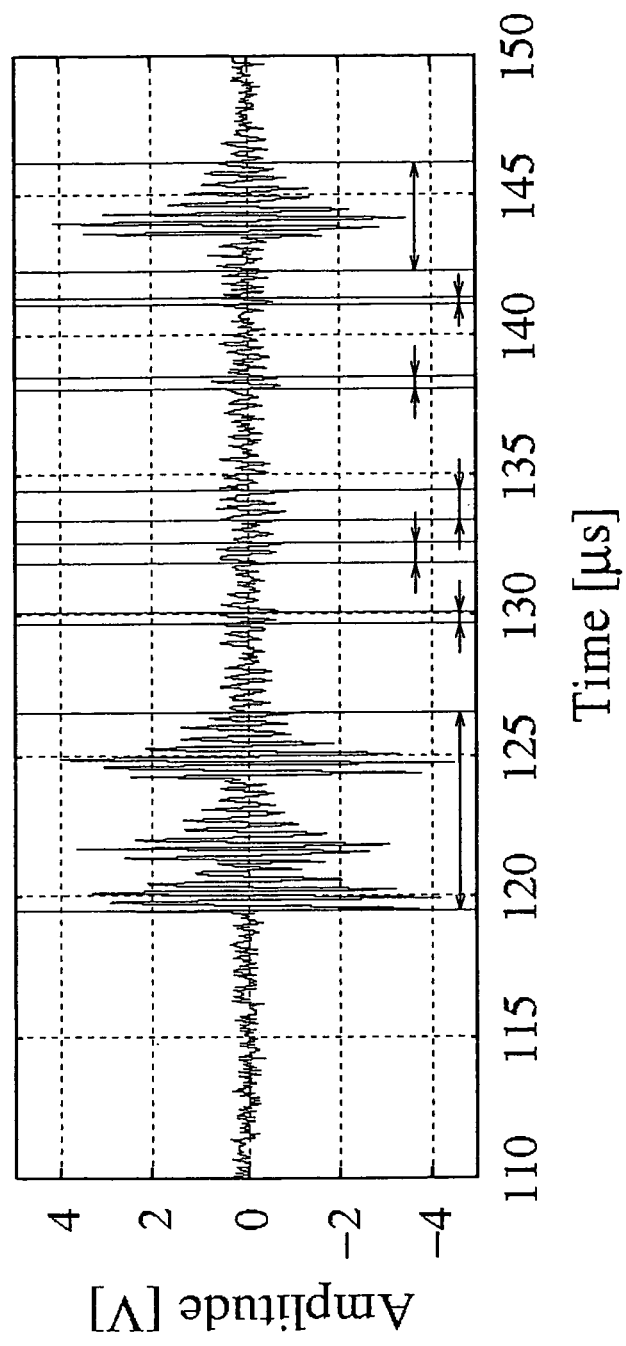
FIG. 14 is a waveform diagram illustrating impulsive noise detection results obtained by the noise detection apparatus according to Embodiment 1.

FIG. 14 is a waveform diagram illustrating impulsive noise detection results obtained by the noise detection apparatus 6 according to Embodiment 1. FIG. 14 corresponds to a waveform diagram of noises in the in-vehicle PLC system illustrated in FIGS. 38 to 40. Sections indicated by arrows in FIG. 14 are detected as sections in which generation of impulsive noises is detected by the noise detection apparatus 6. The accuracy of detection of a "state in which an impulsive noise in generated" is increased as compared with a case where a conventional method of only making a comparison between an amplitude value and a threshold, for example, is performed.

When a comparison is made between the method for detecting, from observed voltage values, an impulsive noise based on a threshold by the Moment-ML method, and the detection method performed by the noise detection apparatus 6 according to Embodiment 1, it can be seen that accurate impulsive noise estimation and detection are enabled by the noise detection apparatus 6 as illustrated in FIG. 15. FIG. 15 is an explanatory diagram illustrating examples of noise characteristics of an impulsive noise detected by the noise detection apparatus 6 according to Embodiment 1. For purposes of comparison, exemplary details of the respective parameters estimated by the foregoing Moment-ML method are also illustrated in FIG. 15.

The noise characteristic parameters estimated and calculated for an impulsive noise detected by the noise detection apparatus 6 according to Embodiment 1 are preferably stored in the storage section 61. These pieces of information are useful as impulsive noise information obtained automatically from statistical properties of the observed noise sequence.

Embodiment 2

In Embodiment 2, a Determination is Further Made Using statistical information in the process of impulsive noise detection processing performed by the noise detection apparatus 6 described in Embodiment 1. In other words, measurement data including only a Gaussian noise is not subjected to an estimation process that uses a BW algorithm and MAP estimation. Thus; the detection accuracy can be increased.

Configurations of an in-vehicle PLC system and a noise detection apparatus 6 according to Embodiment 2 are similar to those of the in-vehicle PLC system and noise detection apparatus 6 according to Embodiment 1, and Embodiment 2 differs from Embodiment 1 only in details of the processing executed by the noise detection apparatus 6. Accordingly, in the following description, constituent elements common to those of Embodiment 1 are identified by the same reference characters, and detailed description thereof will be omitted.

Figure 16:
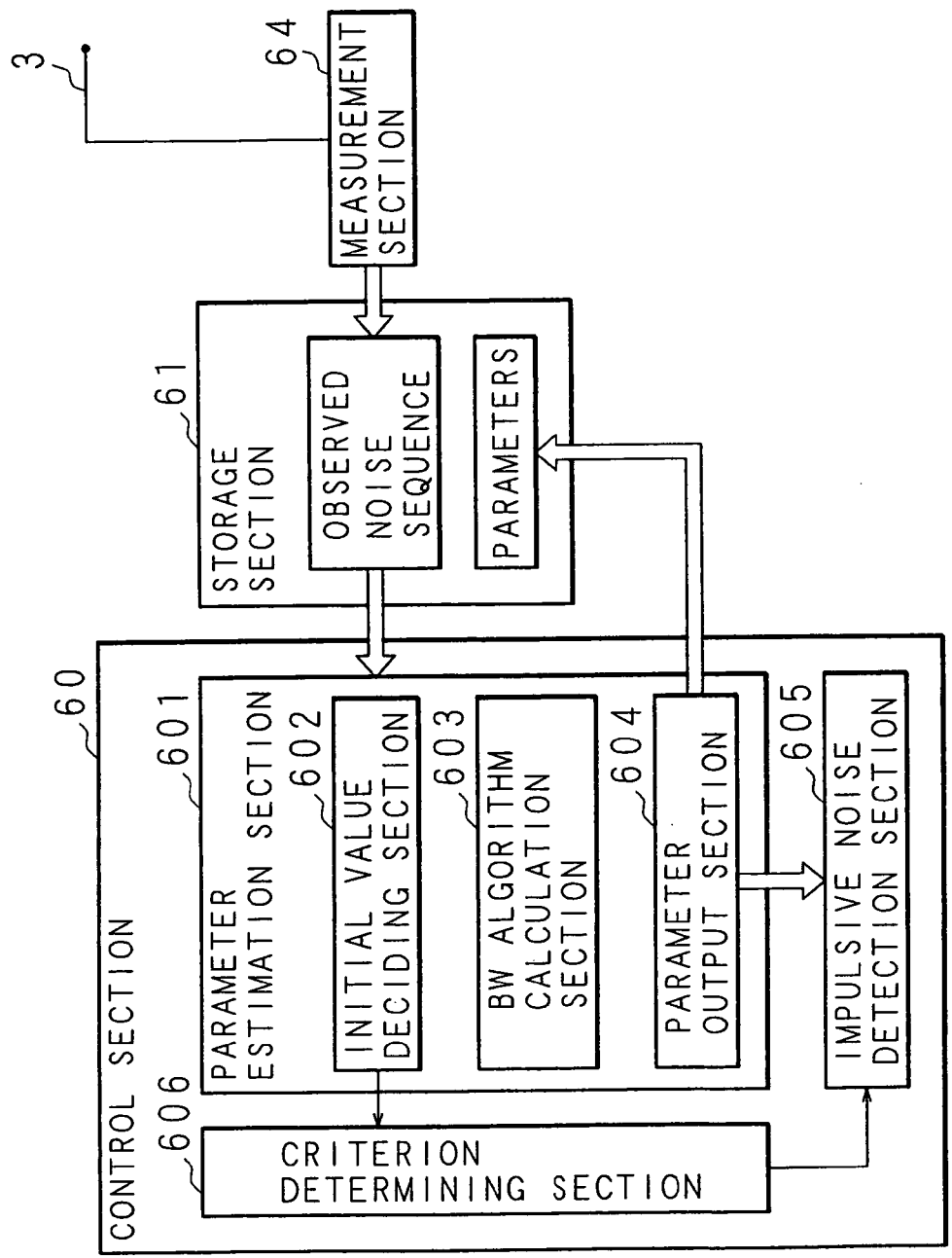
FIG. 16 is a functional block diagram illustrating functions implemented by a noise detection apparatus according to Embodiment 2.

FIG. 16 is a functional block diagram illustrating functions implemented by the noise detection apparatus 6 according to Embodiment 2. Based on the noise detection program 62, the control section 60 functions as the parameter estimation section 601 and the impulsive noise detection section 605, and further functions as an information criterion determining section 606. Using statistical information that is based on parameters calculated from voltage value data extracted from an observed noise sequence, the control section 60 determines the presence or absence of an impulsive noise by the function of the information criterion determining section 606 prior to a process performed based on a BW algorithm. When it is determined by the function of the information criterion determining section 606 that no impulsive noise exists, the control section 60 skips the process performed by the BW algorithm calculation section 603. In this case, the control section 60 obtains an estimated state sequence and noise power based on the assumption that only a white Gaussian noise is included and outputs the estimated state sequence and noise power to the impulsive noise detection section 605 by the function of the parameter output section 604.

Figure 17:
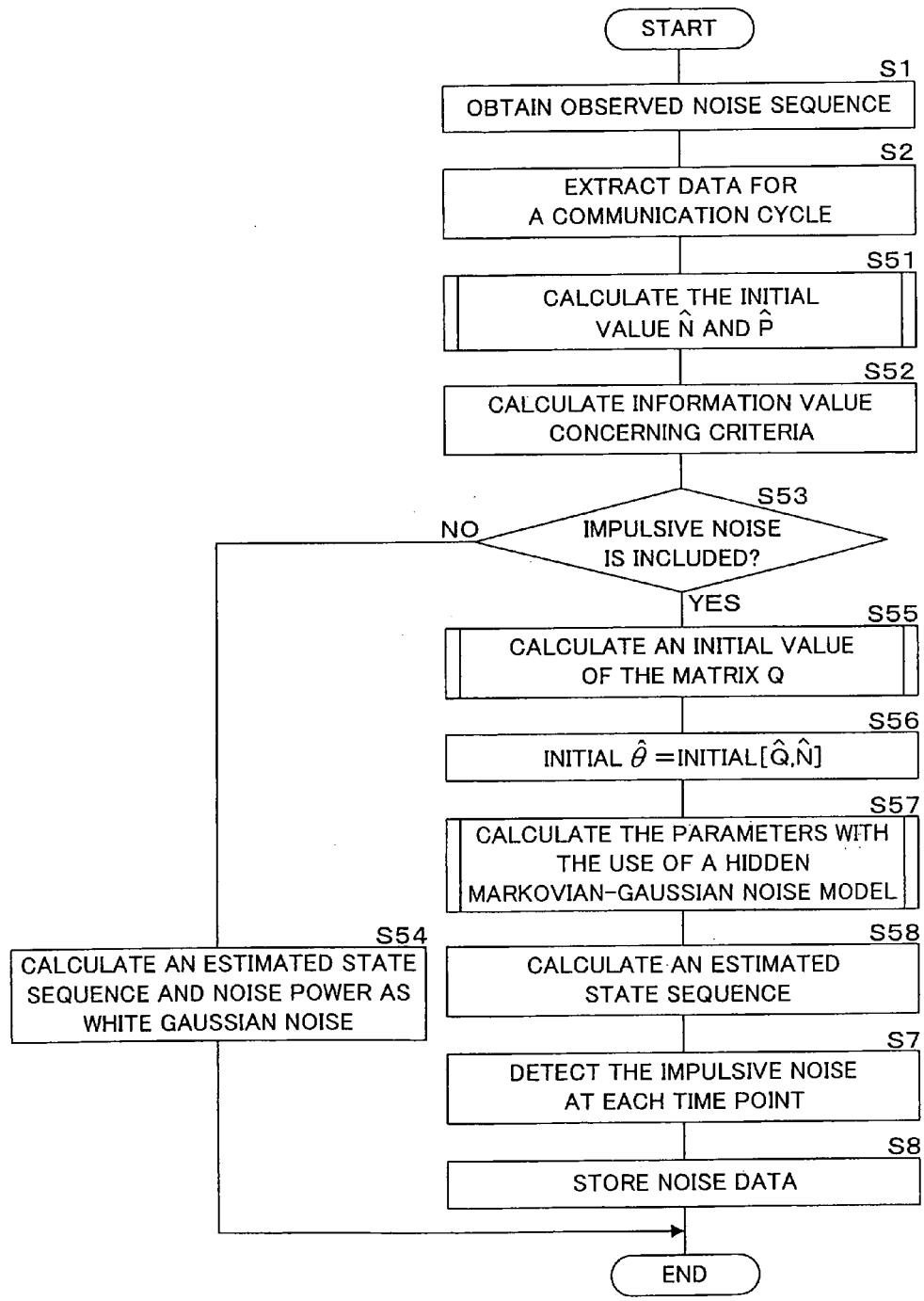
FIG. 17 is a flow chart illustrating an example of processing executed by the noise detection apparatus according to Embodiment 2.

FIG. 17 is a flow chart illustrating an example of processing executed by the noise detection apparatus 6 according to Embodiment 2. It should be noted that, of the following processing steps, processing steps common to those illustrated in the flow chart of FIG. 9 according to Embodiment 1 are identified by the same step numbers, and detailed description thereof will be omitted.

Based on extracted data for 1 msec extracted in Step S2, the control section 60 obtains an initial estimated value of a noise power matrix N $(=[\sigma_0^2, \sigma_1^2]^T)$ and an initial estimated value of a steady-state probability matrix P $(=[P_0 P_1]^T)$ of each state by the initial value deciding section 602 of the parameter estimation section 601 using a moment method (Step S51). It should be noted that in Embodiment 2, a sampling frequency is set at 200 MHz, and therefore, the extracted data is voltage values obtained on the time series for K=200000 samples.

From the initial values calculated in Step S51, the control section 60 calculates, using the function of the information criterion determining section 606, information concerning a criterion for macroscopically determining whether or not an impulsive noise is included in the extracted data (Step S52). Details of Step S52 will be described later.

Based on the information calculated in Step S52, the control section 60 determines whether or not an impulsive noise is included in the extracted data by the function of the information criterion determining section 606 (Step S53). Specifically, it is determined in Step S53 whether or not an aftermentioned fifth criterion is satisfied, i.e., whether or not the initial estimated value $P_1$ of the steady-state probability of the foregoing impulse-generated state falls within the range of $0 \leq P_1 < 0.5$ (first criterion) and whether or not an after-mentioned formula 32 (fifth criterion) is satisfied.

When it is determined in Step S53 that no impulsive noise is included in the extracted data (S53: NO), the control section 60 estimates and calculates an estimated state sequence and calculates a noise distribution o based on the assumption that a noise included in the extracted data is a white Gaussian noise (Step S54), thus ending the processing. It should be noted that the control section 60 may store, in the storage section 61, the estimated state sequence and noise distribution a estimated and calculated based on the assumption that the noise is a white Gaussian noise.

On the other hand, when it is determined in Step S53 that an impulsive noise is included in the extracted data (S53: YES), the control section 60 obtains an initial estimated value of a matrix Q of four state transition probabilities based on an ML (maximum likelihood) method from the initial estimated value of the noise power N calculated in Step S51 (Step S55).

Next, from the initial values calculated in Steps S51 and S55 by the function of the initial value deciding section 602, the control section 60 decides the initial estimated values of Q and N as initial estimated values of the parameters θ (Step S56).

Using the initial values decided in Step S56, the control section 60 calculates the parameters θ (noise characteristics) for maximization of the likelihood of the observed noise sequence based on the BW algorithm (Step S57). Next, based on the parameters θ=(Q, N) calculated in Step S57, the control section 60 estimates and calculates an estimated state sequence (Step S58).

Then, based on the estimated and calculated state sequence, the control section 60 detects an impulsive noise at each time point (Step S7), and stores the impulsive noises in the storage section 61 (Step S8), thus ending the processing.

It should be noted that the calculation of the information in Step S52 and the step of determining whether or not an impulsive noise is included in the extracted data in Step S53 may be carried out in a different order. For example, when not only the after-mentioned criteria but also the initial value of the matrix Q are used, the calculation step in Step S52 is carried out after Step S55 or Step S56.

Regarding Step S52, examples of criteria for determining whether or not an impulsive noise is included in the extracted data include the first to fifth criteria. It should be noted that in Embodiment 2, both of the first and fifth criteria are adopted as mentioned above. In this embodiment, the first to fifth criteria are as follows.

First Criterion: Rarity of Impulsive Noise $$0 \le P_1 < 0.5$$

The first criterion is provided based on the assumption that the steady-state probability is less than ½ from the rarity of an impulsive noise because an impulsive noise is not frequently generated but is accidentally generated.

Second Criterion: Logarithmic Likelihood

For the second criterion, in addition to the first criterion, logarithmic likelihoods of amplitude probability distributions of observed noise sequences are used. A logarithmic likelihood is given when the observed noise sequence, i.e., the extracted data, is a sequence including only a white Gaussian noise and the amplitude probability distribution is a Gaussian distribution. Another logarithmic likelihood is given when the extracted data is a sequence also including an impulsive noise and the amplitude probability distribution is a mixture Gaussian distribution. A comparison is made between the former logarithmic likelihood and the latter logarithmic likelihood to determine which logarithmic likelihood is higher. Then, when the latter logarithmic likelihood, i.e., the logarithmic likelihood of the amplitude probability distribution that is a mixture Gaussian distribution, is higher than the former logarithmic likelihood, i.e., the logarithmic likelihood of the amplitude probability distribution that is a Gaussian distribution, there is provided the criterion for determining that the extracted data includes an impulsive noise.

In this case, the amplitude probability distribution of the observed noise sequence n(k=1 to K) can be expressed by the following formula 21, and the logarithmic likelihood thereof is defined by the following formula 22.

[Exp. 16]

$$p(n_k | \hat{\theta}) \quad (21)$$

$$l(\hat{\theta}) = E_k[\ln p(n_k | \hat{\theta})] \quad (22)$$

The logarithmic likelihood of a mixture Gaussian distribution and that of a Gaussian distribution are each expressed by the following formula 23. It should be noted that the logarithmic likelihood of a Gaussian distribution is represented as in the following formula 24.

[Exp. 17]

$$l_{GM}(\hat{\theta}_{GM}) = E_K[\ln p_{GM}(n_k | \hat{\theta}_{GM})] \quad (23)$$

$$l_G(\hat{\sigma}^2) = E_K[\ln p_G(n_k | \hat{\sigma}^2)]$$

$$l_G(\hat{\sigma}^2) = -\frac{1}{2}(1 + \ln(2\pi\hat{\sigma}^2)) \quad (24)$$

When the latter logarithmic likelihood, i.e., the logarithmic likelihood of the amplitude probability distribution that is a mixture Gaussian distribution, is higher than the former logarithmic likelihood, i.e., the logarithmic likelihood of the amplitude probability distribution that is a Gaussian distribution, it is determined that the extracted data includes an impulsive noise. Therefore, satisfaction of the following formula 25 by the mixture Gaussian distribution can be defined as the second criterion.

[Exp. 18]

$$l_{GM}(\hat{\theta}_{GM}) > l_G(\hat{\sigma}^2) \quad (25)$$

$$\therefore l_{GM}(\hat{\theta}_{GM}) > -\frac{1}{2}(1 + \ln(2\pi\hat{\sigma}^2))$$

Third Criterion: Takeuchi Information Criterion (TIC)

For the third criterion, in addition to the first criterion, TIC, well known as an index for evaluating the likelihood of a model, is used. The initial estimated values of the parameters θ, estimated and calculated using an ML (maximum likelihood) method (i.e., Moment-ML method) that utilizes a moment method, are not estimated values that are based on a true distribution. TIC is known as an information criterion to which a correction term for a deviation from the true distribution is added.

The correction term of TIC when the parameters θ estimated by the ML method and the amplitude probability distribution of the observed noise sequence n(k=1 to K) are given is defined by the following formula 26. It should be noted that Tr in the formula 26 represents the trace of a matrix, and I(θ) and J(θ) are p×p Fisher information matrices defined by the following formulas 27 and 28, respectively. It should be noted that p in the p×p Fisher information matrices represents the number of free parameters included in the parameters θ of the model.

[Exp. 19]

$$c(\hat{\theta}) = Tr(I(\hat{\theta})J^{-1}(\hat{\theta})) \quad (26)$$

$$I(\hat{\theta}) = E_K\left[\frac{\partial \ln p(n_k | \theta)}{\partial \theta} \frac{\partial \ln p(n_k | \theta)}{\partial \theta^T}\right]\bigg|_{\theta=\hat{\theta}} \quad (27)$$

$$J(\hat{\theta}) = -E_K\left[\frac{\partial^2 \ln p(n_k | \theta)}{\partial \theta \partial \theta^T}\right]\bigg|_{\theta=\hat{\theta}} \quad (28)$$

In the third criterion that uses TIC, the value of TIC, is given when the extracted data is a sequence including only a white Gaussian noise and the amplitude probability distribution is a Gaussian distribution, the value of $TIC_{gm}$ is given when the extracted data includes an impulsive noise and the amplitude probability distribution is a mixture Gaussian distribution, and a comparison is made between the values of $TIC_g$ and $TIC_{gm}$ to determine which value is higher. Then, when $TIC_g > TIC_{gm}$, there is provided the criterion for determining that no impulsive noise is included in the extracted data, but when $TIC_g < TIC_{gm}$, there is provided the criterion for determining that an impulsive noise is included in the extracted data.

Accordingly, to be more specific, satisfaction of the following formula 29 by the logarithmic likelihood of a mixture Gaussian distribution and the value resulting from addition of the correction term thereof can be defined as the third criterion.

[Exp. 20]

$$l_{GM}(\hat{\theta}_{GM}) - \frac{c_{GM}(\hat{\theta}_{GM})}{K} > -\frac{1}{2}\left(\frac{K-1}{K} + \ln(2\pi\hat{\sigma}^2) + \frac{E_K[n_k^4]}{n^2\hat{\sigma}^4}\right) \quad (29)$$

$c_{GM}(\hat{\theta}_{GM})$: Correction Term of TIC for Mixture Gaussian Distribution Fourth Criterion: Akaike Information Criterion (AIC)

For the fourth criterion, in addition to the first criterion, AIC is used. For the correction term of TIC of the third criterion, a process for a sample mean $E_k$, which is based on an empirical distribution, is performed on the Fisher information matrices. Therefore, instability is caused due to numerical calculation of the sample mean process. An Akaike information criterion (AIC), which removes such instability resulting from numerical calculation, is known. When modeled probability density functions $p(n_k|\theta)$ include a true probability density function, the Fisher information matrices satisfy $I(\theta_0)=J(\theta_0)$, where $\theta_0$ represents an ML estimated value from the true distribution. Hence, in AIC, a correction term $c(\theta)$ for the amplitude probability distribution of the observed noise sequence n(k=1 to K) is set as p (formula 30).

[Exp. 21]

$$c(\hat{\theta}) = p \quad (30)$$

Thus, to be more specific, satisfaction of the following formula 31 can be defined as the fourth criterion in AIC.

[Exp. 22]

$$l_{GM}(\hat{\theta}_{GM}) - \frac{3}{K} > -\frac{1}{2}\left(\frac{K+2}{K} + \ln(2\pi\hat{\sigma}^2)\right) \quad (31)$$

Fifth Criterion: Criterion Defined by Number of Free Parameters

For the fifth criterion, in addition to the first criterion, attention is given to the number of free parameters which serves as a correction term of AIC, and a criterion is defined by utilizing the number of free parameters. When a mixture Gaussian distribution includes a true distribution, a correction term of AIC is derived as follows: $c_{GM}(\theta_{GM})=3$. On the other hand, when a Gaussian distribution includes a true distribution, a correction term of AIC is derived as follows: $c_G(\sigma^2)=1$. Therefore, it is expected that a value close to 1 is derived as the correction term of AIC when the amplitude probability distribution of the observed noise sequence is a Gaussian distribution, and a value greater than 3 is derived as the correction term of AIC when the amplitude probability distribution of the observed noise sequence is a mixture Gaussian distribution. Thus, satisfaction of the following formula 32 by utilizing the value of the correction term is defined as the fifth criterion for determining that the extracted data includes an impulsive noise.

When the amplitude probability distribution of the observed noise sequence is a mixture Gaussian distribution, that is the observed noise sequence includes impulsive noise, a value greater than 3 is derived as the correction term of AIC. Therefore right-hand value of formula 32 is assumed to be a value 2, that is z value is 1. However, the right-hand value of formula 32 should not to be fixed to value 2, so that z value is fine-tuned from 1.

[Exp. 23]

$$\frac{E_K\lfloor n_k^4 \rfloor}{2K\hat{\sigma}^4} - \frac{1}{2} > 1 + z \quad (32)$$

In Step S53, using the criteria calculated as described above, it is determined in advance whether or not the observed noise sequence is one including an impulsive noise. Next, details of processing procedure illustrated in the flow chart of FIG. 17 will be described.

Figure 18:
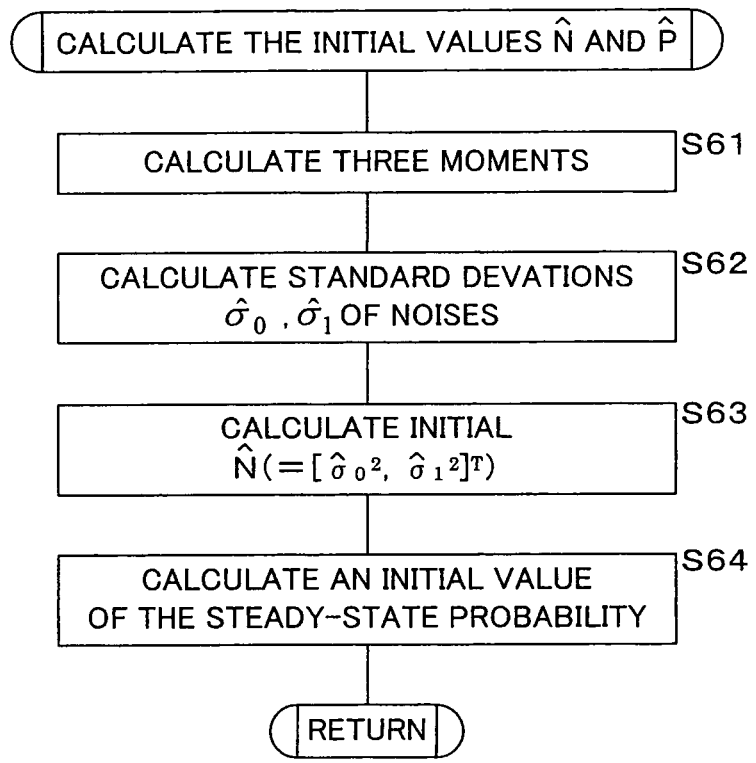
FIG. 18 is a flow chart illustrating details of processing for calculating initial values of noise power and steady-state probability using a moment method by the noise detection apparatus according to Embodiment 2.

FIG. 18 is a flow chart illustrating details of processing for calculating initial values of noise power and steady-state probability using a moment method by the noise detection apparatus 6 according to Embodiment 2. FIG. 18 corresponds to the details of Step S51 in the processing procedure illustrated in the flow chart of FIG. 17.

From the given extracted data, i.e., from the voltage values for K=200000 samples, the control section 60 calculates three moments a, b and c by the function of the initial value deciding section 602 using the foregoing formula 14 based on the moment method (Step S61).

Then, the control section 60 obtains a noise power initial value N $(=[\sigma_0^2, \sigma_1^2]^T$, an estimated value symbol of which is abbreviated) by the function of the initial value deciding section 602. Therefore, the control section 60 calculates standard deviations $\sigma_0$ and $\sigma_1$ of distribution of noises in the respective states by the formulas 15 and 16 based on the three moments a, b and c calculated in Step S61 (Step S62). From the standard deviations $\sigma_0$ and $\sigma_1$ of distribution of noises in the respective states, the control section 60 calculates an initial estimated value of the noise power N of the extracted data by the function of the initial value deciding section 602 (Step S63).

Furthermore, from the moments calculated in Step S61, the control section 60 calculates an initial value of the steady-state probability of each state based on the formula 17 by the function of the initial value deciding section 602 (Step S64), and returns the processing to Step S52 in the processing procedure illustrated in the flow chart of FIG. 17.

Figure 19:
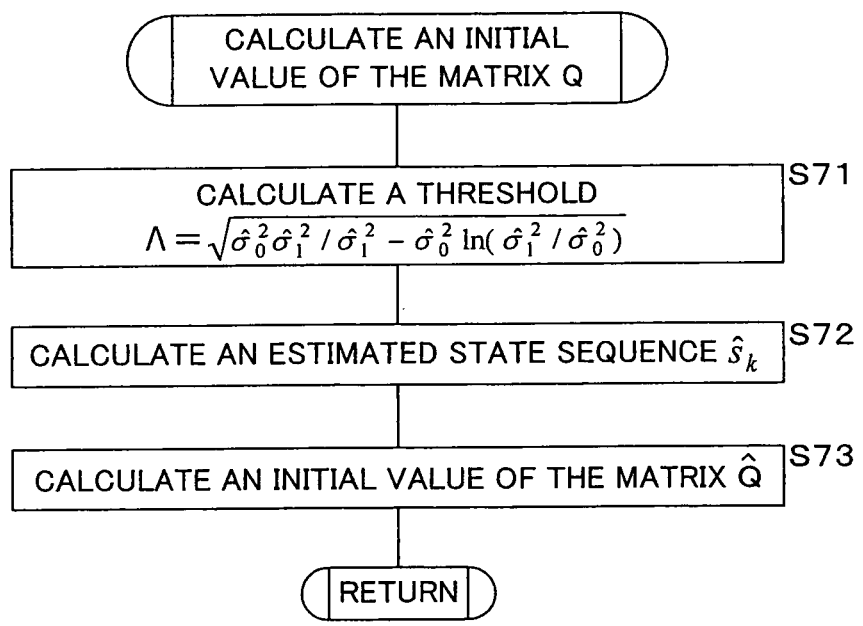
FIG. 19 is a flow chart illustrating details of processing for calculating four state transition probabilities by the noise detection apparatus according to Embodiment 2.

FIG. 19 is a flow chart illustrating details of processing for calculating four state transition probabilities by the noise detection apparatus according to Embodiment 2. FIG. 19 corresponds to details of Step S55 in the processing procedure illustrated in the flow chart of FIG. 17.

The control section 60 obtains an initial value of the state transition probability matrix Q by the function of the initial value deciding section 602. Therefore, from the estimated values of the standard deviations $\sigma_0$ and $\sigma_1$ of distribution of noises in the respective states calculated by the formulas 15 and 16 in Step S62 illustrated in the flow chart of FIG. 18, the control section 60 calculates a threshold $\Lambda$ for each voltage value of 200000 samples of the extracted data (observed noise sequence) by using the formula 18 (Step S71). Then, using the formula 18, the control section 60 calculates an estimated state matrix s(k=1 to K) by making a comparison between each voltage value of 200000 samples of the extracted data; and the calculated threshold $\Lambda$ (Step S72). Furthermore, from the calculated estimated state matrix s(k=1 to K), the control section 60 calculates an initial estimated value of the matrix Q of the four state transition probabilities (Step S73). Specifically, from the estimated state matrix s(k=1 to K), the control section 60 obtains each of the four numbers $A_{ss'}$ of state transitions from the state s (=0 or 1) to the state s' (=0 or 1), and obtains the number $A_s$ of each state s (=0 or 1), thus obtaining the state transition probability initial value $q_{ss'}$ ($q_{ss'}=A_{ss'}/A_s$).

Upon calculation of the estimated value of the matrix Q, the control section 60 returns the processing to Step S56 in the processing procedure illustrated in the flow chart of FIG. 17.

Figure 20:
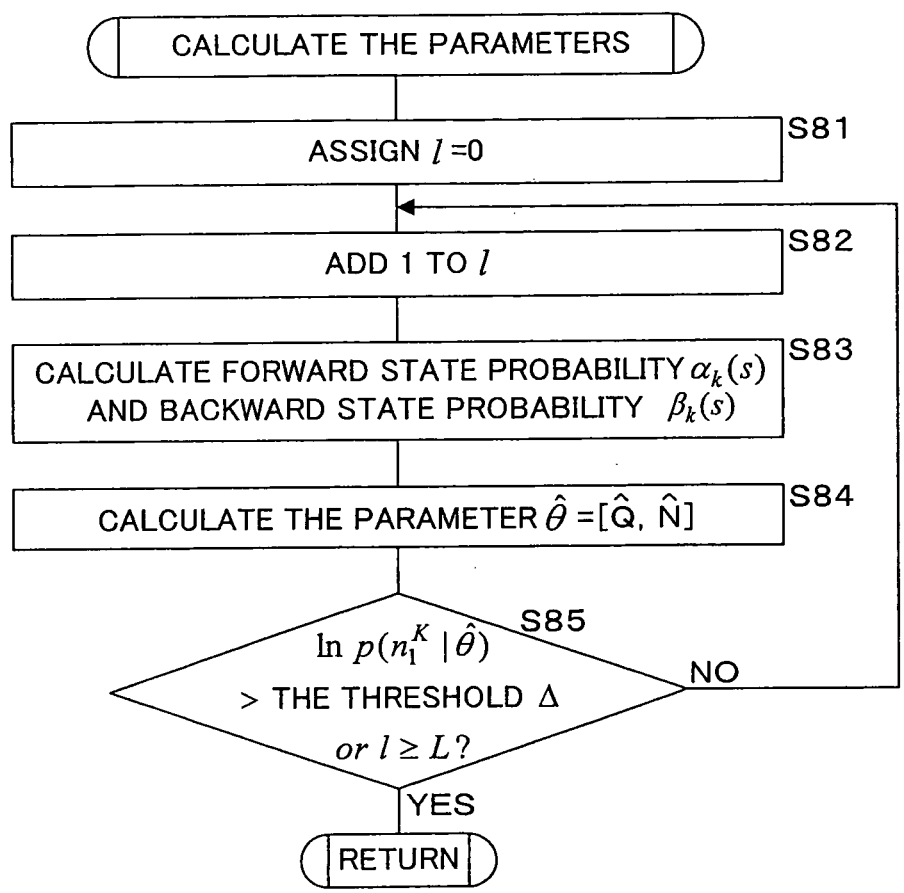
FIG. 20 is a flow chart illustrating an example of a procedure of processing for calculating parameters θ (noise characteristics) for maximization of the likelihood of an observed noise sequence based on a BW algorithm by the noise detection apparatus according to Embodiment 2.

FIG. 20 is a flow chart illustrating an example of a procedure of processing for calculating parameters $\theta$ (noise characteristics) for maximization of the likelihood of an observed noise sequence based on a BW algorithm by the noise detection apparatus 6 according to Embodiment 2. It should be noted that the processing procedure illustrated in the flow chart of FIG. 20 corresponds to details of Step S57 in the processing procedure illustrated in the flow chart of FIG. 17.

When the initial estimated values of the parameters $\theta$ decided in Step S56 are given, the control section 60 calculates, using the BW algorithm and MAP estimation, the parameters θ (noise characteristics) for maximization of the likelihood of the observed noise sequence by the function of the BW algorithm calculation section 603 (which are maximization expected values for increasing the likelihood of the obtained observed noise sequence for the given initial values).

More specifically, the control section 60 first assigns 0 into the number of calculations 1 (Step S81), adds 1 thereto (Step S82), and calculates a forward state probability (Forward probability) $\alpha_k(s)$ and a backward state probability (Backward probability) $\beta_k(s)$ based on the foregoing formulas 1 to 6 (Step S83). Using the forward state probability $\alpha_k(s)$ and the backward state probability $\beta_k(s)$ calculated in Step S83, the control section 60 calculates the parameters θ (noise characteristics: estimated values of the state transition probability matrix Q and noise power N) by the foregoing formulas 10 and 11 (Step S84).

For the estimated values of the parameters θ derived in Step S84, the control section 60 determines, using the function of the BW algorithm calculation section 603, whether or not a logarithmic likelihood is higher than a threshold A, or whether or not the number of calculations 1 is equal to or higher than an upper limit value L (Step S85). When the logarithmic likelihood is equal to or lower than the threshold A and the number of calculations 1 is below the upper limit value L (S85: NO), the control section 60 returns the processing to Step S82 and repeats the processing in order to obtain a higher likelihood value.

When it is determined by the function of the BW algorithm calculation section 603 that for the estimated values of the parameters θ derived in Step S84, the logarithmic likelihood is higher than the threshold Δ or the number of calculations 1 is equal to or higher than the upper limit value L (S85: YES), the control section 60 ends the processing for obtaining the parameters θ (noise characteristics) for maximization of the likelihood of the observed noise sequence, and returns the processing to Step S58 in the flow chart of FIG. 17.

Evaluations were conducted on the accuracy of impulsive noise detection performed by the noise detection apparatus 6 according to Embodiment 2. A detection error probability measurement method of Embodiment 2 is similar to that of Embodiment 1. It is to be noted that as for the criterion-related information and the criteria for determining whether or not an impulsive noise is included, which are illustrated in Steps S52 and S53, the determination criteria were changed based on the first to fifth criteria, and detection error probabilities associated with the respective criteria were calculated.

Figure 21:
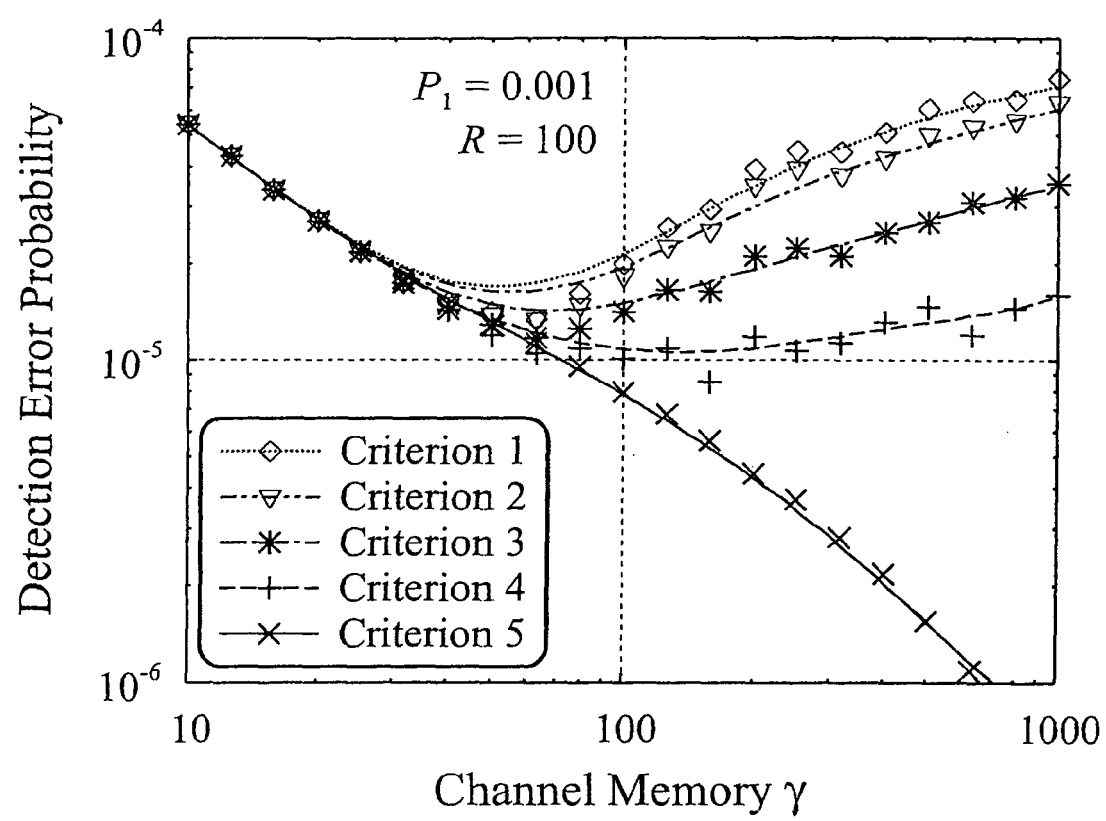
FIG. 21 is a graph illustrating detection error probabilities caused by the noise detection apparatus according to Embodiment 2.
Figure 23:
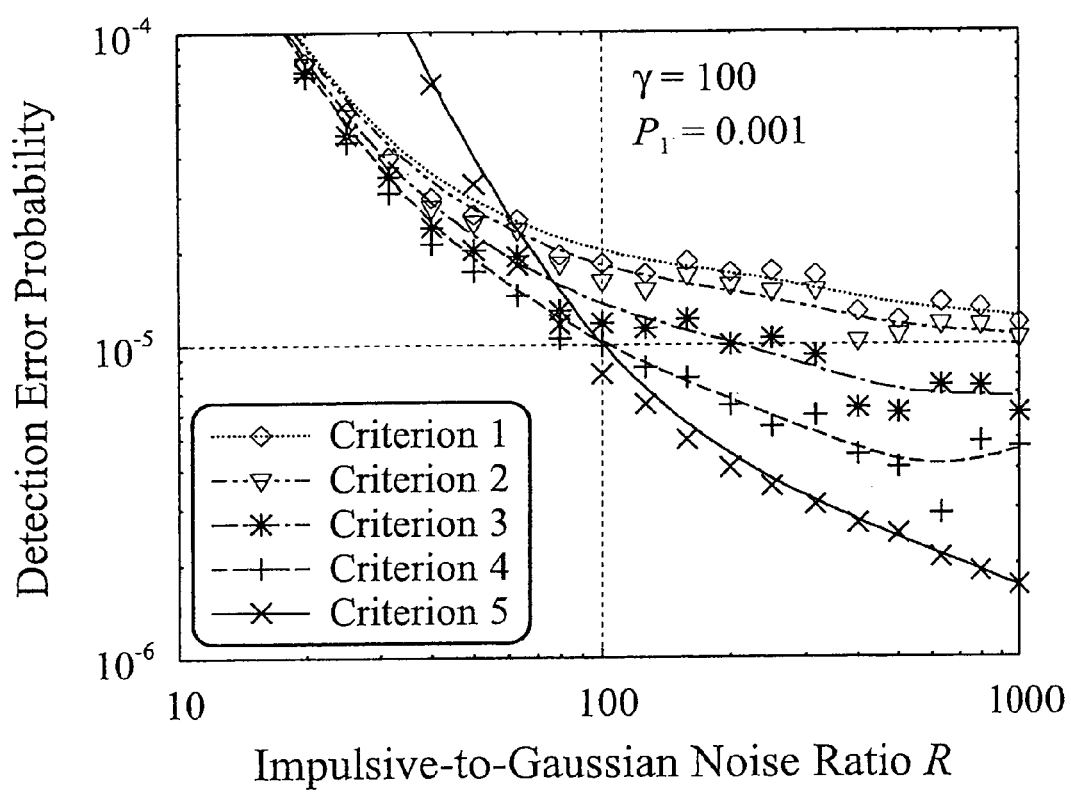
FIG. 23 is a graph illustrating detection error probabilities caused by the noise detection apparatus according to Embodiment 2.

FIGS. 21 to 23 are graphs each illustrating detection error probabilities caused by the noise detection apparatus 6 according to Embodiment 2.

In FIG. 21, the horizontal axis represents a change in the channel memory γ, and the vertical axis represents detection error probabilities thereof. Fixed values are given to the impulsive noise occurrence probability $P_1$ and the impulse-to-background noise ratio R so that $P_1=0.001$, and R=~100. FIG. 21 illustrates the error probabilities of the channel memory γ calculated for noise sequences generated with the channel memory γ changed from 10 to 1000. The dotted line and hollow rhombuses in FIG. 21 indicate the detection error probability when the first criterion is used, and the chain double-dashed line and hollow inverted triangles in FIG. 21 indicate the detection error probability when the second criterion is used. Further, the dashed line and asterisks in FIG. 21 indicate the detection error probability when the third criterion is used, the broken line and crosses in FIG. 21 indicate the detection error probability when the fourth criterion is used, and the solid line and X marks in FIG. 21 indicate the detection error probability when the fifth criterion is used.

In FIG. 22, the horizontal axis represents a change in the impulsive noise occurrence probability $P_1$, and the vertical axis represents detection error probabilities thereof. Fixed values are given to the channel memory γ and the impulse-to-background noise ratio R so that γ=100, and R=100. FIG. 22 illustrates the error probabilities of the impulsive noise occurrence probability $P_1$ calculated for noise sequences generated with the impulsive noise occurrence probability $P_1$ changed from 0.0001 to 0.01. Explanatory legends of FIG. 22 for the respective criteria are similar to those of FIG. 21.

In FIG. 23, the horizontal axis represents a change in the impulse-to-background noise ratio R, and the vertical axis represents detection error probabilities thereof. Fixed values are given to the channel memory γ and the impulsive noise occurrence probability $P_1$ so that γ=100, and $P_1=0.001$. FIG. 23 illustrates the error probabilities of the impulse-to-background noise ratio R calculated for noise sequences generated with the impulse-to-background noise ratio R changed from 10 to 1000. Explanatory legends of FIG. 23 for the respective criteria are similar to those of FIG. 21.

As compared with the detection error probabilities illustrated in FIGS. 11 to 13 according to Embodiment 1, it can be seen that the detection accuracy is increased by performing the determination processes using the criteria in Steps S52 and S53 illustrated in the flow chart of FIG. 17. It should be noted that even when the second to fourth criteria are used, the accuracy is increased as compared with the case where only the first criterion is used, and the accuracy is further increased by using the fifth criterion in particular. Especially, even when the state transition probability $q_{01}$ from the Gaussian noise generated state "0" to the impulsive noise generated state "1" is extremely low, the detection error probability can be decreased.

As described above, using the statistical information, the extracted data including no impulsive noise is excluded from objects to which the BW algorithm and MAP estimation are applied, thus making it possible to prevent a white Gaussian noise from being forcefully detected as an impulsive noise, and to further increase the impulsive noise detection accuracy.

Embodiment 3

In Embodiment 3, Observed Noise Sequences are Obtained under known situations, results of calculation of state sequences and noise characteristics performed by the noise detection apparatus 6 according to Embodiment 1 or 2 are obtained, impulsive noise frequencies detected using the calculation results are calculated, the calculation results and impulsive noise frequencies are stored in association with the respective situations, and then a simulation is carried out using the noise characteristics and impulsive noise frequencies.

Figure 24:
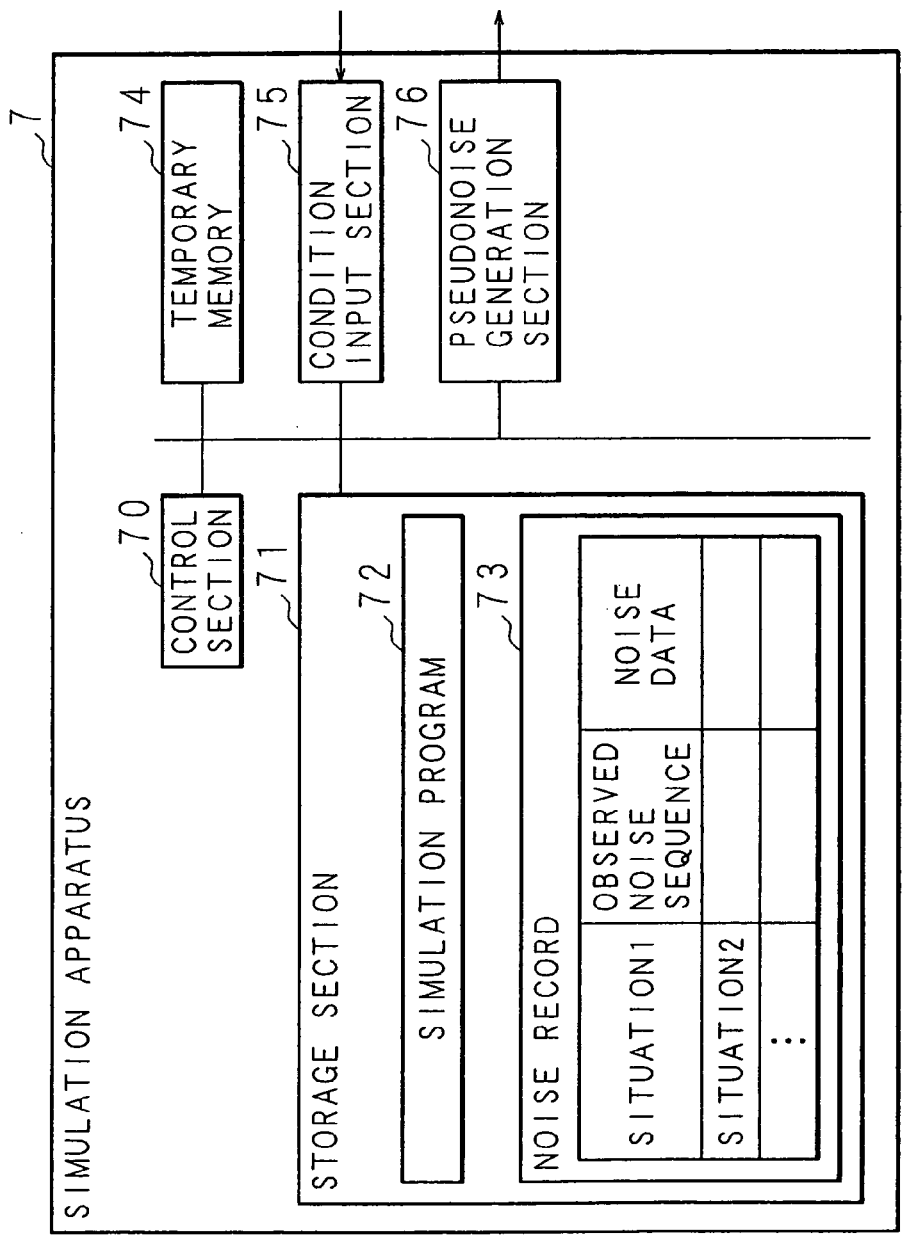
FIG. 24 is a block diagram illustrating a configuration of a simulation apparatus according to Embodiment 3.

FIG. 24 is a block diagram illustrating a configuration of a simulation apparatus according to Embodiment 3. Using a personal computer, the simulation apparatus 7 includes: a control section 70; a storage section 71; a temporary storage section 74; a condition input section 75; and a pseudonoise generation section 76. Using a CPU, the control section 70 executes a simulation based on a simulation program 72 stored in the storage section 71. Using a nonvolatile memory such as a hard disk, an EEPROM or a flash memory, the storage section 71 stores the simulation program 72 and further stores a noise record 73 including measurement data obtained under the respective known situations. Using a memory such as a DRAM or an SRAM, the temporary storage section 74 temporarily stores data generated by processing carried out by the control section 70.

The condition input section 75 is a user interface including a mouse, a keyboard, a display, etc., and a user is allowed to input, via the condition input section 75, simulation conditions for an in-vehicle PLC system to be simulated. Examples of the simulation conditions include: a power line length; the number of ECUs connected to a power line; positions thereof (e.g., lengths of power lines from a reference point); the number and positions of actuators; a time width of an object to be simulated; and a timing at which the actuator is operated in the time width.

The pseudonoise generation section 76 generates a pseudonoise based on a state sequence in a time width of an object to be simulated, and noise characteristics and impulsive noise frequencies in the state sequence. Specifically, a sequence of voltage values in the time width is generated from a state sequence that is a sequence of binary values indicative of whether or not the state is an impulsive noise generated state, and from noise power of the impulsive noise when the impulsive noise is generated.

The control section 70 obtains noise characteristics in the respective situations from the stored noise record 73. More specifically, based on the simulation program 72, the control section 70 is capable of performing functions similar to those of the parameter estimation section 601 of the control section 60 according to Embodiment 1 or 2, and is thus capable of obtaining, as the noise characteristics, respective parameters (i.e., a channel memory γ, an impulsive noise occurrence probability $P_1$, an impulse-to-background noise ratio R, and a background noise power $\sigma_G^2$).

Further, the control section 70 obtains the impulsive noise frequencies in the respective situations from the noise characteristics calculated for the measurement data under the respective situations, and from the stored noise record 73. More specifically, in addition to functions similar to those of the impulsive noise detection section 605 of the control section 60 according to Embodiment 1 or 2, the control section 70 is capable of performing, based on the simulation program 72, not only impulsive noise detection but also a fast Fourier transform function, and is thus capable of obtaining the frequencies of the detected impulsive noises. The control section 70 adds the calculated impulsive noise frequencies to the noise record 73.

Using the pseudonoise generation section 76, the control section 70 generates a state sequence responsive to an actuator operation in a time width of a simulation object based on: the noise characteristics calculated for measurement data under the respective situations; and the simulation conditions inputted through the condition input section 75, and generates a pseudonoise based on the generated state sequence, and the state noise power and impulsive noise frequency of each state.

Figure 25:
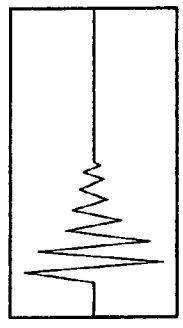
FIG. 25 is an explanatory diagram illustrating exemplary details of a noise record stored in a storage section of the simulation apparatus according to Embodiment 3.

FIG. 25 is an explanatory diagram illustrating exemplary details of the noise record 73 stored in the storage section 71 of the simulation apparatus 7 according to Embodiment 3.

As illustrated in FIG. 25, the noise record 73 includes situation details and measurement data. The noise record 73 further includes: parameters (i.e., the channel memory γ, impulsive noise occurrence probability $P_1$, impulse-to-background noise ratio R, and background noise power $\sigma_G^2$) indicative of noise characteristics calculated by after-mentioned processing; and frequencies of impulsive noises. The noise record 73 may include generated state sequences in advance. FIG. 25 illustrates: measurement data in the period (measurement periodical unit) of 0 to 1 msec from an operation of a door lock serving as one of actuators; and exemplary details of the parameters indicative of the noise characteristics. In this manner, noise data for each period under the known situation is stored as the noise record 73, thus allowing a simulation to be executed later.

Figure 26:
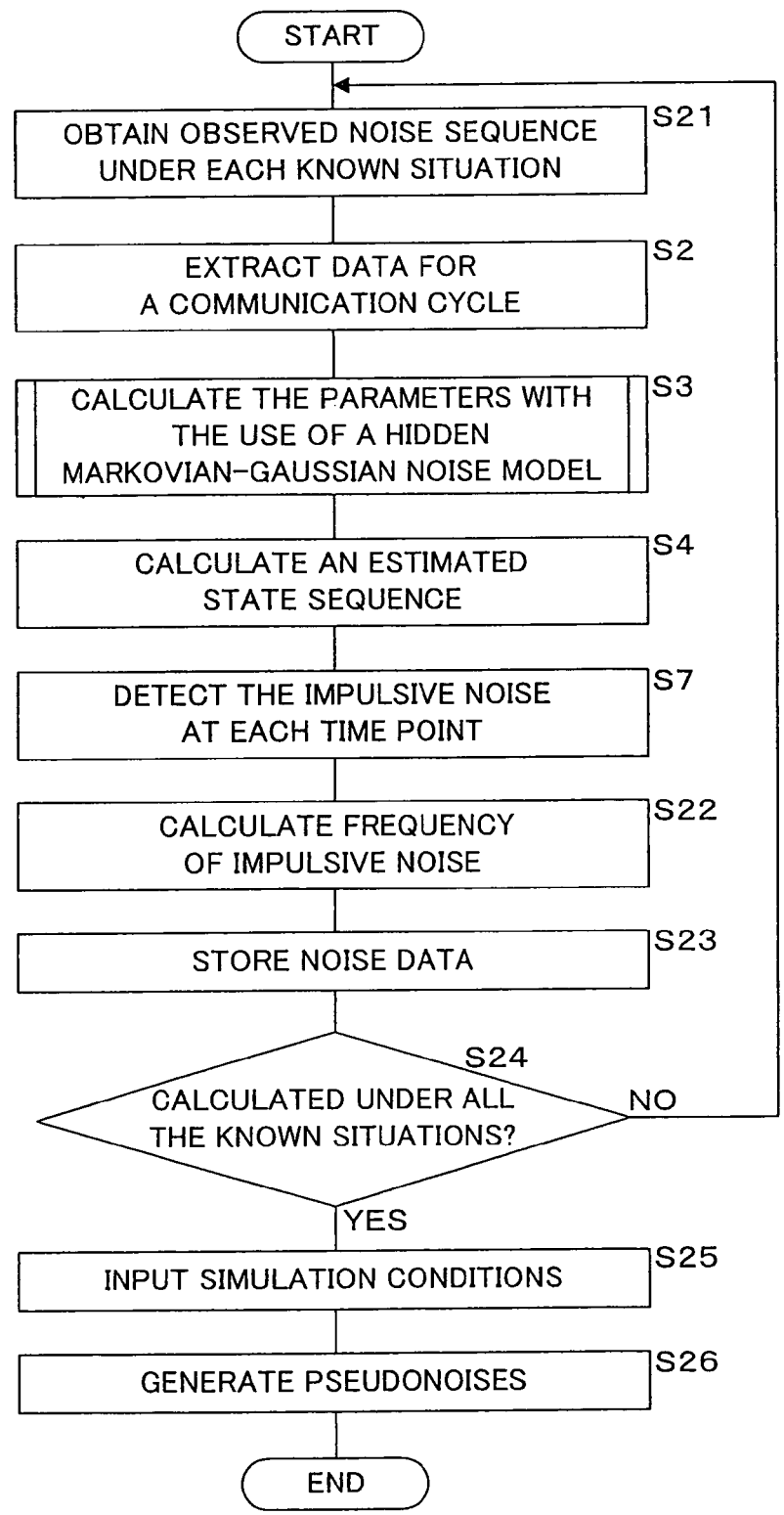
FIG. 26 is a flow chart illustrating an example of a procedure of processing executed by the simulation apparatus according to Embodiment 3.

FIG. 26 is a flow chart illustrating an example of a procedure of processing executed by the simulation apparatus 7 according to Embodiment 3. It should be noted that, of the following processing steps illustrated in the flow chart of FIG. 26, the steps common to those illustrated in the flow chart of FIG. 9 according to Embodiment 1 are identified by the same step numbers, and detailed description thereof will be omitted.

The control section 70 obtains measurement data (observed noise sequence) under each known situation, which is stored in the storage section 71 (Step S21), and extracts data for a communication cycle from the measurement data (Step S2). It should be noted that when the measurement data, already extracted by a communication cycle length, is stored as illustrated in the exemplary details of FIG. 25, Step S2 may be skipped.

The control section 70 performs functions similar to those of the parameter estimation section 601 of the control section 60 according to Embodiment 1 or 2, thereby calculating parameters θ (noise characteristics) for maximization of the likelihood of the data (observed noise sequence) extracted in Step S2 (Step S3). The calculation details are similar to those described with reference to the flow chart of FIG. 10 according to Embodiment 1 (or the flow charts of FIGS. 17 to 20 according to Embodiment 2).

Further, the control section 70 performs functions similar to those of the parameter output section 604 of the control section 60 according to Embodiment 1 or 2, thereby estimating and calculating an estimated state matrix (Step S4). Furthermore, the control section 70 performs functions similar to those of the impulsive noise detection section 605 of the control section 60 according to Embodiment 1, thereby detecting an impulsive noise in the data extracted in Step S2 (Step S7). Then, using the fast Fourier transform function, the control section 70 calculates the frequency of the detected impulsive noise (Step S22).

The control section 70 stores the noise characteristics and impulsive noise frequency calculated for the measurement data obtained under each situation so that the noise characteristics and impulsive noise frequency are included as noise data in the noise record 73 (Step S23), and the control section 70 determines whether or not noise characteristics and impulsive noise frequencies are calculated for the measurement data obtained under all the known situations (Step S24). When it is determined that noise characteristics are not calculated for the measurement data obtained under all the known situations (S24: NO), the control section 70 returns the processing to Step S21, and continues the processing for calculating noise characteristics and impulsive noise frequencies for the measurement data under the other situations.

When it is determined that noise characteristics and impulsive noise frequencies are calculated for the measurement data obtained under all the known situations (S24: YES), the control section 70 inputs simulation conditions through the condition input section 75 (Step S25). It should be noted that when the calculations are completed for the measurement data obtained under all the situations in Step S24 (S24: YES), the control section 70 may allow the unillustrated display to provide a screen for recommending input of simulation conditions, for example. The control section 70 generates a pseudonoise from the noise characteristics and impulsive noise frequency associated with each situation and calculated in advance in accordance with the inputted simulation conditions including, for example, a circuit configuration for a power line, i.e., a length of the power line and the numbers and types of communication apparatuses and actuators connected thereto (Step S26). Thus, the control section 70 ends the simulation.

More specifically, in Step S26, the control section 70 identifies the situation corresponding to the simulation conditions, and reads, from the noise record stored in the storage section 71, the noise characteristics (i.e., the channel memory γ, impulsive noise occurrence probability $P_1$, impulse-to-background noise ratio R, and background noise power $\sigma_G^2$) and impulsive noise frequency, which are calculated from the measurement data associated with the identified situation. Using the parameters indicative of the read noise characteristics, the control section 70 generates a state sequence responsive to an actuator operation in a time width of an object to be simulated. The noise power ($\sigma_1^2$, $\sigma_0^2$) and impulsive noise frequency, included in the noise characteristics, are reflected in the generated state sequence, thereby generating a pseudonoise. It should be noted that the time width of the object to be simulated is set at 5 msec, for example. Furthermore, the control section 70 generates a pseudonoise for the entire period of 5 msec from: the state sequence, state noise power and impulsive noise frequency when one of the actuators is operated at a time point of 0 msec in the time width; and the state sequence, state noise power and impulsive noise frequency when the other actuator is operated at a time point of 2 msec in the time width.

As described above, for a physical configuration of in-vehicle PLC different from one vehicle type to another, for example, the pseudonoise of a noise generated in each power line can be generated with high accuracy. Hence, modeling faithful to statistical properties of impulsive noises generated in the respective situations can be carried out, thus making it possible to realize an efficient simulation at the stage of designing of an in-vehicle PLC system, and to implement the in-vehicle PLC that uses optimal frequency, communication method, etc. for effectively avoiding an impulsive noise.

Embodiment 4

In Embodiment 4, description will be made on an example of an apparatus for calculating and recording noise characteristics and impulsive noise frequencies under known situations as described in Embodiments 1 and 2, and for deciding an optimal communication method for a physical configuration of an in-vehicle PLC system different depending on a vehicle type, an option, etc. by using a pseudonoise generated by the simulation apparatus 7 according to Embodiment 3, thereby enabling design of in-vehicle PLC.

Figure 27:
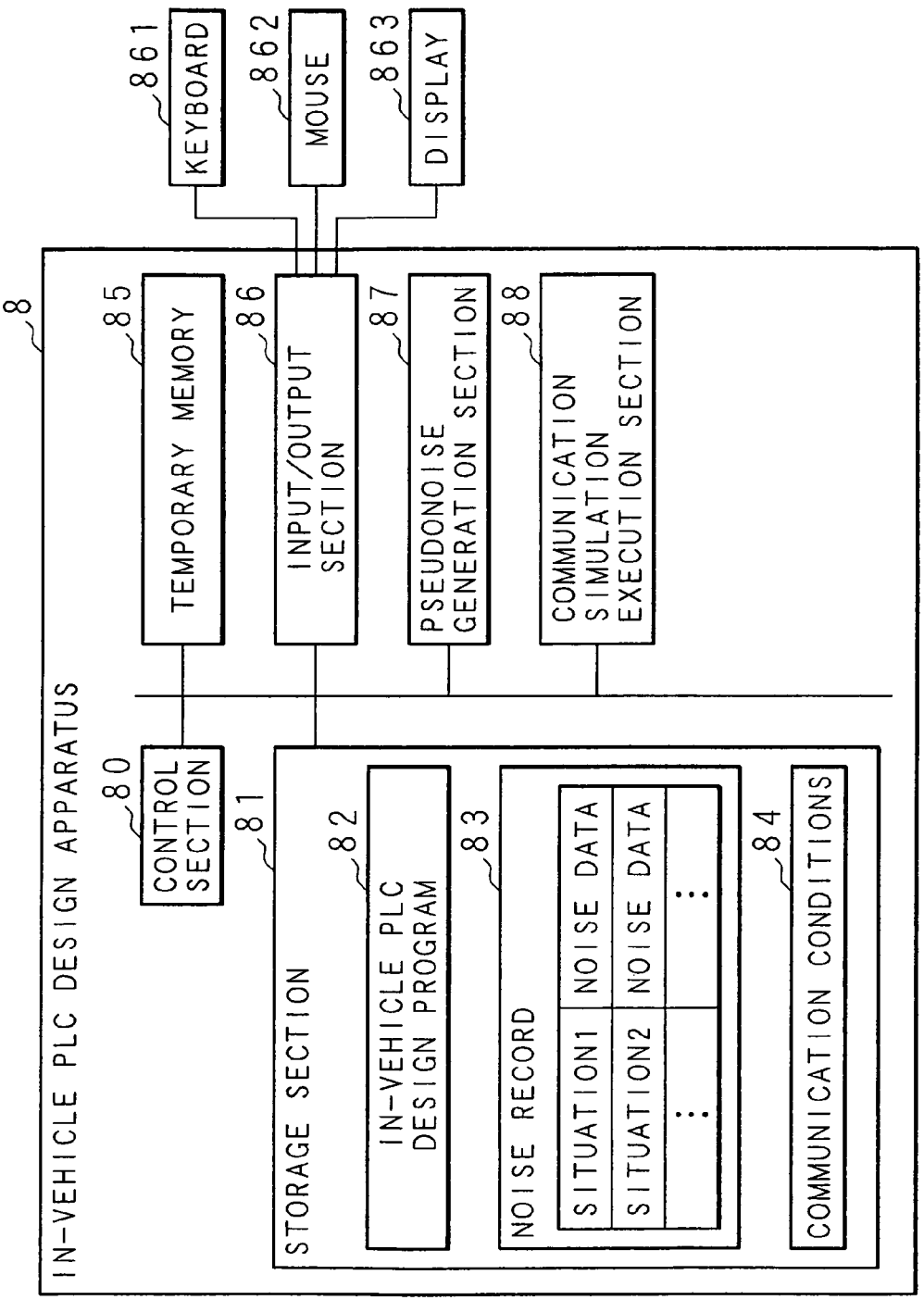
FIG. 27 is a block diagram illustrating a configuration of an in-vehicle PLC design apparatus according to Embodiment 4.

FIG. 27 is a block diagram illustrating a configuration of an in-vehicle PLC design apparatus 8 according to Embodiment 4. The in-vehicle PLC design apparatus 8 includes: a control section 80; a storage section 81; a temporary storage section 85; an input/output section 86; a pseudonoise generation section 87; and a communication simulation execution section 88. Using a CPU, the control section 80 implements each of after-mentioned functions based on an in-vehicle PLC design program 82 stored in the storage section 81. Using a nonvolatile memory such as a hard disk, an EEPROM or a flash memory, the storage section 81 stores the in-vehicle PLC design program 82, and further stores a noise record 83 including noise characteristics and impulsive noise frequency calculated from measurement data determined under each known situation. The storage section 81 further stores candidates for communication conditions (communication condition candidate group 84) such as communication methods, communication frequencies or communication parameters suitable for an in-vehicle PLC system to be designed in Embodiment 4. Using a memory such as a DRAM or an SRAM, the temporary storage section 85 temporarily stores data generated by processing carried out by the control section 80.

The input/output section 86 is an interface that receives an operational input made by a designer, and outputs information to the designer. The input/output section 86 is connected with a keyboard 861, a mouse 862 and a display 863. The input/output section 86 obtains information inputted via the keyboard 861 or the mouse 862, notifies the control section 80 of the inputted information, and outputs character information or image information to the display 863 based on an instruction provided from the control section 80. Specifically, the control section 80 is capable of receiving, via the input/output section 86, a circuit configuration of the in-vehicle PLC system to be designed. In other words, via the input/output section 86, the control section 80 receives information on a power line length, the numbers and types of connected communication apparatuses and actuators, etc. of the in-vehicle PLC system to be designed, which are inputted through an operation performed on the keyboard 861 or the mouse 862 by the designer. Further, via the input/output section 86, the control section 80 outputs, to the display 863, information on candidates for communication methods, communication frequencies or communication parameters of each of them, included in the communication condition candidate group 84 stored in the storage section 81, and allows the candidates to be selectively displayed on the display 863. From among the candidates displayed on the display 863, the designer selects any one of the candidates by using the keyboard 861 or the mouse 862. In this case, the candidate selected by the keyboard 861 or the mouse 862 can be identified by the control section 80.

The pseudonoise generation section 87 generates a pseudonoise based on a state sequence in a time width of an object to be simulated, and state noise power and impulsive noise frequency of the state sequence. Specifically, a sequence of voltage values in the time width is generated based on: a state sequence that is a sequence of binary values indicative of whether or not the state is an impulsive noise generated state; noise power ($\sigma_1^2$, $\sigma_0^2$) in each state indicative of whether or not the state is an impulsive noise generated state; and an impulsive noise frequency.

On the basis of the selected communication method, communication frequency and communication parameter included in the communication condition candidate group 84, the communication simulation execution section 88 executes a communication simulation based on the given pseudonoise, and outputs the simulation result. The result may be stored in the temporary storage section 85 or the storage section 81. For each candidate included in the communication condition candidate group 84, the control section 80 gives the pseudonoise, generated by the pseudonoise generation section 87, to the communication simulation execution section 88 to execute a communication simulation.

From the results of the communication simulations executed for the respective candidates of the communication conditions, the control section 80 obtains communication error rates based on the in-vehicle PLC design program 82. Then, the control section 80 makes comparisons on the communication error rates calculated for the respective candidates, and identifies, as the optimal candidate, the candidate having the lowest error rate.

Figure 28:
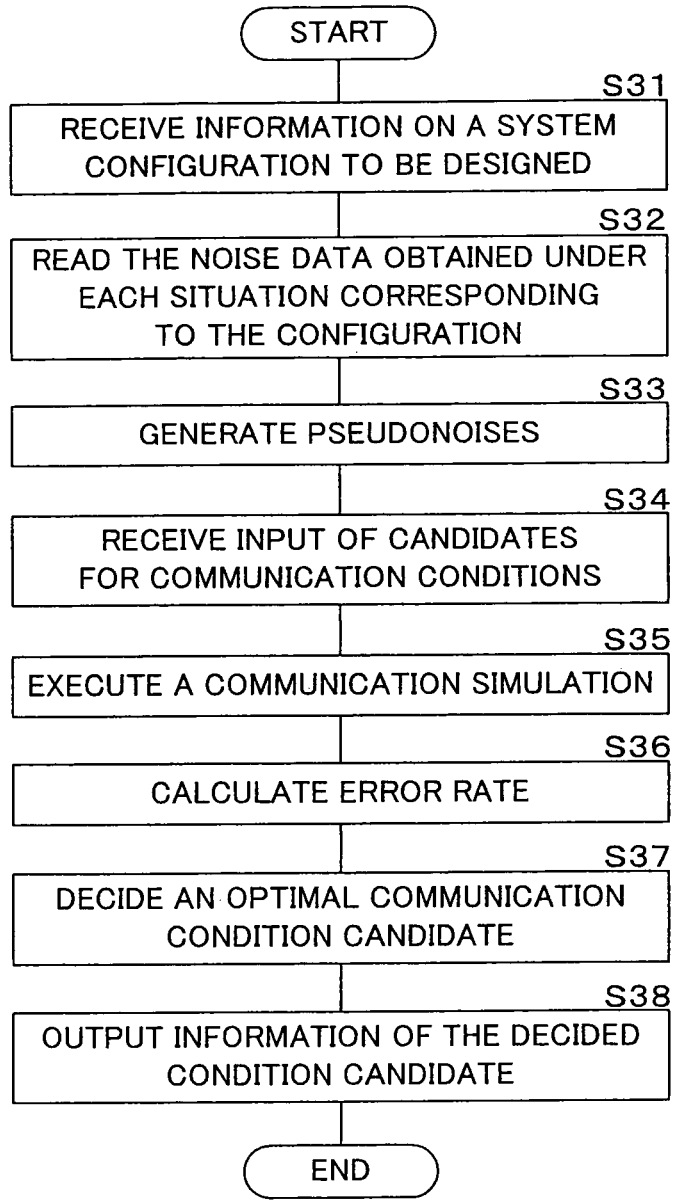
FIG. 28 is a flow chart illustrating an example of a procedure of processing executed by the in-vehicle PLC design apparatus according to Embodiment 4.

Processing executed by the control section 80 of the in-vehicle PLC design apparatus 8 configured as described above will be described with reference to a flow chart. FIG. 28 is a flow chart illustrating an example of a procedure of the processing executed by the in-vehicle PLC design apparatus 8 according to Embodiment 4.

The control section 80 receives, via the input/output section 86, information on a system circuit configuration to be designed (Step S31), and reads, from the noise record 83 stored in the storage section 81, noise data (including noise characteristics and impulsive noise frequency) calculated under each situation corresponding to the received circuit configuration (Step S32). From the noise characteristics and impulsive noise frequency of the noise data read in Step S32, the control section 80 generates a pseudonoise by the pseudonoise generation section 87 (Step S33).

Via the input/output section 86, the control section 80 receives input of candidates for communication conditions including communication methods, communication frequencies or communication parameters of each of them, which are included in the communication condition candidate group 84 (Step S34). Specifically, the control section 80 allows the display 863 to provide a screen for receiving input of the candidates, and receives an input made by the keyboard 861 or the mouse 862.

Using the generated pseudonoise, the control section 80 gives the inputted communication condition candidates to the communication simulation execution section 88, and allows the communication simulation execution section 88 to execute a communication simulation (Step S35).

From results of the communication simulation executed in Step S35, the control section 80 calculates a communication error rate (Step S36). The control section 80 calculates the communication error rate for each of the inputted candidates, and makes comparisons on the respective communication error rates, thereby identifying an optimal communication condition candidate (Step S37). The control section 80 outputs information on the communication condition candidate, identified in Step S37, to the display 863 via the input/output section 86 so as to display the information on the display 863 (Step S38), thus ending the processing.

As a result of the above-described processing, based on an observed noise sequence obtained from observation under each situation, a pseudonoise for reproducing an impulsive noise faithful to the statistical properties of the impulsive noise is generated on the basis of the noise characteristics and frequency of the impulsive noise estimated automatically using the statistical properties of the observed noise sequence itself. Since communication simulations are executed by the in-vehicle PLC design apparatus 8 according to Embodiment 4 using the generated pseudonoise and the communication conditions (e.g., communication methods, communication frequencies and communication parameters) serving as candidates, detailed preliminary studies can be conducted on an effective communication method and the like that minimize the influence of an impulsive noise different depending on an actual vehicle type or option, for example.

Embodiment 5

In Embodiment 5, description will be made on an example of an in-vehicle PLC system including an optimization apparatus for identifying optimal communication method, communication frequency and communication parameter. The optimization apparatus detects an impulsive noise in the in-vehicle PLC system including the optimization apparatus itself, learns characteristics of the noise, and decides optimal communication method, communication frequency and communication parameter. In the in-vehicle PLC system, settings are made, for example, at the end of a test and/or at the time of a vehicle inspection after vehicle assembly so that communication is performed in accordance with communication conditions identified by the optimization apparatus.

Figure 29:
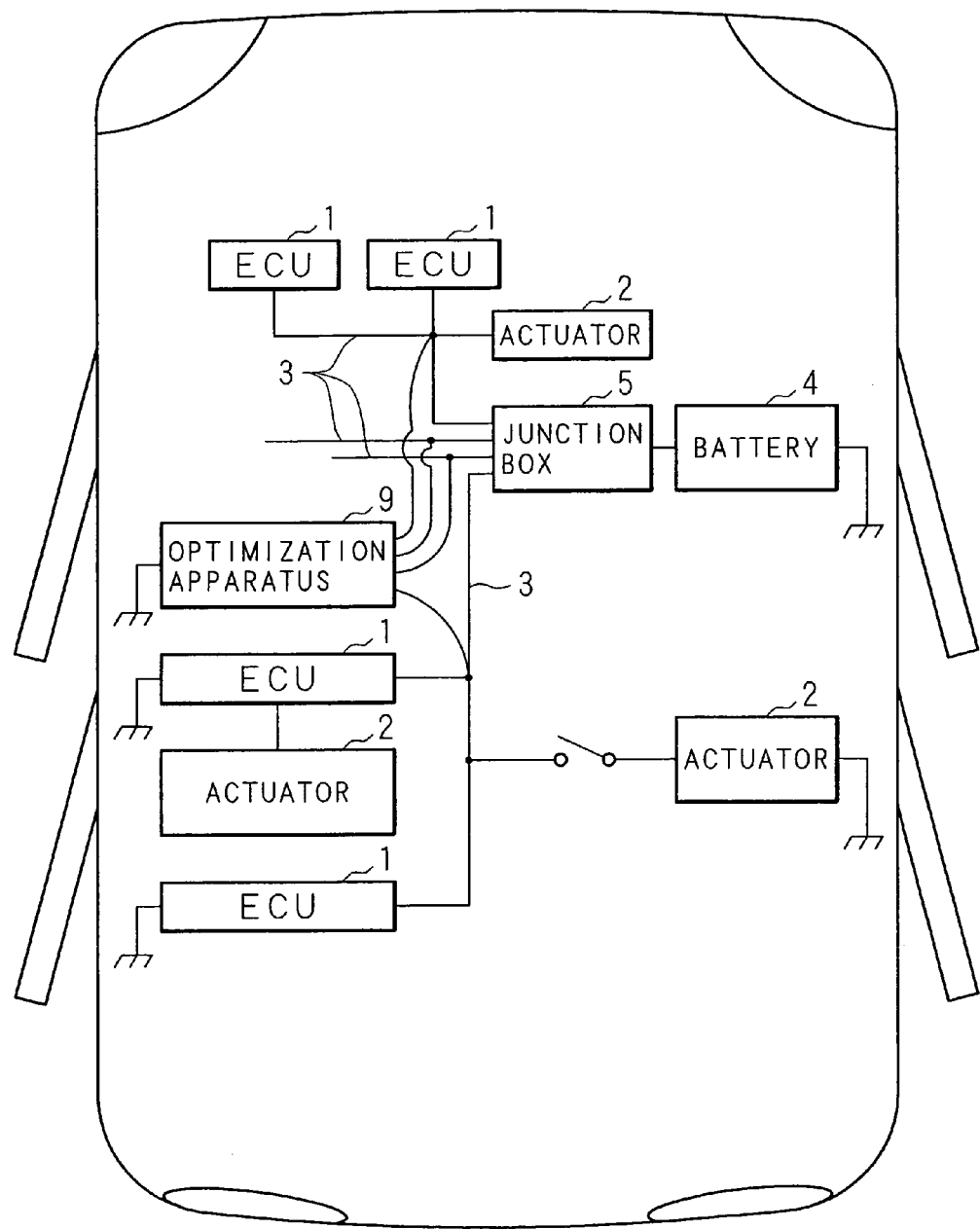
FIG. 29 is a block diagram illustrating a configuration of an in-vehicle PLC system according to Embodiment 5.

FIG. 29 is a block diagram illustrating a configuration of an in-vehicle PLC system according to Embodiment 5. It should be noted that constituent elements of the in-vehicle PLC system according to Embodiment 5 other than an optimization apparatus 9 are common to those of the in-vehicle PLC system according to Embodiment 1. The common constituent elements are identified by the same reference characters as those used in Embodiment 1, and detailed description thereof will be omitted.

The in-vehicle PLC system according to Embodiment 5 is configured to include: ECUs 1, 1, . . . ; actuators 2, 2, . . . operated in response to control data transmitted from the ECUs 1, 1, . . . ; power lines 3, 3, . . . through which electric power is supplied to each of the ECUs 1, 1, . . . and the actuators 2, 2, . . . ; a battery 4 for supplying electric power to respective devices through the power lines 3, 3, . . . ; a junction box 5 for branching and junction of the power lines 3, 3, . . . ; and the optimization apparatus 9 for optimizing communication performed in the in-vehicle PLC system. Also in Embodiment 5, the ECUs 1, 1, . . . perform communication in accordance with a FlexRay protocol via the power lines 3, 3, . . . .

As illustrated in FIG. 29, the optimization apparatus 9 according to Embodiment 5 is connected to any given points of the power lines 3, 3, . . . . The optimization apparatus 9 obtains a feature of an impulsive noise based on results of measurement of voltage values (signal levels) obtained at a predetermined interval in each power line 3, and performs the function of deciding, from the calculated feature, optimal communication method, communication frequency and other parameters for the respective power lines 3, 3, . . . .

Figure 30:
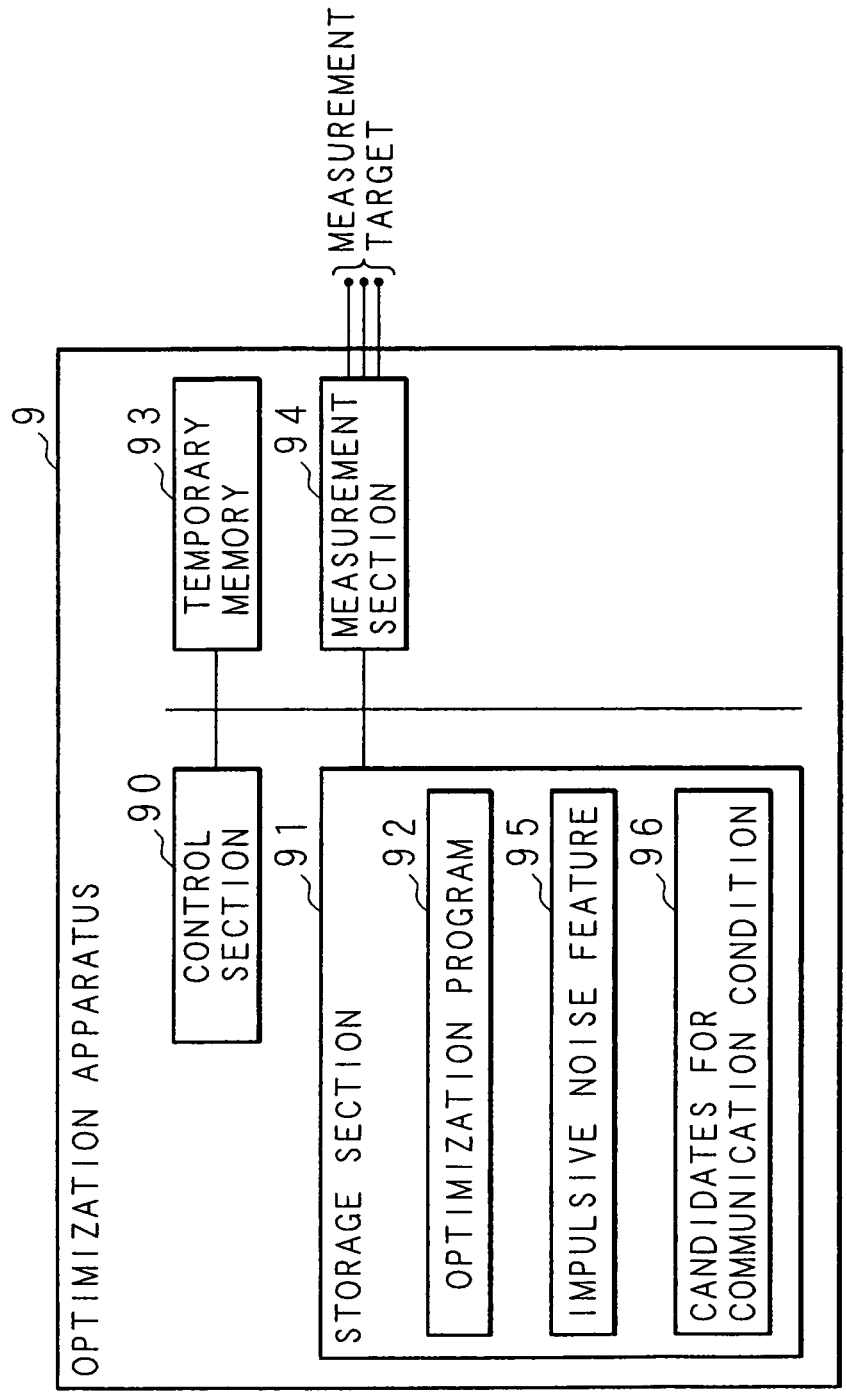
FIG. 30 is a block diagram illustrating an internal configuration of an optimization apparatus included in the in-vehicle PLC system according to Embodiment 5.

FIG. 30 is a block diagram illustrating an internal configuration of the optimization apparatus 9 included in the in-vehicle PLC system according to Embodiment 5. The optimization apparatus 9 includes: a control section 90; a storage section 91; a temporary storage-section 93; and a measurement section 94. Using a CPU, the control section 90 executes an optimization process based on an optimization program 92 stored in the storage section 91. Using a nonvolatile memory such as a hard disk, an EEPROM or a flash memory, the storage section 91 stores the optimization program 92, and further stores an impulsive noise feature 95 calculated for a detected noise. The storage section 91 further stores candidates for communication conditions (communication condition candidate group 96) such as communication methods, communication frequencies or communication parameters suitable for the in-vehicle PLC system according to Embodiment 5. Using a memory such as a DRAM or an SRAM, the temporary storage section 93 temporarily stores data generated by processing carried out by the control section 90.

The measurement section 94 measures voltage values in the power lines 3, 3, . . . at a predetermined interval, and stores the measurement results in the storage section 91 or the temporary storage section 93. The measurement section 94 may have a plurality of terminals so as to be able to measure voltage values at a plurality of measurement points in the power lines 3. The predetermined interval (sampling interval) in the measurement is 0.01 μsec (100 MHz), for example.

It should be noted that for the optimization apparatus 9, a personal computer may be used, or an FPGA, a DSP, an ASIC, etc., including components for performing functions of the respective constituent elements of the apparatus, may be used with the aim of providing the apparatus exclusively for noise detection and optimization.

Figure 31:
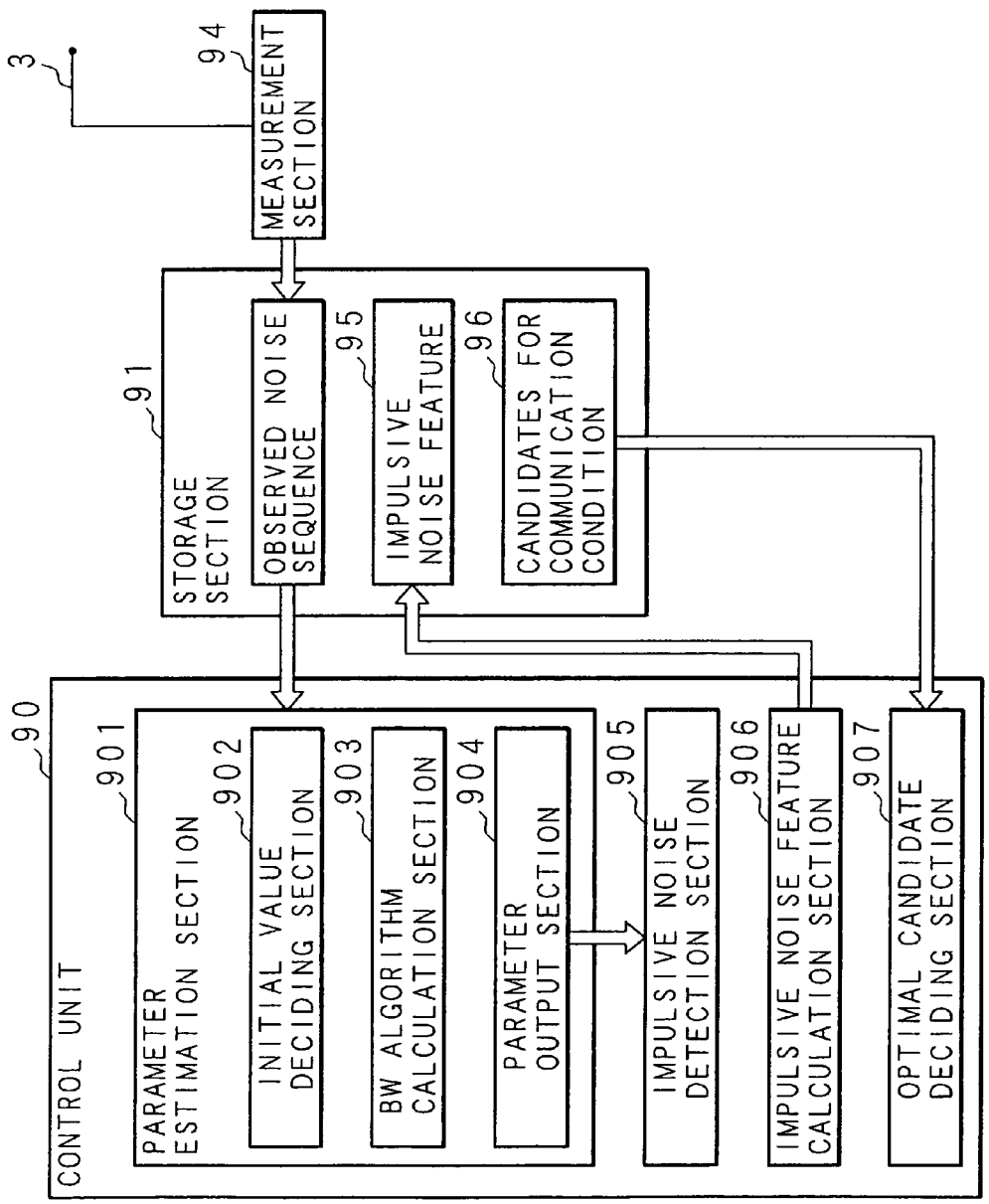
FIG. 31 is a functional block diagram illustrating functions implemented by the optimization apparatus included in the in-vehicle PLC system according to Embodiment 5.

Based on the optimization program 92, the control section 90 of the optimization apparatus 9 performs the respective functions illustrated in FIG. 30, executes processing for detecting an impulsive noise from voltage values (observed noise sequence) measured and obtained at each predetermined interval by the measurement section 94, obtains a feature of the impulsive noise when the impulsive noise is detected, and executes processing for identifying optimal communication conditions from this feature. FIG. 31 is a functional block diagram illustrating functions implemented by the optimization apparatus 9 included in the in-vehicle PLC system according to Embodiment 5.

Based on the optimization program 92, the control section 90 functions as a parameter estimation section 901 for estimating a parameter associated with a noise characteristic of the observed noise sequence, and also functions as an impulsive noise detection section 905 for determining and detecting the presence or absence of generation of an impulsive noise based on the estimated parameter. Functions of the parameter estimation section 901 include: a function of an initial value deciding section 902 for deciding an initial value of a parameter; a function of the BW algorithm calculation section 903 for calculating, from the initial value, a noise characteristic for maximization of the likelihood of the observed noise sequence by using a BW algorithm; and a function of a parameter output section 904.

It should be noted that the functions of the parameter estimation section 901 of the optimization apparatus 9 and the functions of the initial value deciding section 902, BW algorithm calculation section 903 and parameter output section 904 associated with the detailed functions of the parameter estimation section 901 are identical to those of the parameter estimation section 601 of the control section 60 of the noise detection apparatus 6 according to Embodiment 1 and those of the initial value deciding section 602, BW algorithm calculation section 603 and parameter output section 604 associated with the detailed functions of the parameter estimation section 601. Further, the functions of the impulsive noise detection section 905 are also identical to those of the impulsive noise detection section 605. Accordingly, detailed description of these functions will be omitted.

Moreover, based on the optimization program 92, the control section 90 also functions as: an impulsive noise feature calculation section 906 for calculating a feature of a detected impulsive noise; and an optimal candidate deciding section 907 for deciding an optimal communication condition based on the feature of the impulsive noise. It should be noted that the association between the impulsive noise feature and the optimal candidate may be stored in advance in the storage section 91, and the control section 90 may make reference to the association by the function of the optimal candidate deciding section 907.

Figure 32:
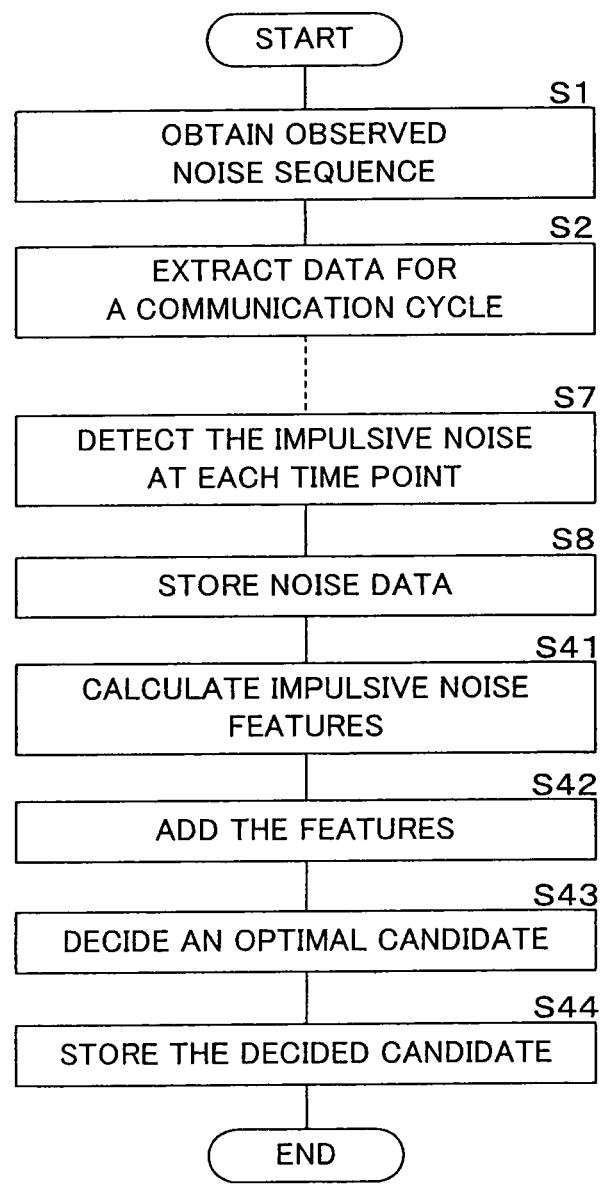
FIG. 32 is a flow chart illustrating an example of a procedure of processing executed by the optimization apparatus according to Embodiment 5.

FIG. 32 is a flow chart illustrating an example of a procedure of processing executed by the optimization apparatus 9 according to Embodiment 5. It should be noted that, of the following processing steps illustrated in the flow chart of FIG. 32, the processing steps from Steps S1 to S8 are identical to those from Steps S1 to S8 illustrated in the flow chart of FIG. 9 according to Embodiment 1. Alternatively, the processing steps of the flow chart of FIG. 32 from Steps S1 to S8 may be identical to those of Steps S1, S2, S51 to S58, S7 and S8 illustrated in the flow chart of FIG. 17 according to Embodiment 2. Accordingly, the processing steps of Steps S1 to S8 in FIG. 32 are illustrated in an abbreviated manner, and detailed description thereof will be omitted.

It should be noted that the following processing steps are performed on an as-needed basis during a test at the time of vehicle assembly or after shipment.

The control section 90 obtains measurement data (observed noise sequence) by the measurement section 94 (Step S1), and extracts data in units of communication cycles of FlexRay from the measurement data (Step S2). Also in Embodiment 5, the period (measurement periodical unit) of the extracted data is 1 msec. The extracted data is a sequence of voltage values for 100000 samples (K=100000).

When an impulsive noise is generated in the extracted data extracted for 1 msec (K=100000 samples of voltage values obtained on the time series) (S6: YES, or S53: YES), the control section 90 calculates noise characteristics that are based on a hidden Markovian-Gaussian noise model (Step S3 or S57), calculates an estimated state sequence (Step S4 or S58), detects an impulsive noise at each time point (Step 7), and then stores noise data in the storage section 91 (Step 8). In this case, the noise data includes parameters (i.e., a channel memory $\gamma$, an impulsive noise occurrence probability $P_1$, an impulse-to-background noise ratio R, and a background noise power $\sigma_G^2$) indicative of the noise characteristics calculated in Step S3. It should be noted that the noise data may include the extracted data, or may include the estimated state sequence.

Next, from the parameters $\theta$ (noise characteristics) calculated in Step S3, the control section 90 calculates a noise feature (Step S41). The noise feature may be calculated using impulsive noise data included in the data extracted in the period, or may be calculated using the estimated state sequence. Examples of the noise feature include an impulsive noise frequency, and an impulsive noise generation interval cycle.

The control section 90 stores the noise feature, calculated in Step S41, in the storage section 91, and adds the noise feature to the impulsive noise feature 95 (Step S42). Thus, the impulsive noise feature 95 in the storage section 91 is updated. The control section 90 may delete an old feature of the past.

Based on the updated impulsive noise feature 95 in the storage section 91, the control section 90 identifies an optimal candidate from the communication condition candidate group 96 (Step S43), and stores the identified candidate in the storage section 91 (Step S44), thus ending the processing.

As a result of the processing illustrated in the flow chart of FIG. 32 and performed by the optimization apparatus 9, data of impulsive noises, actually generated in the in-vehicle PLC system of a vehicle after assembly or after shipment, is accumulated. Then, based on the accumulated data, the optimal communication method, communication frequency or other communication parameters for favorably performing communication by avoiding an impulsive noise generated in the vehicle are identified by the processing performed by the optimization apparatus 9. Since the identified communication method, communication frequency or communication parameters is/are stored in the storage section 91, settings are made after assembly or at the time of a vehicle inspection, for example, thus making it possible to provide in-vehicle PLC that uses the optimal frequency, communication method, etc. for effectively avoiding an impulsive noise afterwards. Accordingly, the communication method, frequency and parameters, which minimize the influence of an impulsive noise, may be suitably selected in accordance with a situation changeable with time.

Embodiment 6

In Embodiment 6, an example of an in-vehicle PLC system for performing communication while avoiding the frequency of a generated impulsive noise will be described.

Figure 33:
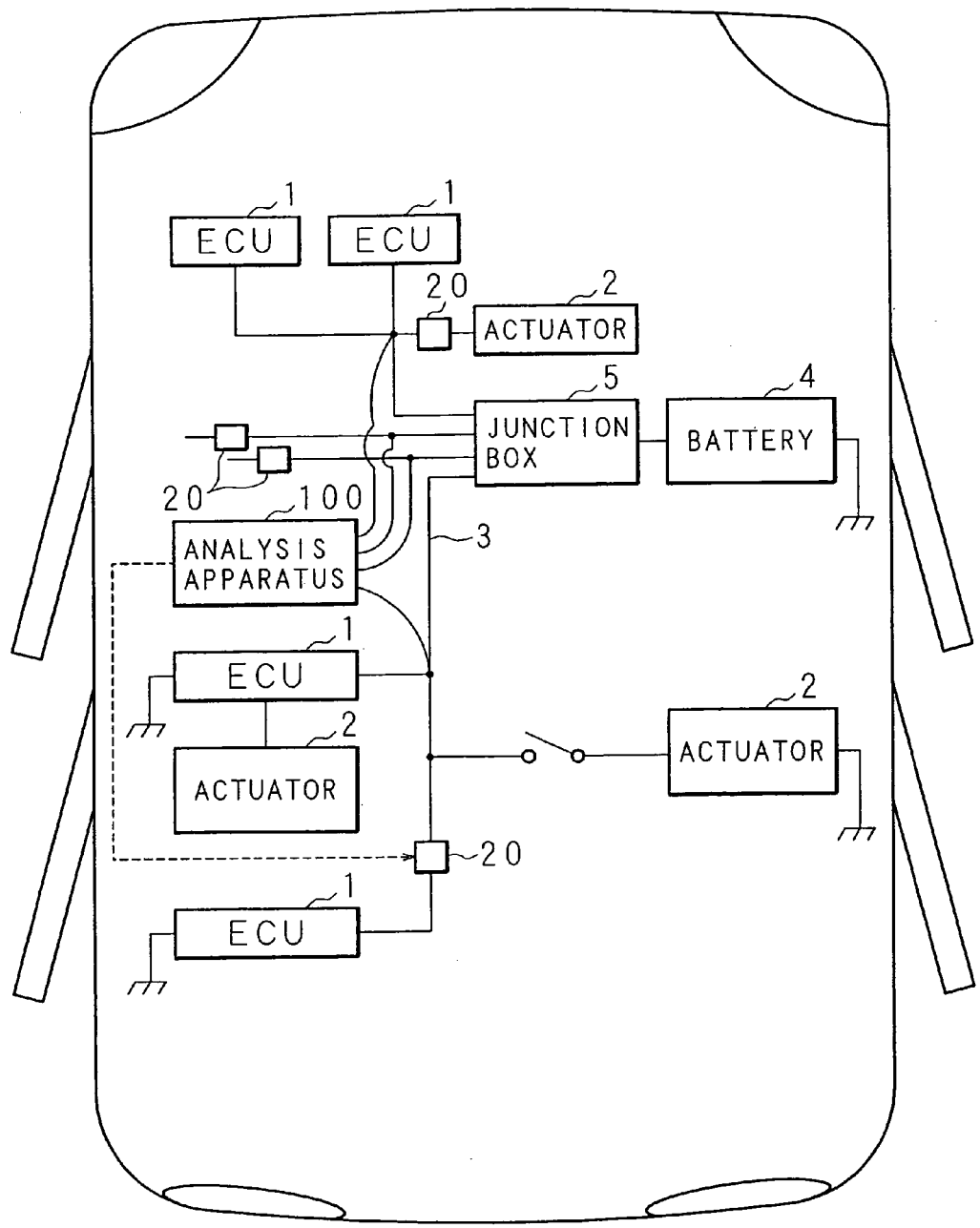
FIG. 33 is a block diagram illustrating a configuration of an in-vehicle PLC system according to Embodiment 6.

FIG. 33 is a block diagram illustrating a configuration of an in-vehicle PLC system according to Embodiment 6. It should be noted that constituent elements of the in-vehicle PLC system according to Embodiment 6 other than an analysis apparatus 100, filter sections 20 and details of respective ECUs are common to those of the in-vehicle PLC system according to Embodiment 1. The common constituent elements are identified by the same reference characters as those used in Embodiment 1, and detailed description thereof will be omitted.

The in-vehicle PLC system according to Embodiment 6 is configured to include: ECUs 1, 1, . . . ; actuators 2, 2, . . . operated in response to control data transmitted from the ECUs 1, 1, . . . ; power lines 3, 3, . . . through which electric power is supplied to each of the ECUs 1, 1, . . . and the actuators 2, 2, . . . ; a battery 4 for supplying electric power to respective devices through the power lines 3, 3, . . . ; a junction box 5 for branching and junction of the power lines 3, 3, . . . ; the analysis apparatus 100 for analyzing an impulsive noise in the in-vehicle PLC system; and a plurality of the filter sections 20, 20, . . . connected to the respective power lines 3, 3, . . . . Also in Embodiment 6, the ECUs 1, 1, . . . perform communication in accordance with a FlexRay protocol via the power lines 3, 3, . . . .

As illustrated in FIG. 33, the analysis apparatus 100 according to Embodiment 6 is connected to any given points of the power lines 3, 3, . . . . The analysis apparatus 100 obtains an impulsive noise frequency based on results of measurement of signal levels (voltage values) obtained at a predetermined interval in each power line 3. Based on the calculated frequency, the analysis apparatus 100 adjusts the frequency of a carrier wave for communication between the ECUs 1, 1, . . . , and adaptively controls a band rejection filter included in each filter section 20.

Figure 34:
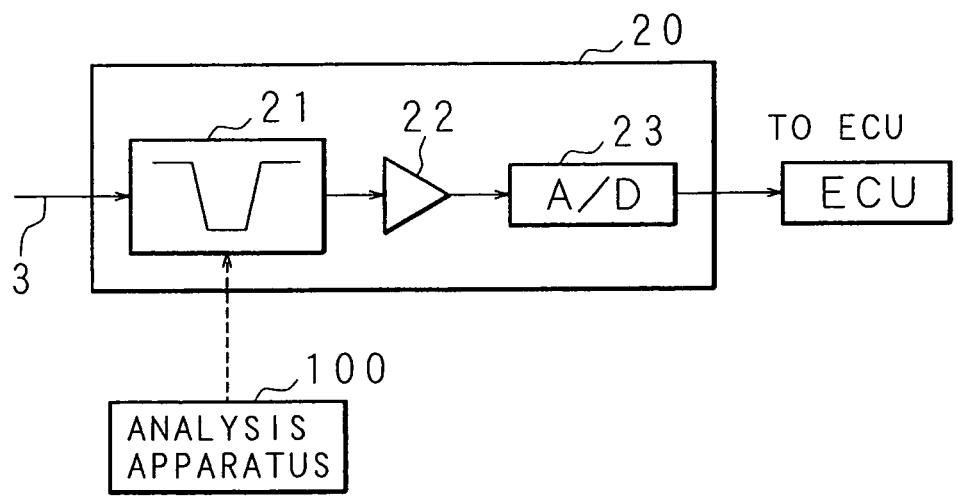
FIG. 34 is a block diagram illustrating an internal configuration of a filter section included in the in-vehicle PLC system according to Embodiment 6.

FIG. 34 is a block diagram illustrating an internal configuration of the filter section 20 included in the in-vehicle PLC system according to Embodiment 6. The filter section 20 includes: a band rejection filter (BRF) 2E an AGC (Automatic Gain Control) amplifier 22; and an A/D converter 23.

Based on an instruction provided from a control section of the analysis apparatus 100, the band rejection filter 21 is capable of adjusting a frequency to be limited. The AGC amplifier 22 automatically adjusts a gain even when a frequency of a carrier wave is changed.

Figure 35:
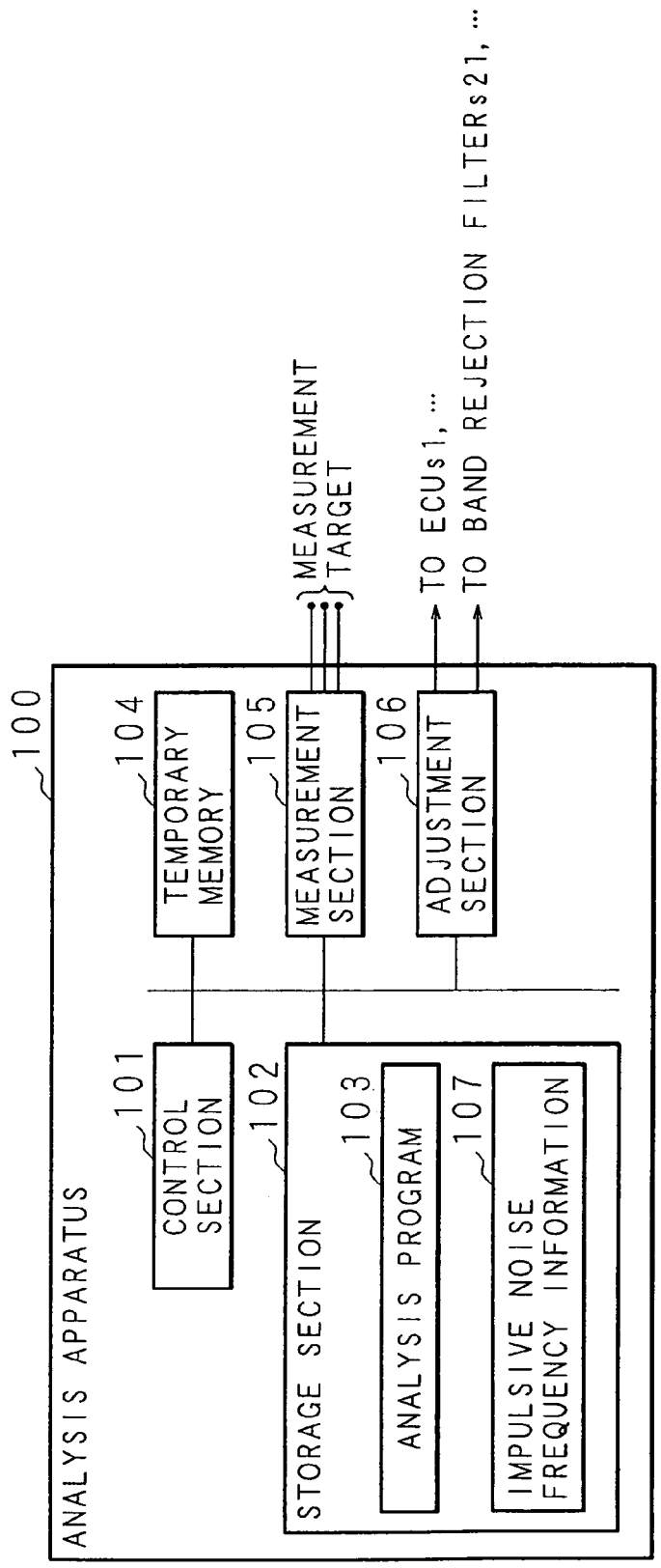
FIG. 35 is a block diagram illustrating an internal configuration of an analysis apparatus included in the in-vehicle PLC system according to Embodiment 6.

FIG. 35 is a block diagram illustrating an internal configuration of the analysis apparatus 100 included in the in-vehicle PLC system according to Embodiment 6. The analysis apparatus 100 includes: a control section 101; a storage section 102; a temporary storage section 104; a measurement section 105; and an adjustment section 106. Using a CPU, the control section 101 executes, based on an analysis program 103 stored in the storage section 102, processing such as a process for detecting an impulsive noise generated in the power line 3 or a process for estimating the frequency of a generated impulsive noise to change the frequency of a carrier wave. Using a nonvolatile memory such as a hard disk, an EEPROM or a flash memory, the storage section 102 stores the analysis program 103. The storage section 102 further stores impulsive noise frequency information 107. The impulsive noise frequency information 107 includes: information for defining a plurality of different known situations; and impulsive noise frequencies associated with this information. Using a memory such as a DRAM or an SRAM, the temporary storage section 104 temporarily stores data generated by processing carried out by the control section 101.

The measurement section 105 measures signal levels (voltage values) in the power lines 3, 3, . . . at a predetermined interval, and stores the measurement results in the storage section 102 or the temporary storage section 104. The measurement section 105 may have a plurality of terminals so as to be able to measure signal levels at a plurality of measurement points in the power lines 3. The predetermined interval (sampling interval) in the measurement is 0.01 μsec (100 MHz), for example.

The adjustment section 106 is connected to each of the ECUs 1, 1, . . . , and to the band rejection filter 21 of each filter section 20. In response to control from the control section 101, the adjustment section 106 notifies each ECU 1 of the impulsive noise frequency so as to adjust frequencies of local oscillators of a modulator and a demodulator contained in a transmitter-receiver of a power line communication section 13. Further, in response to control from the control section 101, the adjustment section 106 adaptively controls the band rejection filters 21 with the aim of limiting the impulsive noise frequency.

For the analysis apparatus 100, a personal computer may be used, or an FPGA, a DSP, an ASIC, etc., including components for performing functions of the respective constituent elements of the apparatus, may be used with the aim of providing the apparatus exclusively for noise detection and frequency adjustment.

Figure 36:
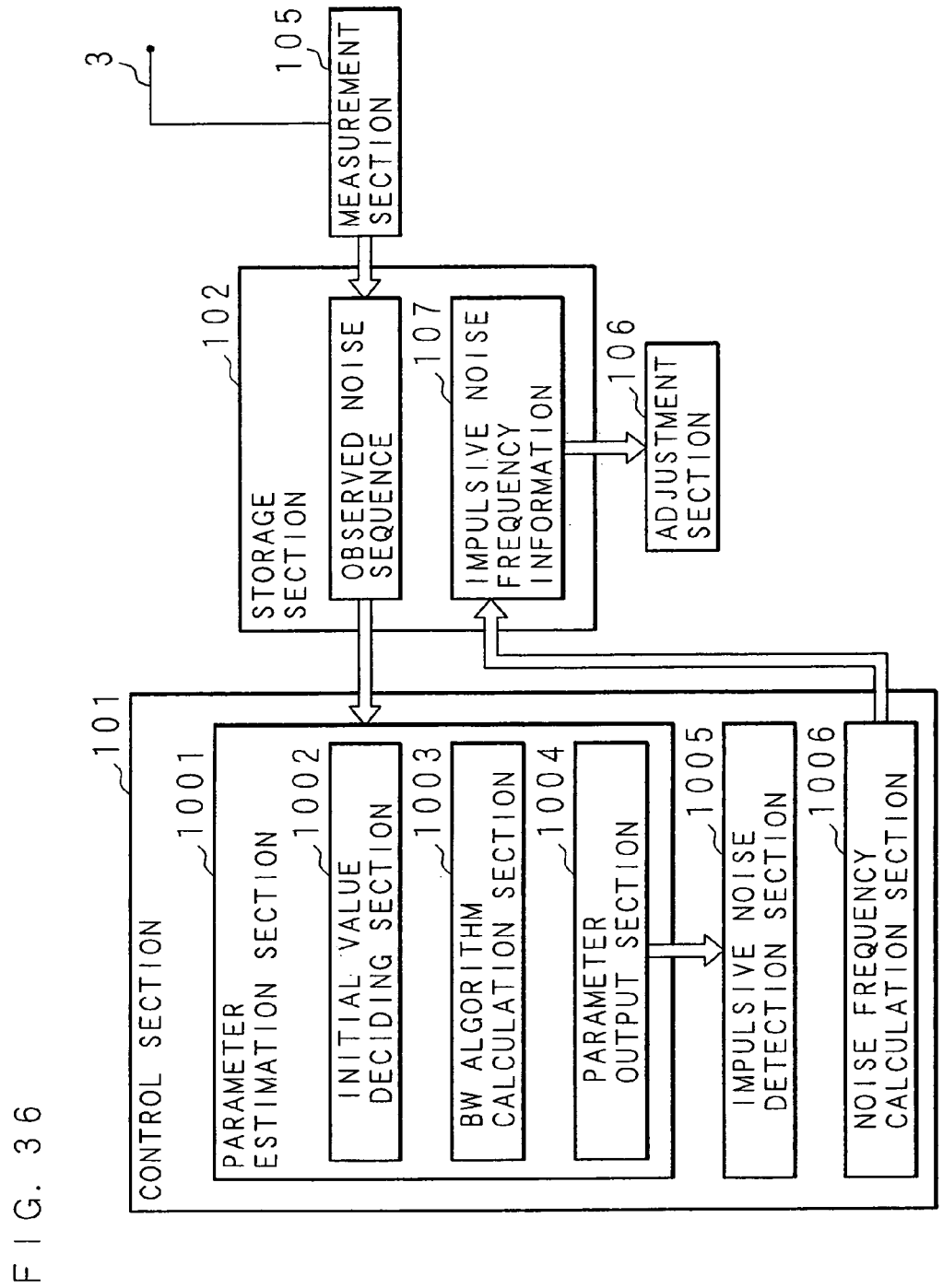
FIG. 36 is a functional block diagram illustrating functions implemented by the analysis apparatus included in the in-vehicle PLC system according to Embodiment 6.

Based on the analysis program 103, the control section 101 of the analysis apparatus 100 performs each function illustrated in FIG. 36, and executes a process for detecting an impulsive noise from the signal levels (observed noise sequence) measured and obtained at each predetermined interval by the measurement section 105. The control section 101 detects an impulsive noise in advance during a test at the time of vehicle assembly, and obtains and stores the frequency of the detected impulsive noise. Alternatively, the control section 101 may detect an impulsive noise and obtain the frequency thereof on an as-needed basis during communication after vehicle shipment.

Furthermore, using the adjustment section 106, the control section 101 adjusts a carrier wave frequency based on the calculated and stored impulsive noise frequency, and executes a process for adaptively controlling the band rejection filters 21. The control section 101 performs the adjustment process in advance at the time of assembly. Alternatively, the control section 101 may detect an impulsive noise generated at any time, may obtain the frequency of the detected impulsive noise in real time, and then may perform the adjustment process. Optionally, the control section 101 may read, from the storage section 102, the impulsive noise frequency information 107 stored for an impulsive noise detected in advance, and may perform adjustment in accordance with a situation.

FIG. 36 is a functional block diagram illustrating functions implemented by the analysis apparatus 100 included in the in-vehicle PLC system according to Embodiment 6. Based on the analysis program 103, the control section 101 functions as a parameter estimation section 1001 for estimating a parameter associated with a noise characteristic of the observed noise sequence, and also functions as an impulsive noise detection section 1005 for determining and detecting the presence or absence of generation of an impulsive noise based on the estimated parameter. Functions of the parameter estimation section 1001 include: a function of an initial value deciding section 1002 for deciding an initial value of a parameter; a function of a BW algorithm calculation section 1003 for calculating, from the initial value, a noise characteristic for maximization of the likelihood of the observed noise sequence by using a BW algorithm; and a function of a parameter output section 1004.

The functions of the parameter estimation section 1001 of the analysis apparatus 100 and the functions of the initial value deciding section 1002, BW algorithm calculation section 1003 and parameter output section 1004 associated with the detailed functions of the parameter estimation section 1001 are identical to those of the parameter estimation section 601 of the control section 60 of the noise detection apparatus 6 according to Embodiment 1 and those of the initial value deciding section 602, BW algorithm calculation section 603 and parameter output section 604 associated with the detailed functions of the parameter estimation section 601. Further, the functions of the impulsive noise detection section 1005 are also identical to those of the impulsive noise detection section 605. Accordingly, detailed description of these functions will be omitted.

Moreover, based on the analysis program 103, the control section 101 also functions as a frequency calculation section 1006 for calculating a frequency of a detected impulsive noise. The impulsive noise frequency, calculated by the function of the frequency calculation section 1006, is stored as the impulsive noise frequency information 107 in the storage section 102 by the control section 101.

Figure 37:
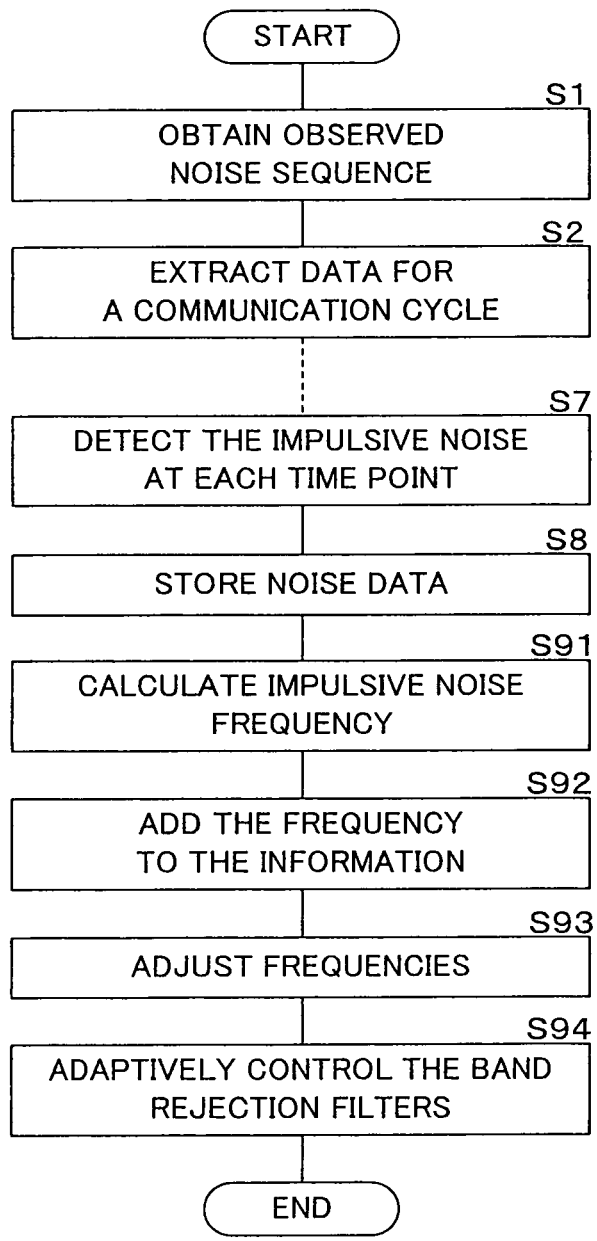
FIG. 37 is a flow chart illustrating an example of a procedure of processing executed by the analysis apparatus according to Embodiment 6.

FIG. 37 is a flow chart illustrating an example of a procedure of processing executed by the analysis apparatus 100 according to Embodiment 6. It should be noted that, of the following processing steps illustrated in the flow chart of FIG. 37, the processing steps from Steps S1 to S7 are identical to those from Steps S1 to S7 illustrated in the flow chart of FIG. 9 according to Embodiment 1. Alternatively, the processing steps of the flow chart of FIG. 37 from Steps S1 to S7 may be identical to those of Steps S1, S2, S51 to S58, and S7 illustrated in the flow chart of FIG. 17 according to Embodiment 2. Accordingly, the processing steps of Steps S1 to S7 in FIG. 37 are illustrated in an abbreviated manner, and detailed description thereof will be omitted.

The control section 101 obtains measurement data (observed noise sequence) by the measurement section 105 (Step S1), and extracts data in units of communication cycles of FlexRay from the measurement data (Step S2). Also in Embodiment 6, the period of the extracted data is 1 msec. The extracted data is a sequence of voltage values for 100000 samples (K=100000).

When an impulsive noise is generated in the extracted data extracted for 1 msec (K=100000 samples of voltage values obtained on the time series) (S6: YES, or S53: YES), the control section 101 calculates noise characteristics that are based on a hidden Markovian-Gaussian noise model (Step S3 or S57), calculates an estimated state sequence (Step S4 or S58), and detects an impulsive noise at each time point (Step S7).

From the parameters θ (noise characteristics) calculated in Step S3, the control section 101 calculates a noise frequency (Step S91). When a situation is known, the calculated frequency is stored as the impulsive noise frequency information 107 in the storage section 102 in association with a definition representing the situation (Step S92).

The control section 101 reads the stored frequency and uses the adjustment section 106 to notify a transmitter-receiver in each ECU 1 of this frequency so as to adjust frequencies of local oscillators of a modulator and a demodulator contained in the transmitter-receiver (Step S93). With the aim of limiting the impulsive noise frequency, the control section 101 adaptively controls the band rejection filters 21 by using the adjustment section 106 (Step S94), thus ending the processing.

Of the processing steps illustrated in the flow chart of FIG. 37, the control section 101 may perform Steps S91 and S92 at the time of vehicle assembly in advance, and then may separately perform the processing of Steps S93 and S94 in accordance with the situation of the in-vehicle PLC system.

As a result of the processing illustrated in the flow chart of FIG. 37 and performed by the analysis apparatus 100, the frequencies of impulsive noises, actually generated in the in-vehicle PLC system of a vehicle after assembly or after shipment, are accumulated as the impulsive noise frequency information 107. Then, based on the accumulated frequencies, the processing is performed by the control section 101 of the analysis apparatus 100, thereby enabling favorable communication by avoiding an impulsive noise generated in the vehicle.

In Embodiments 1 to 6, the forward and backward state probabilities provided in FIG. 4 and the formulas 3 to 7 are used for a method for calculating an a posteriori probability. As a method for calculating parameters for maximization of the a posteriori probability, the other method may be used based on an EM method.

Furthermore, in Embodiments 1 to 6, detection of an impulsive noise generated in a power line (communication medium) has been described using an in-vehicle PLC system as an example. However, it is apparent that the present invention is also applicable to detection of an impulsive noise generated in communication performed via a communication line other than a power line. Moreover, the present invention is not only applicable to detection of a noise generated in communication but also applicable to detection of an impulsive noise generated in a signal line.

Note that the disclosed embodiments should be considered in all respects as illustrative and not restrictive. The scope of the present invention is defined by the appended claims rather than by the foregoing description, and all changes which come within the meaning and range of equivalency of the claims are therefore intended to be embraced therein.

What is claimed is:

1. A noise detecting method for detecting a noise occurring in a communication medium, the method comprising:
   (a) measuring a signal level in the communication medium at a predetermined interval;
   (b) extracting, as an observed noise sequence, a measurement result for a predetermined measurement periodical unit;
   (c) calculating, from the extracted observed noise sequence, a noise characteristic by using a hidden Markovian-Gaussian noise model;
   (d) calculating, from the calculated noise characteristic and the observed noise sequence, an estimated state sequence that is a sequence indicative of whether or not a state is a noise-occurred state, which further includes:
      (d1) calculating a posteriori probability of a state at each time point by using the extracted observed noise sequence, and the noise characteristic calculated for each measurement periodical unit;
      (d2) estimating a state sequence that maximizes the calculated a posteriori probability of the state; and
   (e) individually detecting, from the estimated state sequence, an impulsive noise at each time point within the measurement periodical unit.

2. A noise detecting method for detecting a noise occurring in a communication medium, the method comprising:
   (a) measuring a signal level in the communication medium at a predetermined interval;
   (b) extracting, as an observed noise sequence, a measurement result for a predetermined measurement periodical unit;
   (c) calculating, from the extracted observed noise sequence, a noise characteristic by using a hidden Markovian-Gaussian noise model;
   (d) calculating, from the calculated noise characteristic and the observed noise sequence, an estimated state sequence that is a sequence indicative of whether or not a state is a noise-occurred state; and
   (e) individually detecting, from the estimated state sequence, an impulsive noise at each time point within the measurement periodical unit,
   wherein the communication medium is an electronic power line arranged in a vehicle.

3. The noise detecting method according to claim 1, wherein the step (d1) comprises the steps of:
   (d1-1) calculating a forward state probability related to a state preceding the state at each time point, and a backward state probability related to a state subsequent to the state at each time point; and
   (d1-2) calculating a posteriori probability of the state at each time point by using the calculated forward and backward state probabilities.

4. The noise detecting method according to claim 1, wherein in the step (d), the estimated state sequence is calculated by using the observed noise sequence, and a temporal concentration of an impulsive noise, an impulsive noise occurrence probability, an impulsive-to-background noise ratio, and a background noise power in the measurement periodical unit so that the a posteriori probability of the state is maximized.

5. A noise detecting method for detecting a noise occurring in a communication medium, the method comprising:
   (a) measuring a signal level in the communication medium at a predetermined interval;
   (b) extracting, as an observed noise sequence, a measurement result for a predetermined measurement periodical unit;
   (c) calculating, from the extracted observed noise sequence, a noise characteristic by using a hidden Markovian-Gaussian noise model;
   (d) calculating, from the calculated noise characteristic and the observed noise sequence, an estimated state sequence that is a sequence indicative of whether or not a state is a noise-occurred state;
   (e) individually detecting, from the estimated state sequence, an impulsive noise at each time point within the measurement periodical unit; and
   (f) determining, based on the calculated noise characteristic, the presence or absence of occurrence of an impulsive noise for the measurement periodical unit, wherein the determination is made based on at least one of a temporal concentration of an impulsive noise, an impulsive noise occurrence probability, an impulsive-to-background noise ratio, and a background noise power in the measurement periodical unit.

6. The noise detecting method according to claim 3, wherein the step (c) further comprises the steps of:
   (c1) deciding an initial value of state noise power of each of two states, i.e., a state in which an impulsive noise has occurred and a state in which no impulsive noise has occurred, based on the hidden Markovian-Gaussian noise model;
   (c2) deciding an initial value of each of four state transition probabilities between the two states;
   (c3) calculating forward and backward state probabilities by using the observed noise sequence, and the decided initial values of the state transition probabilities and state noise power;
   (c4) deciding, from the calculated forward and backward state probabilities, the four state transition probabilities in the measurement periodical unit, and the state noise power of each of the two states;
   (c5) repeating the step (c3) and the step (c4);
   (c6) calculating, in the course of the step (c5), the state transition probabilities and state noise power for maximization of the likelihood of the observed noise sequence; and
   (c7) identifying the noise characteristic by the calculated state transition probabilities and state noise power.

7. The noise detecting method according to claim 6, wherein the step (c1) further comprises the steps of:
   (c1-1) calculating three moments of a moment method from the observed noise sequence in the measurement periodical unit; and
   (c1-2) calculating, from the calculated three moments, the initial value of the state noise power of each of the two states.

8. The noise detecting method according to claim 6, wherein the step (c2) further comprises the steps of:
   (c2-1) calculating a threshold for a signal level value of the observed noise sequence from the calculated initial value of the state noise power of each of the two states;
   (c2-2) making a comparison between the calculated threshold and each signal level value of the observed noise sequence;
   (c2-3) calculating, as an estimated state sequence, a result of comparisons made on the respective signal level values, the result indicating which signal level value is higher or lower; and
   (c2-4) calculating the initial values of the four state transition probabilities from the calculated estimated state sequence.

9. The noise detecting method according to claim 6, the method further comprising the steps of:
   (g) determining whether or not an impulsive noise occurrence probability in the measurement periodical unit falls within a predetermined range;
   (h) calculating, when the impulsive noise occurrence probability is determined to fall within the predetermined range, a predetermined statistical information criterion by using either one or both of the decided initial value of each of the four state transition probabilities and the initial value of the state noise power of each of the two states;
   (i) determining, based on the calculated statistical information criterion, whether or not an impulsive noise is included; and
   (j) skipping the step (c6) when it is determined that no impulsive noise is included.

10. The noise detecting method according to claim 9, wherein the step (h) comprises the step (h1) of defining, as the statistical information criterion, one or a plurality of: a logarithmic likelihood, a Takeuchi information criterion, an Akaike information criterion, and a criterion that is based on the number of free parameters in the Takeuchi information criterion or Akaike information criterion.

11. The noise detecting method according to claim 10, wherein the criterion that is based on the number of free parameters is whether or not the following expression is satisfied:

$$\frac{E_K \lfloor n_k^4 \rfloor}{2K\hat{\sigma}^4} - \frac{1}{2} > 1 + z \qquad \text{[Exp. 1]}$$

K: Information Length of Observed Noise Sequence
$E_K$: Sample Mean of Sequence Including K Samples
$n_k$: Signal Level Value at Time Point k in Observed Noise Sequence
$\hat{\sigma}^2$: Weighted Distribution of Two States ($=\hat{P}_0\hat{\sigma}_0^2+\hat{P}_1\hat{\sigma}_1^2$)
(where $\hat{\sigma}_0$, $\hat{\sigma}_1$: Estimated Values of Noise Standard Deviations of Two States
$\hat{P}_0$, $\hat{P}_1$: Estimated Values of Probabilities of Two States), and
z: Any value meets z>0.

12. A noise detecting apparatus for detecting a noise occurring in a communication medium, the apparatus comprising:
a measurement section for measuring a signal level in the communication medium at a predetermined interval;
an extraction section for extracting, as an observed noise sequence, a measurement result for a predetermined measurement periodical unit;
a calculation section for calculating, from the extracted observed noise sequence, a noise characteristic by using a hidden Markovian-Gaussian noise model;
an estimation section for calculating, from the calculated noise characteristic and the observed noise sequence, an estimated state sequence that is a sequence indicative of whether or not a state is a noise-occurred state, wherein:
the estimation section calculates, using the extracted observed noise sequence and the noise characteristic calculated for the measurement periodical unit, a forward state probability related to a state preceding a state at each time point, and a backward state probability related to a state subsequent to the state at each time point,
the estimation section calculates an a posteriori probability of the state at each time point by using the calculated forward and backward state probabilities,
the estimation section repeats the calculation of the forward and backward state probabilities so as to maximize the calculated a posteriori probability, and
the estimation section calculates, as the estimated state sequence, a sequence of states at each time point at which the a posteriori probability is maximized; and
a detection section for individually detecting, from the estimated state sequence, each impulsive noise at each time point within the measurement periodical unit.

13. A noise detecting apparatus for detecting a noise occurring in a communication medium, the apparatus comprising:
a measurement section for measuring a signal level in the communication medium at a predetermined interval;
an extraction section for extracting, as an observed noise sequence, a measurement result for a predetermined measurement periodical unit;
a calculation section for calculating, from the extracted observed noise sequence, a noise characteristic by using a hidden Markovian-Gaussian noise model, wherein:
the calculation section decides an initial value of state noise power of each of two states, i.e., a state in which an impulsive noise has occurred and a state in which no impulsive noise has occurred, based on the hidden Markovian-Gaussian noise model,
the calculation section decides an initial value of each of four state transition probabilities between the two states,
the calculation section calculates forward and backward state probabilities by using the observed noise sequence, and the decided initial values of the state transition probabilities and state noise power,
the calculation section decides, from the calculated forward and backward state probabilities, the four state transition probabilities in the measurement periodical unit, and the state noise power of each of the two states,
the calculation section repeats the calculation of the forward and backward state probabilities with the use of the decided state transition probabilities and state noise power and the decision of the state transition probabilities and state noise power from the calculated forward and backward state probabilities,
the calculation section calculates, with the repetition, the state transition probabilities and state noise power for maximization of the likelihood of the observed noise sequence, and
the calculation section identifies the noise characteristic by the calculated state transition probabilities and state noise power;
an estimation section for calculating, from the calculated noise characteristic and the observed noise sequence, an estimated state sequence that is a sequence indicative of whether or not a state is a noise-occurred state; and
a detection section for individually detecting, from the estimated state sequence, each impulsive noise at each time point within the measurement periodical unit.

14. A noise detecting apparatus for detecting a noise occurring in a communication medium, the apparatus comprising:
a measurement section for measuring a signal level in the communication medium at a predetermined interval;
an extraction section for extracting, as an observed noise sequence, a measurement result for a predetermined measurement periodical unit;
a calculation section for calculating, from the extracted observed noise sequence, a noise characteristic by using a hidden Markovian-Gaussian noise model;
an estimation section for calculating, from the calculated noise characteristic and the observed noise sequence, an estimated state sequence that is a sequence indicative of whether or not a state is a noise-occurred state; and
a detection section for individually detecting, from the estimated state sequence, each impulsive noise at each time point within the measurement periodical unit,
wherein the communication medium is an electronic power line arranged in a vehicle.

* * * * *